US007645829B2

(12) United States Patent
Tse et al.

(10) Patent No.: US 7,645,829 B2
(45) Date of Patent: *Jan. 12, 2010

(54) PLASTICIZED FUNCTIONALIZED PROPYLENE COPOLYMER ADHESIVE COMPOSITION

(75) Inventors: Mun Fu Tse, Seabrook, TX (US); Jean-Roch H. Schauder, Wavre (BE); Feng Li, Katy, TX (US); Thottinal Abraham Mathew, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 673 days.

This patent is subject to a terminal disclaimer.

(21) Appl. No.: 11/472,063

(22) Filed: Jun. 21, 2006

(65) Prior Publication Data

US 2007/0021566 A1  Jan. 25, 2007

Related U.S. Application Data

(63) Continuation-in-part of application No. 11/220,114, filed on Sep. 6, 2005, which is a continuation-in-part of application No. 10/825,348, filed on Apr. 15, 2004.

(60) Provisional application No. 60/694,107, filed on Jun. 24, 2005, provisional application No. 60/622,964, filed on Oct. 28, 2004.

(51) Int. Cl.
*C08K 5/00* (2006.01)
(52) U.S. Cl. .................... 524/515; 524/528
(58) Field of Classification Search .............. 524/515, 524/528
See application file for complete search history.

(56) References Cited

U.S. PATENT DOCUMENTS

| 4,822,688 | A | 4/1989 | Nogues |
| 5,185,398 | A | 2/1993 | Kehr et al. |
| 5,350,817 | A | 9/1994 | Winter et al. |
| 5,476,914 | A | 12/1995 | Ewen et al. |
| 5,696,045 | A | 12/1997 | Winter et al. |
| 5,998,547 | A | 12/1999 | Hohner |
| 6,114,457 | A | 9/2000 | Markel et al. |
| 6,143,846 | A | 11/2000 | Herrmann et al. |
| 6,147,180 | A | 11/2000 | Markel et al. |
| 6,184,326 | B1 | 2/2001 | Razavi et al. |
| 6,184,327 | B1 | 2/2001 | Weng et al. |
| 6,207,606 | B1 | 3/2001 | Lue et al. |
| 6,225,432 | B1 | 5/2001 | Weng et al. |
| 6,245,870 | B1 | 6/2001 | Razavi |
| 6,258,903 | B1 | 7/2001 | Mawson et al. |
| 6,271,323 | B1 | 8/2001 | Loveday et al. |
| 6,297,301 | B1 | 10/2001 | Erderly et al. |
| 6,310,134 | B1 | 10/2001 | Templeton et al. |
| 6,340,703 | B1 | 1/2002 | Kelly |
| 6,342,574 | B1 | 1/2002 | Weng et al. |
| 6,515,231 | B1 | 2/2003 | Strobech et al. |
| 6,627,723 | B2 | 9/2003 | Karandinos et al. |
| 6,656,385 | B2 | 12/2003 | Lynch et al. |
| 6,659,965 | B1 | 12/2003 | Kensey et al. |
| 6,747,114 | B2 | 6/2004 | Karandinos et al. |
| 7,015,283 | B2 | 3/2006 | Schauder et al. |
| 7,223,822 | B2 | 5/2007 | Abhari et al. |
| 7,294,681 | B2 | 11/2007 | Jiang et al. |
| 7,550,528 | B2 * | 6/2009 | Abhari et al. ............... 524/487 |
| 2001/0007896 | A1 | 7/2001 | Agarwal et al. |
| 2002/0010257 | A1 | 1/2002 | Templeton et al. |
| 2002/0188057 | A1 | 12/2002 | Chen |
| 2003/0119988 | A1 | 6/2003 | Johnson et al. |
| 2004/0091631 | A1 | 5/2004 | Belli et al. |
| 2004/0127614 | A1 | 7/2004 | Jiang et al. |
| 2004/0220336 | A1 | 11/2004 | Abhari et al. |
| 2004/0249046 | A1 | 12/2004 | Abhari et al. |
| 2006/0020067 | A1 | 1/2006 | Brant et al. |
| 2009/0003781 | A1 | 1/2009 | Parris et al. |

FOREIGN PATENT DOCUMENTS

| EP | 1 366 087 | 8/2004 |
| EP | 1 342 249 | 1/2009 |
| JP | 01152448 | 6/1989 |

(Continued)

OTHER PUBLICATIONS

Jens Stehr, Investigation of the Effects of Poly(α-olefin) Plasticizers on the Properties of Elastomers, KGK, Jan./Feb. 2007, pp. 14-19 (translated from German by McElroy Translation Company.

*Primary Examiner*—Edward J Cain
(74) *Attorney, Agent, or Firm*—Catherine L. Bell

(57) ABSTRACT

Disclosed herein is an adhesive composition comprising: a random propylene polymer component having a heat of fusion of between 1 and 70 J/g and an mm triad tacticity index of at least 75%; and a functionalized polymer component comprising a $C_2$-$C_{20}$ olefin comprising at least 0.1 wt % of a functional group; wherein the adhesive composition has a T-Peel adhesion on a polar substrate at 20° C. of at least 175 N/m (1 lb/in) and a T-Peel adhesion on a non-polar substrate at 20° C. of at least 175 N/m Pa (1 lb/in) and where the polarity of the polar substrate is at least 0.10 units higher than the polarity of the non-polar substrate. Methods to produce the adhesive and articles comprising the adhesive are also disclosed.

88 Claims, No Drawings

FOREIGN PATENT DOCUMENTS

| | | |
|---|---|---|
| JP | 2824082 | 2/1990 |
| JP | 07-292167 | 11/1995 |
| WO | WO 98/32784 | 7/1998 |
| WO | WO 98/49229 | 11/1998 |
| WO | WO 00/37514 | 6/2000 |
| WO | WO 01/09200 | 2/2001 |
| WO | WO 01/81493 | 11/2001 |
| WO | WO 02/36651 | 5/2002 |
| WO | WO 03/040095 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | WO 2004/014998 | 2/2004 |
| WO | WO 2007/048422 | 5/2007 |

\* cited by examiner

PLASTICIZED FUNCTIONALIZED PROPYLENE COPOLYMER ADHESIVE COMPOSITION

PRIORITY CLAIM

This application claims the benefit of U.S. Provisional Application Ser. No. 60/694,107 filed Jun. 24, 2005. This application is also a continuation in part of U.S. Ser. No. 11/220,114, filed Sep. 6, 2005, which is a continuation in part of U.S. Ser. No. 10/825,348, filed Apr. 15, 2004, which claims the benefit of U.S. Ser. No. 60/622,964, filed Oct. 28, 2004.

FIELD OF THE INVENTION

This invention relates to a polymer composition, to an adhesive composition, an adhesion additive, an article comprising an adhesive composition, and a process of making the same. The polymer composition comprises a random propylene polymer in combination with a functionalized polymer, and a plasticizer.

BACKGROUND OF THE INVENTION

Olefin based polymers (polyolefins) are widely used in various applications due to their being chemically inert, having low density, and low cost. Applications include those related to adhesives, tie layers, skin layers, films, fibers, articles, laminates, overmolded parts, co-injected parts, and combinations thereof.

Polyolefin adhesives may be formed into various films, which may be laminated to, coated on, or co-extruded with various substrates. The film and the substrate may be combined with other materials to form a structure having a plurality of layers, each layer having a specific purpose. Packaging laminates, for example, may comprise a plurality of layers, such as a configurationally rigid core layer of paper or paperboard, an outer liquid-tight layer, an oxygen gas barrier such as a mid-layer of aluminum foil, and/or other layers depending on application needs.

To provide effective adhesion, it may be preferable that good bonding strength or intimate integrity between the layers be achieved for most applications.

However, relatively non-polar olefin based polymers do not normally adhere well to substrates which are more polar than they.

Particular applications may require a "soft" elastomer-like adhesive, which may be obtained using an apolar fluid and/or a non-functionalized plasticizer (NFP) in combination with an adhesive. However, bond strength of the apolar fluid and/or NFP modified polyolefin composition to polar substrates, such as polyester, corona-discharge-treated polyolefin, ionomer, nylon, poly(vinyl alcohol), poly(vinylidene chloride), polycarbonate, metals, glass, and the like is generally low due to lack of surface activity and/or fluid/NFP enrichment at the adhesive-surface interface. In addition, there is a need to improve the melt processability of adhesives known in the art.

Thus, there remains a need for an adhesive, preferably a pliable adhesive that will intimately bond to both polar and non-polar substrates. This need extends to an adhesive that exhibits a superior durability of bond strength under various temperature conditions and in the presence of aggressive products.

In addition, there is a need for an adhesive composition that may function as a tie layer. Such an adhesive composition may need to demonstrate adhesion between a variety of polar and non-polar substrates.

Numerous references are directed to compositions comprising syndiotactic polypropylene as an adhesion promoter. Examples include Japanese Patent Application 01-152448, Japanese Patent no. JP2824082, U.S. Pat. Nos. 5,476,914, 6,184,326, and 6,245,870 all assigned to Fina Technology Inc. which are directed to vanadium catalysts capable of producing compositions comprising syndiotactic polypropylene having greater than 80% r dyads. However, they do not disclose a functionalized propylene copolymer adhesive composition.

U.S. patent application Ser. No. 10/962,312 filed Oct. 8, 2004 discloses thermoplastic compositions of polypropylene for use in molded articles. The reference discloses maleated polypropylene copolymers having 0.25 wt % maleic anhydride, but is silent with regard to adhesion or adhesive properties.

Further, U.S. Pat. No. 6,656,385 to Wang et al. (Wang) is directed to a hot melt adhesive comprising about 15 to about 70% syndiotactic polypropylene and amorphous poly(alpha-olefin) along with a tackifier, optionally a plasticizer and/or a stabilizer. Wang defines syndiotactic polypropylene to have greater than 70% r dyads. As such, Wang does not disclose a functionalized propylene copolymer adhesive composition.

U.S. Pat. No. 4,822,688 to Nogues is directed to an adhesive composition comprising polypropylene modified by grafting with an acid anhydride which is further reacted with a compound bearing at least two groups such as a polyol or a polyamine. While Nogues discloses functionalized polyolefins, the reference does not disclose functionalized propylene copolymer adhesive promoters that improve adhesion.

WO 02/036651 discloses various maleated propylene based polymers and states at page 26 that such polymers may be useful as adhesion promoters between a polypropylene matrix and glass fibers or compatibilizers in polyamide/polypropylene blends or to increase the elongation at break of glass filled polyamide/polypropylene blends.

U.S. Pat. No. 6,310,134 (and related divisional US 2002/0010257) discloses a solvent based primer that is apparently a combination of lower molecular weight modified polyolefin with a selected solvent. The disclosure also does not specify the triad tacticity.

EP 1 366 087 discloses a non-chlorinated adhesion promoter in which a modified polymer is used with selected solvent as a primer. Example 2 uses an unmodified polymer comprising 80 mol % propylene derived units with a heat of fusion of approximately 5.2 calories per gram but there is no indication of the triad tacticity level.

U.S. Pat. No. 6,627,723 discloses adhesives comprising propylene based polymers where the polymer has, among other things, a heat of fusion of from about 30 to about 80 J/g.

U.S. Pat. No. 6,747,114 discloses adhesives comprising propylene based polymers where the polymer has, among other things, a specific storage modulus (G') in combination with a specific diad distribution of less than 1.07.

US 2006/0020067 discloses blends of functionalized syndiotactic rich polyolefins.

Accordingly, there remains a need for a polymer compositions comprising a functionalized propylene copolymer which demonstrates a benefit in adhesive properties to both polar and non-polar substrates, while preferably having softness and or flexibility.

Additional references of interest include: U.S. Pat. Nos. 6,207,606, 6,258,903, 6,271,323, 6,340,703, 6,297,301, 6,184,327, 6,225,432, 6,342,574, 6,147,180, 6,114,457, 6,143,846, 5,998,547, 5,696,045, 5,350,817, and 6,659,965, US 2001/0007896 A1, WO 00/37514, WO 01/81493, WO 98/49229, WO 98/32784, WO 2004/014998, WO 2003/

040095, WO 2003/040201, WO 2003/040202, WO 2003/040233, WO 2003/040442, and WO 01/09200.

Accordingly, there remains a need for polymer compositions comprising a functionalized propylene copolymer and a plasticizer which demonstrates a benefit in adhesive properties to both polar and non-polar substrates.

SUMMARY OF THE INVENTION

This invention relates to an adhesive composition comprising:

a random propylene polymer component having a heat of fusion of between 0.5 and 70 J/g and an mm triad tacticity index of at least 75%;

a functionalized polymer component comprising a $C_2$-$C_{20}$ olefin comprising at least 0.1 wt % of a functional group; and a non-functionalized plasticizer, wherein the adhesive composition has a T-Peel adhesion on a polar substrate at 20° C. of at least 175 N/m (1 lb/in) and a T-Peel adhesion on a non-polar substrate at 20° C. of at least 175 N/m Pa (1 lb/in) and where the polarity of the polar substrate is at least 0.10 units higher than the polarity of the non-polar substrate, wherein functionalized syndiotactic rich polyolefin polymer is present at 5 wt % or less.

In another embodiment, this invention relates to an adhesive composition comprising:

a random propylene polymer component having a heat of fusion of between 0.5 and 70 J/g and an mm triad tacticity index of at least 75%; a non-functionalized plasticizer; and a contact product of a polymer comprising a $C_2$-$C_{20}$ olefin and at least 0.1 wt % of a functional group;

wherein the adhesive composition has a T-Peel adhesion on a polar substrate at 20° C. of at least 175 N/m (1 lb/in) and a T-Peel adhesion on a non-polar substrate at 20° C. of at least 175 N/m Pa (1 lb/in)and where the polarity of the polar substrate is at least 0.10 units higher than the polarity of the non-polar substrate, wherein functionalized syndiotactic rich polyolefin polymer is present at 5 wt % or less.

In yet another embodiment, this invention relates to a process to make an adhesive composition comprises the steps of combining a random propylene polymer having a heat of fusion of between 0.5 and 70 J/g; and an mm triad tacticity index of at least 75%, a functionalized polymer component comprising a $C_2$-$C_{20}$ polymer and at least 0.1 wt % of a functional group; and a non-functionalized plasticizer, to produce the adhesive composition, wherein the adhesive composition has a T-Peel adhesion on a polar substrate at 20° C. of at least 175 N/m (1 lb/in) and a T-Peel adhesion on a non-polar substrate of at least 175 N/m (1 lb/in) and where the polarity of the polar substrate is at least 0.10 units higher than the polarity of the non-polar substrate, wherein functionalized syndiotactic rich polyolefin polymer is present at 5 wt % or less.

This invention also relates to articles of manufacture comprising the adhesive compositions disclosed herein.

A "syndiotactic rich polyolefin polymer" (srPP), also referred to as a "syndiotactic rich polyolefin" (srPO) is defined to be a polyolefin polymer that comprises at 50% or more r-dyads as determined according to the Ewen method (see J. A. Ewen, "Catalytic Polymerization of Olefins," Eds. T. Keii, K. Soga; Kodanska Elsevier Pub., Tokyo, 1986, P. 271).

DETAILED DESCRIPTION

Definitions

For the purposes of this invention and the claims thereto and for ease of reference when a polymer is referred to as comprising an olefin, the olefin present in the polymer is the polymerized form of the olefin. For ease of reference polypropylene is abbreviated PP, isotactic polypropylene is abbreviated iPP, syndiotactic polypropylene is abbreviated sPP, syndiotactic rich polypropylene is abbreviated srPP. Use of the abbreviation sPP includes srPP. Throughout, limiting ranges are disclosed for various physical properties and component compositions. It is noted that throughout, any lower range end may be combined with any upper range end of the same property to provide a particular range for any disclosed physical and/or compositional property.

For purposes of this invention and the claims thereto, the term oligomer refers to compositions having 2-40 mer units and the term polymer refers to compositions having 41 or more mer units. A mer is defined as a unit of an oligomer or polymer that originally corresponded to the monomer(s) used in the oligomerization or polymerization reaction. For example, the "mer" of polyethylene would be ethylene. For simplicity, when polymers are referred to, the reference may also apply to oligomers, unless specifically specified otherwise. Accordingly, the term polymer and oligomer may be referred to interchangeably herein unless otherwise specified. In addition, unless otherwise stated, the term "polymer" may include both homopolymers (i.e., a polymer comprising essentially one monomer), and/or a copolymer (i.e., a polymer comprising more than one monomer).

For purposes of this invention and the claims thereto, the term copolymers means any polymer comprising two or more monomers.

Furthermore, when catalyst components are described as comprising neutral stable forms of the components, it is well understood by one of ordinary skill in the art, that the active form of the component is the form that reacts with the monomers to produce polymers.

The new notation numbering scheme for the Periodic Table of the Elements is used herein as set out in CHEMICAL AND ENGINEERING NEWS, 63(5), 27 (1985).

As used herein, the term "polypropylene", "propylene polymer," or "PP" refers to homopolymers, copolymers, terpolymers, and interpolymers, comprising from 50 to 100-weight % of propylene.

Melting point (Tm), peak crystallization temperature (Tc), heat of fusion (Hf) and percent crystallinity are determined using the following procedure according to ASTM E 794-85. Differential scanning calorimetric (DSC) data is obtained using a TA Instruments model 2910 machine or a Perkin-Elmer DSC 7 machine. In the event that the TA Instruments 2910 machine and the Perkin-Elmer DSC-7 machine produce different DSC data, the data from the TA Instruments model 2910 shall be used. Samples weighing approximately 5-10 mg are sealed in aluminum sample pans. The DSC data is recorded by first cooling the sample to −50° C. and then gradually heating it to 200° C. at a rate of 10 ° C./minute. The sample is kept at 200° C. for 5 minutes before a second cooling-heating cycle is applied. Both the first and second cycle thermal events are recorded. Areas under the melting curves are measured and used to determine the heat of fusion and the degree of crystallinity. The percent crystallinity (X %) is calculated using the formula, X %=[area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) is used as the heat of fusion for 100% crystalline polypropylene. A value of 290 J/g (B) is used as the heat of fusion for 100% crystalline polyethylene. For the semi-crystalline polymers, having appreciable crystallinity, the melting temperature is measured and reported during the second heating cycle (or second melt). For the semi-amorphous polymers, having comparatively low levels of crystallinity, the melting temperature is measured and reported during the first heating cycle. Prior to the DSC measurement, the sample is aged (typically by holding it at ambient temperature for a period up to about 5 days) or annealed to maximize the level of crystallinity.

As used herein, the term "nonwoven" or "nonwoven fabric" refers to any material made from the aggregation of fibers fabricated by methods such as, for example, spunbonding, melt blowing, thermobonding, or combinations thereof.

A non-polar substrate is any substrate having a polarity as determined by the method described below of less than 0.10. Examples of non-polar substrates may include olefin polymers such as polyethylene, polypropylene, and/or the like. A polar substrate is any substrate having a polarity, as determined by the method described below, of 0.10 or more. Examples of polar substrates may include polyester, polyamide and/or metal substrates such as aluminum. The exemplary substrates listed herein with which the present invention may be used are offered merely as examples, and are not intended to be limiting to the present invention unless specifically noted otherwise. In preferred embodiments, the polarity of the polar substrate is at least 0.15 units higher than the polarity of the non-polar substrate (preferably at least 0.20, 0.25, 0.30, 0.35, 0.40, 0.45, 0.50, 0.55, 0.60, 0.65, 0.70, 0.75, 0.80, 0.85, 0.90, or 0.95 units higher), as measured according to the method described below. In another preferred embodiment the polarity of the polar substrate is 0.20 to 1.0, preferably 0.25 to 1.0, preferably 3.0 to 0.099, preferably 0.35 to 0.95, preferably 0.40 to 0.95, preferably 0.45 to 0.95, preferably 0.50 to 0.95, preferably 0.60 to 09.5 preferably 0.65 to 0.95, preferably 0.70 to 0.95, preferably 0.75 to 0.95, preferably 0.80 to 0.95, preferably 0.85 to 0.95, preferably 0.90 to 09.5.

Substrate Polarity

For purposes herein, a polar substrate is defined to be a substrate having a polarity (xP) of 0.10 or greater. A nonpolar substrate is defined as a substrate having a polarity of less than 0.10. The polarity of a substrate, abbreviated herein as "$x_s^P$", is defined as:

$$x_s^P = \gamma_s^P / \gamma_s$$

wherein $\gamma_s$ is the surface tension of the substrate, defined by the equation $$\gamma_s = \gamma_s^d + \gamma_s^p$$

where $\gamma_s^d$ is the dispersion component arising from dispersion-force interactions and $\gamma_s^p$ the polar component arising from dipolar and specific interactions.

The values of $\gamma_s^d$ and $\gamma_s^p$ of a given substrate "s" are determined using the harmonic-mean method described below using the contact angle of two probing liquids on the substrate.

Contact Angle Measurements

The contact angle of two probing liquids is used to determine the values of $\gamma^d$ and $\gamma^p$ for a given polymer or other substrate. The first probing liquid is methylene iodide, the second probing liquid is de-ionized water, and the contact angle drop size is 7 μL. Importantly, these probing liquids (i.e., water and methylene iodide) are non-solvents for the substrate studied, otherwise the results would be erroneous. Unless otherwise specified, polymeric substrate samples are prepared by compression-molding the polymer into a 1 inch by 1 inch by ⅛ inch plaque. Metallic substrates (e.g., aluminum) are rinsed with a solvent such as acetone to clean them prior to testing. The substrate sample is then allowed to reach 20° C. and then placed on a horizontal surface, liquid drops of the probing liquids are then placed on the surface of the sample and the contact angles determined with a Goniometer, where the Gonimeter has been standardized to yield a consistent value for deionized water on a polyethylene plaque. The contact angles are measured at 20° C.

Harmonic-Mean Method

This method uses the contact angles of the two probing liquids as determined above, with the harmonic-mean equation $$(1 + \cos\theta_1)\gamma_1 = 4\left(\frac{\gamma_1^d \gamma_s^d}{\gamma_1^d + \gamma_s^d} + \frac{\gamma_1^p \gamma_s^p}{\gamma_1^p + \gamma_s^p}\right)$$

$$(1 + \cos\theta_2)\gamma_2 = 4\left(\frac{\gamma_2^d \gamma_s^d}{\gamma_2^d + \gamma_s^d} + \frac{\gamma_2^p \gamma_s^p}{\gamma_2^p + \gamma_s^p}\right)$$

wherein:

$\theta_1$ is the contact angle of the water on the substrate sample as measured at 20° C. above;

$\gamma_1$ is the known surface tension for water at 20° C. (72.8 dyne/cm);

$\gamma_1^d$ is the known dispersion component for water at 20° C. (50.7 dyne/cm);

$\gamma_1^p$ is the known polar component for water at 20° C. (22.1 dyne/cm);

$\theta_2$ is the contact angle of the methylene iodide on the substrate sample as measure at 20° C. above;

$\gamma_2$ is the known surface tension for methylene iodide at 20° C. (50.8 dyne/cm);

$\gamma_2^d$ is the known dispersion component for the methylene iodide at 20° C. (6.7 dyne/cm);

$\gamma_2^p$ is the known polar component for the methylene iodide at 20° C. (44.1 dyne/cm);

$\gamma_s^d$ is the unknown dispersion component for the solid surface substrate sample under investigation; and $\gamma_s^p$ is the unknown polar component for the solid surface substrate sample under investigation.

Accordingly, the dispersion and polar components of solid surface tension ($\gamma_s^d$ and $\gamma_s^p$) are obtained from the contact angles $\theta_1$ and $\theta_2$ by solving the above two simultaneous equations. Water and methylene iodide are the two probing liquids used herein. The known $\gamma^d$ and $\gamma^p$ values for water and methylene iodide are listed in Table 1.

TABLE 1

| Probing Liquid | Surface tension at 20° C., (dyne/cm) | | |
| --- | --- | --- | --- |
|  | $\gamma$ | $\gamma^p$ | $\gamma^d$ |
| Water | 72.8 | 22.1 | 50.7 |
| Methylene iodide | 50.8 | 44.1 | 6.7 |

For further background on polarity, see Polymer Handbook, 4th Ed., Ed. by J. Brandrup, E. H. Immergut, and E. A.

Grulke, John Wiley & Sons, Inc., New York, 1999, VI/521-VI/541; and S. Wu, Polymer Interface and Adhesion, Marcel Dekker, New York, 1982.

Non-polar substrates useful in this invention may include polypropylene and polyethylene, and the like having a polarity less than 0.10. Polar substrates useful in this invention include ethylene vinyl alcohol (EVOH), polyester (PET, e.g., Mylar®), metallic substrates such as aluminum, glass, nylon, polycarbonate, polyesters, ethylene vinyl acetate (EVA), polyvinyl carbonate (PVC), glass beads, wood, paper, and other cellulosic substrates, and the like, all of which have a polarity greater than or equal to 0.10.

Adhesive Compositions

This invention relates to compositions comprising one or more random propylene polymers, one or more non-functionalized plasticizers (NFP), and one or more functionalized polymer component comprising a $C_2$-$C_{20}$ olefin comprising at least 0.1 wt % of a functional group.

In another embodiment, this invention relates to compositions comprising one or more polypropylene homopolymers, preferably high-melting propylene polymers, one or more random propylene polymers, one or more non-functionalized plasticizers (NFP), and one or more functionalized polymer component comprising a $C_2$-$C_{20}$ olefin comprising at least 0.1 wt % of a functional group.

In general, the adhesive composition of the present invention may comprise about 0.1 wt % to less than about 99 wt % of the random propylene polymer. Preferably, the random propylene polymer is present in the adhesive composition of the present invention at greater than or equal to about 1 wt %, preferably 2 wt %, preferably 3 wt %, preferably 4 wt %, preferably 5 wt %, preferably 10 wt %, preferably 20 wt %, preferably 30 wt %, preferably 40 wt %, preferably 50 wt %, preferably 60 wt %, preferably 70 wt %, preferably 80 wt %, depending on the random propylene polymer or combination of random propylene polymers selected and desired properties of the final adhesive composition.

In general, the adhesive composition of the present invention may comprise about 0.1 wt % to less than about 99 wt % of the non-functionalized plasticizer. Preferably, the non-functionalized plasticizer is present in the adhesive composition of the present invention at greater than or equal to about 1 wt %, preferably 2 wt %, preferably 3 wt %, preferably 4 wt %, preferably 5 wt %, preferably 10 wt %, preferably 20 wt %, preferably 30 wt %, preferably 40 wt %, preferably 50 wt %, preferably 60 wt %, preferably 70 wt %, preferably 80 wt %, depending on the non-functionalized plasticizer or combination of non-functionalized plasticizers selected and desired properties of the final adhesive composition.

In general, the adhesive composition of the present invention may comprise about 0.1 wt % to less than about 99 wt % of the functionalized polymer component. Preferably, the functionalized polymer component is present in the adhesive composition of the present invention at greater than or equal to about 1 wt %, preferably 2 wt %, preferably 3 wt %, preferably 4 wt %, preferably 5 wt %, preferably 10 wt %, preferably 20 wt %, preferably 30 wt %, preferably 40 wt %, preferably 50 wt %, preferably 60 wt %, preferably 70 wt %, preferably 80 wt %, depending on the functionalized polymer component or combination of functionalized polymer components selected and desired properties of the final adhesive composition.

When present, the adhesive composition of the present invention may comprise about 0.1 wt % to less than about 90 wt % of the polypropylene homopolymers. Preferably, the functionalized polymer component is present in the adhesive composition of the present invention at greater than or equal to about 1 wt %, preferably 2 wt %, preferably 3 wt %, preferably 4 wt %, preferably 5 wt %, preferably 10 wt %, preferably 20 wt %, preferably 30 wt %, preferably 40 wt %, preferably 50 wt %, preferably 60 wt %, preferably 70 wt %, preferably 80 wt %, depending on the polypropylene homopolymers or combination of polypropylene homopolymers selected and desired properties of the final adhesive composition.

In a preferred embodiment, the present invention relates to a composition comprising:

1 to 98 wt % of a propylene polymer having a melting point of 100° C. or more;

1 to 98 wt % of a random propylene polymer having a heat of fusion of 70 J/g or less and an mm triad tacticity index of 75% or more;

0.5 to 75 wt % of a non-functionalized plasticizer ("NFP") having a viscosity index of 120 or more; and 0.5 to 98 wt % of a functionalized polymer component comprising a $C_2$-$C_{20}$ olefin comprising at least 0.1 wt % of a functional group based upon the weight of the functionalized polymer component.

Alternately, the NFP may have a specific gravity of 0.85 or less, and/or a pour point of −20° C. or less, preferably −10° C. or less, and/or a flash point of 200° C. or more, and/or a viscosity index of 120 or more, and/or a kinematic viscosity at 100° C. of 35 cSt or more.

The present invention further relates to articles made from or comprising such adhesive compositions with improved balance of adhesive/tensile properties, softness, toughness and/or melt viscosity.

Random Propylene Polymer

The adhesive composition of the present invention comprises a random propylene polymer component, a functionalized polymer component and a NFP. The inventive random propylene polymer of the present invention may be referred to merely as a random propylene polymer, or as a random propylene polymer component for use herein.

Preferred random propylene polymer useful in the present invention can be prepared by polymerizing propylene with one or more of a $C_2$ or $C_4$-$C_{20}$ alpha olefin, most preferably the random propylene polymer comprises propylene and ethylene, (preferably from 3 to 25 weight % ethylene). The monomers are preferably polymerized in the presence of a chiral metallocene catalyst system (i.e., a chiral metallocene pre-catalyst in combination with an activator and optionally a scavenger). The comonomer or comonomers used in combination with propylene may be linear and/or branched. Preferred linear alpha-olefins include ethylene or $C_4$ to $C_8$ alpha-olefins, more preferably ethylene, 1-butene, 1-hexene, and 1-octene, even more preferably ethylene or 1-butene. Preferred branched alpha-olefins include 4-methyl-1-pentene, 3-methyl-1-pentene, and 3,5,5-trimethyl-1-hexene.

Typically, random propylene polymers useful in this invention are obtained by using catalysts that allow control of polymer tacticity. Generally these catalysts are used in combination with comonomers and/or the polymerization temperature to manipulate the level of tacticity. Useful catalysts are typically those that are capable of a level of stereoregular placement, generally by suitable chirality of a single site catalyst. Such catalysts are typically a transition metal complex generally containing a transition metal from Group 3, 4, 5, 6, 7, 8, 9 or 10 of the Periodic Table; and at least one ancillary ligand that remains bonded to the transition metal during polymerization. Preferably the transition metal is used in a reduced cationic state and stabilized by a co-catalyst or activator. The ancillary ligand may be a structure capable of forming a π bond such a cyclopentadienyl type ring structure. The ancillary ligand may also be a pyridinyl or amide ligand. The transition metal is preferably of Group 4 of the Periodic Table such as titanium, hafnium or zirconium which are preferably used in polymerization in the $d^0$ mono-valent cationic state and preferably have one or two ancillary ligands. For coordination polymerizations, such catalysts typically have a ligand capable of abstraction and a ligand into which the ethylene (olefinic) group can be inserted.

The manner of activation of the catalysts can vary. Alumoxane and preferably methyl alumoxane can be used suitably in an amount to provide a molar aluminum to metallocene ratio of from 1:1 to 20,000:1. Non- or weakly coordinating anion activators (NCA's) derived and/or generated in any of the ways described in EP277004, EP426637, may also be sued as activators. The non-coordinating anion can be a Group 10-14 complex wherein boron or aluminum is the charge-bearing atom shielded by ligands, which may be halogenated, and especially perfluorinated. Preferably tetraaryl-substituted Group 10-14 non-carbon element-based anion, especially those that are have fluorine groups substituted for hydrogen atoms on the aryl groups, or on alkyl substituents on those aryl groups.

An activation step generally forms the catalytically active ion pair from neutral precursors. This reaction may involve abstraction of an anionic group such as the methyl group to form a metallocene cation, although according to some literature zwitterions may be produced. The NCA precursor may be an ion pair of a borate or aluminate in which the precursor cation is eliminated upon activation in some manner, e.g. trityl or ammonium derivatives of tetrakis pentafluorophenyl boron (See EP277004). The NCA precursor can be a neutral compound such as a borane, which is formed into a cation by the abstraction of and incorporation of the anionic group abstracted from the metallocene (See EP426638). A precursor for the non-coordinating anion may be used with a transition metal complex supplied in a reduced valency state. The precursor may undergo a reduction-oxidation reaction. In a preferred embodiment, precursor cation may be a triphenyl carbenium derivative as in EP426637.

The non-coordinating anion may be used in approximately equimolar amounts relative to the transition metal complex, such as at least 0.25, preferably 0.5, and especially 0.8 and such as no more than 4, preferably 2 and especially 1.5.

Pyridine amine complexes, such as those described in WO03/040201 are also useful to produce the random propylene polymers useful herein. The catalyst may a fluxional complex, which undergoes periodic intra-molecular re-arrangement so as to provide the desired interruption of stereoregularity as in U.S. Pat. No. 6,559,262. The catalsyt may be a stereorigid complex with mixed influence on propylene insertion, see Rieger EP1070087.

Preferably the catalyst is a chiral metallocene catalyst used with an activator and optional scavenger. Typically, monoanionic ligands of such metallocenes are displaceable by a suitable activator to permit insertion of a polymerizable monomer or macro-monomer for polymerization on the vacant coordination site of the transition metal component. Such metallocenes are described in 1) U.S. Pat. No. 6,048,950 which discloses bis(indenyl)bis(dimethylsilyl) zirconium dichloride used together with methylalumoxane; 2) WO 98/27154 which discloses a dimethylsilyl bridged bisindenyl hafnium di-methyl used together with a non-coordinating anion activator; and 3) EP1 070 087 which discloses a bridged biscyclopentadienyl catalyst which has elements of asymmetry between the two cyclopentadienyl ligands to give a polymer with elastic properties. Also useful are the metallocenes described in U.S. Pat. Nos. 6,448,358 and 6,265,212, U.S. Pat. Nos. 5,198,401 and 5,391,629.

Useful other catalysts are metallocenes, such as those described in U.S. Pat. No. 5,026,798, which have a single cyclopentadienyl ring, advantageously substituted and/or forming part of a polycyclic structure, and a hetero-atom, generally a nitrogen atom, but possibly also a phosphorus atom or phenoxy group connected to a group 4 transition metal, preferably titanium but possibly zirconium or hafnium. A further example is $Me_5CpTiMe_3$ activated with $B(CF)_3$ as used to produce elastomeric polypropylene with an Mn of up to 4 million. See Sassmannshausen, Bochmann, Rosch, Lilge, J.Organomet. Chem. (1997) 548, 23-28.

When using the catalysts, the total catalyst system will generally additionally comprise one or more organo-metallic compound as scavenger. Such compounds as used in this application is meant to include those compounds effective for removing polar impurities from the reaction environment and for increasing catalyst activity. Preferred scavengers include tri-ethylaluminum, tri-isobutylaluminum, and or tri-n-octyl aluminum.

Preferably the polymerization reaction is conducted by reacting monomers in the presence of a catalyst system described herein at a temperature of from –0° C. to 200° C. for a time of from 1 second to 10 hours. Preferably homogeneous conditions are used such as a continuous solution process or a bulk polymerization process, optionally with excess monomer used as diluent. Preferably the continuous process uses some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used.

The catalyst and or activator and or scavenger may be delivered to the respective reactor as a solution or slurry, either separately to the reactor, activated in-line just prior to the reactor, or pre-activated and pumped as an activated solution or slurry to the reactor.

In some embodiments the polymerization may use multiple catalyst, multiple activators or both. Likewise the polymerizations may occur in one or more reactors. In a preferred embodiment, polymerizations in different reactors may be conducted in the presence of the same catalysts and or activators and or scavengers, and in other embodiments be conducted in the presence of different catalysts and or activators and or scavengers. In a preferred embodiment, dual reactors may be used in series or parallel, see U.S. Pat. No. 6,207,756., column 8 line 20 through column 14, line 21.

In a preferred embodiment, a continuous solution polymerization process may be used to produce the random propylene polymers comprising, for example, propylene and one or more of ethylene, octene or a diene. The polymerization process preferably utilizes a metallocene catalyst, namely, 1,1'-bis(4-triethylsilylphenyl)methylene-(cyclopentadienyl) (2,7-di-tertiary-butyl-9-fluorenyl)hafnium dimethyl or dimethyl silyl bis(2-methyl-5-phenyl indenyl)$ZrMe_2$ with dimethylaniliniumtetrakis(pentafluorophenyl) borate as an activator. An organoaluminum compound, namely, tri-n-octylaluminum, may be added as a scavenger to the monomer feed streams prior to introduction into the polymerization process. For production of more crystalline polymers, dimethylsilylbis(indenyl)hafnium dimethyl may be used in combination with dimethylaniliniumtetrakis(pentafluorophenyl) borate.

Preferably the solution polymerization is conducted in a single, or in two, continuous stirred tank reactors connected in series with hexane used as the solvent. In addition, toluene may be added to increase the solubility of the co-catalyst. The feed is transferred to the first reactor where the exothermic polymerization reaction is conducted adiabatically at a reaction temperature between about 50° C. to about 220° C. Hydrogen gas may also be added to the reactors as a molecular weight regulator. If desired, polymer product is then transferred to the second reactor, which is also operated adiabatically at a temperature between about 50° C. to 200° C.

Additional monomers, solvent, metallocene catalyst, and activators can be fed to the second reactor. The polymer content leaving the second reactor is preferably from 8 to 22 weight percent. A heat exchanger then heats the polymer solution to a temperature of about 220° C. The polymer solution is then brought to a Lower Critical Solution Temperature (LCST) liquid-liquid phase separator which causes the polymer solution to separate into two liquid phases—an upper polymer lean phase and a lower polymer-rich phase. The upper lean phase contains about 70 wt % of the solvent and the lower polymer rich phase contains about 30 wt % polymer. The polymer solution then enters a low pressure separator vessel which operates at a temperature of about 150° C. and a pressure of 4-10 bar-g (400 to 1000 Pa) and flashes the lower polymer rich phase to remove volatiles and to increase the polymer content to about 76 wt %. A gear pump at the bottom of the flash vessel drives the polymer rich solution to a List devolatilizer. An extruder may be coupled to the end of the List devolatilizer whereby the polymer material is transferred to a gear pump which pushes the polymer material through a screen pack. Then the polymer may be cut into pellets and fed to a water bath. A spin dryer may be used to dry the polymer pellets, which preferably have a final solvent content of less than about 0.5 wt %.

As stated above, preferred random propylene polymers of the present invention may be prepared by polymerizing propylene and at least one $C_2$ or $C_4$-$C_{20}$ alpha olefin in the presence of a chiral metallocene catalyst with an activator and optional scavenger, most preferably ethylene and propylene. Preferred chiral metallocenes are those known to favor incorporation of propylene for the production of predominantly isotactic polypropylene pentads and statistically random incorporation of the alpha-olefin comonomer(s). The term "metallocene" and "metallocene catalyst precursor" are terms known in the art to mean compounds possessing a Group 4, 5, or 6 transition metal M, with a cyclopentadienyl (Cp) ligand or ligands which may be substituted, at least one non-cyclopentadienyl-derived ligand X, and zero or one heteroatom-containing ligand Y, the ligands being coordinated to M and corresponding in number to the valence thereof. The metallocene catalyst precursors generally require activation with a suitable co-catalyst (also referred to as an activator) in order to yield an active metallocene catalyst. An active metallocene catalyst refers generally to an organometallic complex with a vacant coordination site that can coordinate, insert, and polymerize olefins.

Preferred metallocenes for use herein include bridged and unbridged biscyclopentadienyl complexes where the cyclopentadienyl group are, independently, a substituted or unsubstituted cyclopentadienyl group, a substituted or unsubstituted indenyl group, or a substituted or unsubstituted fluorenyl group. Preferred metallocenes include those represented by the formula: $TCpCpMX_2$, where T is a bridging group such as a dialkyl silica group (such as dimethylsilyl) or a hydrocarbyl group (such as methyl, ethyl, or propyl), each Cp is, independently a substituted or unsubstituted cyclopentadienyl group, a substituted or unsubstituted indenyl group (preferably a 2,4 or 2, 4, 7 substituted indenyl group), or a substituted or unsubstituted fluorenyl group, M is a group 4 metal (preferably Hf, Zr or Ti) and each X is independently a halogen or hydrocarbyl group (such as chlorine, bromine, methyl, ethyl, propyl, butyl, or phenyl).

Additionally preferred metallocenes for use herein include cyclopentadienyl (Cp) complexes which have two Cp ring systems for ligands. The Cp ligands preferably form a "bent sandwich complex" with the metal and are preferably locked into a rigid configuration through a bridging group. Such preferred cyclopentadienyl complexes may have the general formula:

$$(Cp^1R^1_m)R^3_n(Cp^2R^2_p)MX_q$$

wherein $Cp^1$ of ligand $(Cp^1R^1_m)$ and $Cp^2$ of ligand $(Cp^2R^2_p)$ are preferably the same, $R^1$ and $R^2$ each are, independently, halogen, hydrocarbyl, halocarbyl, hydrocarbyl-substituted organometalloid or halocarbyl-substituted organometalloid group containing up to 20 carbon atoms;

m is preferably 1 to 5;

p is preferably 1 to 5;

preferably two $R^1$ and/or $R^2$ substituents on adjacent carbon atoms of the cyclopentadienyl ring associated there can be joined together to form a ring comprising from 4 to 20 carbon atoms;

$R^3$ is a bridging group;

n is the number of atoms in the direct chain between the two ligands and is preferably 1 to 8, most preferably 1 to 3;

M is a transition metal having a valence of from 3 to 6, preferably from group 4, 5, or 6 of the periodic table of the elements and is preferably in its highest oxidation state, each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms; and q is equal to the valence of M minus 2.

Numerous examples of the biscyclopentadienyl metallocenes described above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,278,264; 5,296,434; and 5,304,614, all of which are incorporated by reference for purposes of U.S. patent practice.

Illustrative, but not limiting examples of preferred biscyclopentadienyl metallocenes of the type described in group 1 above for the invention include the racemic isomers of:

μ-$(CH_3)_2$Si(indenyl)$_2$M(Cl)$_2$

μ-$(CH_3)_2$Si(indenyl)$_2$M$(CH_3)_2$

μ-$(CH_3)_2$Si(tetrahydroindenyl)$_2$M(Cl)$_2$

μ-$(CH_3)_2$Si(tetrahydroindenyl)$_2$M$(CH_3)_2$

μ-$(CH_3)_2$Si(indenyl)$_2$M$(CH_2CH_3)_2$

μ-$(C_6H_5)_2$C(indenyl)$_2$M$(CH_3)_2$;

wherein M may include Zr, Hf, and/or Ti.

Preferably these metallocenes are used in combination with one or more alumoxanes (preferably methyl alumoxane, or modified methyl alumoxane) and or one or more ionic activators such as N,N-dimethylanilinium tetraphenylborate, N,N-dimethylanilinium tetrakis(pentafluorophenyl) borate, diphenylcarbenium tetra(perfluorophenyl)borate, or N,N-dimethylanilinium tetrakis (heptafluoronaphthyl) borate.

Additional catalyst systems that may be useful herein to produce polymers useful as random propylene polymers include those described in WO 03/040095, WO 03/040201, WO 03/040202, WO 03/040233; WO 03/040442, and WO 04/041928. Likewise polymers useful as random propylene polymers are disclosed in WO 03/040095, WO 03/040201, WO 03/040202, WO 03/040233; WO 03/040442, and WO 04/041928.

Additional catalyst systems that may be useful herein to produce polymers useful as random propylene polymers and polymers useful as random propylene polymers include those described in *Macromolecules,* 2002, 35, 5742-5743, U.S. Pat. No. 6,878,790, WO 02/055566, EP 1 070 087, and WO 02/0246247.

Random Propylene Polymer Properties

Preferred random propylene polymers useful in the present invention have an average propylene content on a molar basis of from about 68 to 95 mol %, preferably from 70 mol % to about 92 mol %, more preferably from about 72 mol % to about 89 mol %, most preferably from about 75 mol % to about 87 mol %. The balance of the random propylene polymer may be one or more alpha-olefins from 4 to 8 carbon atoms as specified above, preferably ethylene, and/or one or more diene monomers.

Preferably, the random propylene polymer comprises about 5 to 32 mol %, of a $C_2$ and/or a $C_4$-$C_{20}$ olefin more preferably 8 to 30 mol %, more preferably about 11 to about 28 mol %, with about 13 to 25 mol % being still more preferred.

The random propylene polymer may have a weight average molecular weight (Mw) of 5,000,000 or less, a number average molecular weight (Mn) of about 3,000,000 or less, a z-average molecular weight (Mz) of about 5,000,000 or less, and a g' index of 0.99 or greater measured at the weight average molecular weight (Mw) of the polymer using isotactic polypropylene as the baseline, all of which may be determined by size exclusion chromatography, e.g., 3D SEC, also referred to as GPC-3D as described herein.

In a preferred embodiment, the random propylene polymer may have a Mw of about 5,000 to about 5,000,000 g/mole, more preferably a Mw of about 10,000 to about 1,000,000, more preferably a Mw of about 20,000 to about 500,000, more preferably a Mw of about 50,000 to about 300,000, wherein Mw is determined as described herein.

In a preferred embodiment, the random propylene polymer may have a Mn of about 5,000 to about 3,000,000 g/mole, more preferably a Mn of about 10,000 to about 1,000,000, more preferably a Mn of about 30,000 to about 500,000, more preferably a Mn of about 50,000 to about 200,000, wherein Mn is determined as described herein.

In a preferred embodiment, the random propylene polymer may have a Mz of about 10,000 to about 5,000,000 g/mole, more preferably a Mz of about 50,000 to about 1,000,000, more preferably a Mz of about 80,000 to about 500,000, more preferably a Mz of about 100,000 to about 300,000, wherein Mz is determined as described herein.

The molecular weight distribution index (MWD=(Mw/Mn)) of the random propylene polymer may be about 1.5 to 40.0, more preferably about 1.8 to 5 and most preferably about 1.8 to 3. Techniques for determining the molecular weight (Mn and Mw) and molecular weight distribution (MWD) may be found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al.), which is herein incorporated by reference for purposes of U.S. practice, and references cited therein.

In a preferred embodiment, the random propylene polymer may have a g' index value of 0.99 or greater when measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the random propylene polymer and $\eta_l$ is the intrinsic viscosity of a linear polymer of the same viscosity-averaged molecular weight ($M_v$) as the random propylene polymer. $\eta_l = KM_v^\alpha$, K and α were measured values for linear polymers and should be obtained on the same instrument as the one used for the g' index measurement.

In a preferred embodiment, the random propylene polymer may have a crystallization temperature (Tc) measured with differential scanning calorimetry (DSC) of about 200° C. or less, more preferably, 150° C. or less, with 140° C. or less being more preferred.

In a preferred embodiment, the random propylene polymer may have a density of about 0.85 to about 0.92, more preferably, about 0.87 to 0.90 g/ml, more preferably about 0.88 to about 0.89 g/ml at room temperature as measured per the ASTM D-1505 test method.

In a preferred embodiment, the random propylene polymer may have a melt flow rate (MFR), which is inversely related to weight average molecular weight Mw, equal to or greater than 0.2 g/10 min., preferably between 2-500 g/10 min. and more preferably between 20-200 g/10 min., as measured according to the ASTM D-1238 test method.

In a preferred embodiment, the random propylene polymer may have a heat of fusion (Hf) determined according to the procedure described in ASTM E 794-85, which is greater than or equal to about 0.5 Joules per gram (J/g), and is less than or equal to about 70 J/g, preferably less than or equal to about 50 J/g, preferably less than or equal to about 35 J/g, preferably less than or equal to about 25 J/g. Preferably the random propylene polymers also have a heat of fusion that is greater than or equal to about 1 J/g, preferably greater than or equal to about 2.5 J/g, preferably greater than or equal to about 5 J/g according to the procedure described in ASTM E 794-85.

In a preferred embodiment, the propylene polymer has a % crystallinity of from 0.5 to 40, preferably 1 to 30, more preferably 5 to 25 wherein % crystallinity is determined according to the DSC procedure described herein. For use herein, the crystallinity of the random propylene polymer can also be expressed in terms of percentage of crystallinity. The thermal energy for the highest order of polypropylene is estimated at 189 J/g (i.e., 100% crystallinity is equal to 189 J/g.). In another embodiment, the random propylene polymer of the present invention preferably has a crystallinity of less than 40%, preferably about 0.25% to about 25%, more preferably from about 0.5% to about 22%, and most preferably from about 0.5% to about 20%.

In addition to this level of crystallinity, the random propylene polymer preferably has a single broad melting transition. However, random propylene polymer may show secondary melting peaks adjacent to the principal peak, but for purposes herein, such secondary melting peaks are considered together as a single melting point, with the highest of these peaks being considered the melting point of the random propylene polymer. The random propylene polymer preferably has a melting point of from about 25° C. to about 105° C., preferably about 25° C. to about 85° C., more preferably about 30° C. to about 70° C. Alternately, the random propylene polymer may have a melting point of from about 25 to 105° C., preferably from 25° C. to about 85° C., preferably from 25° C. to about 75° C., preferably about 25° C. to about 65° C., more preferably about 30° C. to about 80° C., more preferably about 30° C. to about 60° C.

The procedure for Differential Scanning Calorimetry is described as follows. About 6 to 10 mg of a sheet of the polymer pressed at approximately 200° C. to 230° C. is removed with a punch die. This is annealed at room temperature for at least 2 weeks. At the end of this period, the sample is placed in a Differential Scanning Calorimeter (TA Instruments Model 2920 DSC). In a nitrogen environment, the sample is first heated to 150° C. at 10° C./min and held at 150° C. for 5 min. It is then cooled to −50° C. at 20° C./min and held at −50° C. for 5 min. Finally it is heated again to 150° C. at 10° C./min. The thermal output during the first heat cycle, recorded as the area under the melting peak of the sample which is typically peaked at about 30° C. to about 175° C. and occurs between the temperatures of about 0° C. and about 200° C. is a measure of the heat of fusion expressed in Joules per gram of polymer. The melting point is recorded as the temperature of the greatest heat absorption within the range of melting of the sample.

Preferred random propylene polymer may have a Mooney viscosity ML (1+4)@125° C., as determined according to ASTM D1 646, of less than 100, more preferably less than 75, even more preferably less than 60, most preferably less than 30.

Useful random propylene polymers preferably have an MFR (melt flow rate) of 0.5 to 200, especially from 1 to 100 or more especially 1 to about 50 (as measured by ASTM-1238, 2.16 kg. at 230° C. with a 1 minute preheat on the sample to provide a steady temperature for the duration of the experiment).

Preferred random propylene polymer used in embodiments of the present invention have a ratio of m to r (m/r) of more than 1. The propylene tacticity index, expressed herein as "m/r", is determined by 13C nuclear magnetic resonance (NMR). The propylene tacticity index mi/r is calculated as defined in H. N. Cheng, *Macromolecules*, 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, and an m/r ratio of 1.0 an atactic material, and an m/r ratio of greater than 1.0 an isotactic material. An isotactic material theoretically may have a ratio approaching infinity, and many by-product atactic polymers have sufficient isotactic content to result in ratios of greater than 50.

In a preferred embodiment, the preferred random propylene polymer have isotactic stereoregular propylene crystallinity. The term "stereoregular" as used herein means that the predominant number, i.e. greater than 80%, of the propylene residues in the polypropylene exclusive of any other monomer such as ethylene, has the same 1,2 insertion and the stereochemical orientation of the pendant methyl groups is the same, either meso or racemic.

Preferred random propylene polymer useful in this invention have an mm triad tacticity index of three propylene units, as measured by $^{13}$C NMR, of 75% or greater, 80% or greater, 82% or greater, 85% or greater, or 90% or greater. The mm triad tacticity index of a polymer is the relative tacticity of a sequence of three adjacent propylene units, a chain consisting of head to tail bonds, expressed as a binary combination of m and r sequences. It is usually expressed for semi-amorphous copolymers of the present invention as the ratio of the number of units of the specified tacticity to all of the propylene triads in the copolymer. The mm triad tacticity index (mm fraction) of a propylene copolymer can be determined from a $^{13}$C NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

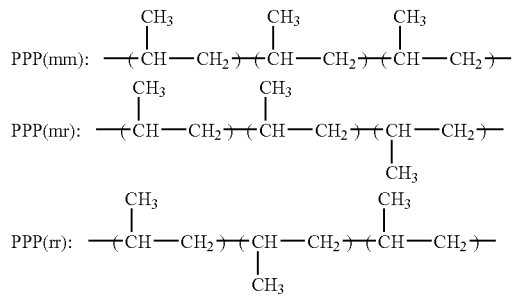

The $^{13}$C NMR spectrum of the propylene copolymer is measured as described in U.S. Pat. No. 5,504,172 and U.S. Pat. No. 6,642,316 (column 6, line 38 to column 9, line 18). The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal *Polymer*, Volume 30 (1989), page 1350 or an article in the journal *Macromolecules*, 17, (1984), 1950 (In the event of a conflict between the Polymer article and the Macromolecules article, the Polymer article shall control). In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm). The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the mm triad tacticity of the propylene unit chain consisting of head-to-tail bonds can be determined.

For further information on how the mm triad tacticity can be determined from a 13C-NMR spectrum of the polymer, as described by J. A. Ewen, "Catalytic Polymerization of Olefins", (the Ewen method); and Eds. T. Keii, K. Soga; Kodanska Elsevier Pub.; Tokyo, 1986, P 271, and as described in detail in U.S. Patent Application US2004/054086 filed Mar. 18, 2004 on page 8, in numbered paragraphs [0046] to [0054], all of which are incorporated by reference herein.

In another embodiment polymers that are useful in this invention as random propylene polymers include homopolymers and random copolymers of propylene having a heat of fusion as determined by Differential Scanning Calorimetry (DSC) of less than 70 J/g, an MFR of 50 dg/min or less, and contain stereoregular propylene crystallinity preferably isotactic stereoregular propylene crystallinity. In another embodiment the polymer is a random copolymer of propylene and at least one comonomer selected from ethylene, $C_4$-$C_{12}$ α-olefins, and combinations thereof. Preferably the random copolymers of propylene comprises from 10 wt % to 25 wt % polymerized ethylene units, based on the total weight of the polymer; has a narrow intermolecular composition distribution (e.g. 75% or more); has a melting point (Tm) of from 25° C. to 120° C., or from 35° C. to 80° C.; has a heat of fusion within the range having an upper limit of 70 J/g or 25 J/g and a lower limit of 1 J/g or 3 J/g; has a molecular weight distribution Mw/Mn of from 1.8 to 4.5; and has a melt flow rate of less than 40 dg/min, or less than 20 dg/min (as measured at 230° C., and 2.16 kg, ASTM D-1238).

A preferred random propylene polymer used in the present invention is described in detail as the "Second Polymer Component (SPC)" in co-pending U.S. applications U.S. Ser. No. 60/133,966, filed May 13, 1999, and U.S. Ser. No. 60/342, 854, filed Jun. 29, 1999, and described in further detail as the "Propylene Olefin Copolymer" in U.S. Ser. No. 90/346,460, filed Jul. 1, 1999, which are both fully incorporated by reference herein for purposes of U.S. practice. Random copolymers of propylene are available commercially under the trade name Vistamaxx™ (ExxonMobil, Baytown Tex.). Suitable examples include:

Vistamaxx™ 6100, Vistamaxx™ 62000, and Vistamax™ 3000.

In another embodiment, a random propylene polymer can be a blend of discrete polymers and/or copolymers. Such blends can include two or more polyethylene copolymers, two or more polypropylene copolymers, or at least one of each such polyethylene copolymer and polypropylene copolymer. Preferably, each of the random propylene polymers are described above and the number of random propylene polymers in a preferred embodiment may be three or less, more preferably two or less.

In an embodiment of the invention, the random propylene polymer may comprise a blend of two random propylene polymers differing in the olefin content. Preferably, one random propylene polymer may comprise about 7 to 13 mol % olefin, while the other random propylene polymer may comprise about 14 to 22 mol % olefin. In an embodiment, the preferred olefin in the random propylene polymers is ethylene.

Random propylene polymers can also be blended with processing oil and other common additives such as nucleating agents, antioxidants, fillers, nano-compositions, and the like, and may be fabricated into objects used in a variety of applications. Blends comprising random propylene polymers of this invention and other alpha-olefin polymers and copolymers, e.g., polypropylene, may also be fabricated into objects used in a variety of applications.

In a preferred embodiment, the propylene polymer may comprise a propylene based elastomeric polymer, produced by random polymerization processes leading to polymers having randomly distributed irregularities in stereoregular propylene propagation. This is in contrast to block copolymers in which constituent parts of the same polymer chains are separately and sequentially polymerized.

The term "elastomeric polymer" indicates that the heat of fusion of the polymer as determined by DSC is less than 75 J/g. Generally then the melting point as determined by DSC is below 105° C. This is in contrast to propylene copolymers or atactic polymers containing propylene derived units, which lack recovery from elastic deformation.

Functionalized Polymer Component

As disclosed above, the adhesive composition of the present invention comprises a random propylene polymer component and a functionalized polymer component. The functionalized polymer component comprises a $C_2$-$C_{20}$ olefin polymer comprising at least 0.1 wt % of a functional group. Suitable $C_2$-$C_{20}$ olefin polymers which may be functionalized include the above described random propylene polymer, isotactic polypropylene grafted to atactic polypropylene polymers (iPP-g-aPP, as described herein), $C_2$-$C_{20}$ polyolefin polymers including various poly alphaolefins and syndiotactic rich polypropylene as described herein, and the like.

By "functionalized polymer component" it is meant that the polymer to be functionalized is contacted with a functional group, and optionally a catalyst, heat, initiator, and/or free radical source, to cause all or part of the functional group to incorporate, graft, bond to, physically attach to, and/or chemically attach to the polymer to be functionalized. Accordingly, the adhesive composition of the present invention may comprise a contact product of:

one or more polymer(s) comprising a $C_2$-$C_{20}$ olefin;

one or more functional group(s) (grafting monomer(s)); and one or more functionalization catalyst(s).

Such functionalization may be referred to herein as grafting. Accordingly, a functional group may be referred to herein as a grafting monomer. In addition, "functionalized polymer component" is also defined to include functionalized polymers directly polymerized from monomers (or using initiators having a functional group) to produce a functionalized polymer component having a functional group at a chain end.

In addition, "functionalized polymer component" is also defined to include functionalized polymers directly polymerized from monomers to produce a functionalized polymer component having a functional group incorporated in the chain. These would include copolymers of maleic anhydride and ethylene sold by Sumitomo under the Igetabond trade name or terpolymers of ethylene, alkyl acrylates and maleic anhydride sold by Archema under the Lotader trade name as well as terpolymers of ethylene, alkyl acrylates and glycidyl methacrylate sold by Archema under the Lotader trade name. Copolymers of styrene and maleic anhydride (SMA) would also be included.

For ease of reference herein, any functionalized polymer component may be abbreviated herein using the format "AA-g-FG", wherein AA represents the specific type of polymer being functionalized (e.g., PP, iPP, random propylene polymer, PP impact copolymers and the like), FG refers to the functional group or compounds with which the polymer was functionalized (e.g., MA is maleic anhydride or glycidyl methacrylate), and -g- represents grafting (i.e., attachment) between the two moieties. Accordingly, random propylene polymer-g-MA represents the inventive random propylene polymer disclosed above, grafted with maleic anhydride.

By "functional group" is meant any compound with a weight average molecular weight of 1000 g/mol or less that contains a heteroatom and or an unsaturation. Preferred functional groups (preferred grafting monomers) include any compound with a weight average molecular weight of 750 or less, that contain one or more a heteroatoms and or one or more sites of unsaturation. Preferably the functional group is a compound containing a heteroatom and an unsaturation, such as maleic anhydride. Preferred functional groups include organic acids and salts thereof, organic amides, organic imides, organic amines, organic esters, organic anhydrides, organic alcohols, organic epoxides, organic acid halides (such as acid chlorides, acid bromides, etc.) organic peroxides, organic silanes, and the like.

Examples of preferred functional groups useful in this invention include compounds comprising a carbonyl bond such as carboxylic acids, esters of carboxylic acids, acid anhydrides, di-esters, salts, amides, and imides. Aromatic vinyl compounds, hydrolyzable unsaturated silane compounds, saturated halogenated hydrocarbons, and unsaturated halogenated hydrocarbons may also be used.

Examples of particularly preferred functional groups useful in this invention include, but are not limited to, maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo (2.2.2)oct-5-ene-2,3-dicarboxylic acid anhydride, 1,2,3,4,5, 8,9,10-octahydronaphthalene-2,3-dicarboxylic acid anhydride, 2-oxa-1,3-diketospiro(4.4)non-7-ene, bicyclo(2.2.1) hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA).

Examples of esters of unsaturated carboxylic acids useful in this invention as functional groups include methyl acrylate, ethyl acrylate, butyl acrylate, methyl methacrylate, ethyl methacrylate, butyl methacrylate, glycidyl methacrylate, hydroxymethyl methacrylate, hydroxyethyl methacrylate and the like.

Examples of hydrolyzable unsaturated silane compounds useful as functional groups in this invention include compounds comprising a radical polymerizable unsaturated group and an alkoxysilyl group or a silyl group in its molecule, such that the compound has a hydrolyzable silyl group bonded to a vinyl group and/or a hydrolyzable silyl group bonded to the vinyl group via an alkylene group, and/or a compound having a hydrolyzable silyl group bonded to an ester or an amide of acrylic acid, methacrylic acid, or the like. Examples thereof include vinyltrichlorosilane, vinyl tris (beta-methoxyethoxy)silane, vinyltriethoxysilane, vinyltrimethoxysilane, gamma-methacryloxypropyltrimethoxysilane monovinylsilane and monoallylsilane.

Examples of unsaturated halogenated hydrocarbons useful as functional groups include vinyl chloride and vinylidene chloride.

In a preferred embodiment, the polymer to be functionalized is grafted with maleic anhydride (MA), to produce the functionalized polymer component (e.g., random propylene polymer-g-MA), wherein the maleic anhydride is covalently bonded to the backbone polymer chain of the polymer. The anhydride functionality grafted onto the polymer may remain as an anhydride, may be oxidized into acid functional groups, and/or may be further reacted by processes known in the art to induce other functional groups such as amides, amines, nitriles, alcohols, esters, acid chlorides, and the like.

Formation of Functionalized Polymer Component

The functionalized polymer component of the present invention results from the combination of a polymer comprising a $C_2$-$C_{20}$ olefin, with a functional group (e.g., a grafting monomer). Multiple methods exist in the art that may be used for functionalizing polymers for use in the present invention. These include, but are not limited to, selective oxidation, free radical grafting, ozonolysis, epoxidation, and the like. The functionalized polymer component of the present invention may be produced in a solution and/or in a slurry process (i.e., with a solvent), or in a melt process (i.e., without a solvent). The functionalized polymer component may also be prepared in a high shear mixer, in a fluidized bed reactor, and/or the like.

Preferably, the polymer component or components that are to be functionalized are combined with a free radical initiator and a grafting monomer at a temperature, and for period of time sufficient to cause grafting of the grafting monomer with the polymer to produce the functionalized polymer component. In such an embodiment, the functionalized polymer component of the present invention may be obtained by heating the polymer component and a radical polymerizable functional group (e.g., maleic anhydride) in the presence of a radical initiator catalyst such as an organic peroxide. The combination is preferably heated at, near, or above the decomposition temperature of the radical initiator catalyst.

Useful radical initiator catalysts include: diacyl peroxides, peroxy esters, peroxy ketals, dialkyl peroxides, hydroperoxides and the like. Specific examples include benzoyl peroxide, methyl ethyl ketone peroxide, tert-butyl peroxy benzoate, tert-butylperoxy acetate, OO-tert-butyl-O-(2-ethylhexyl) monoperoxy carbonate, n-butyl 4,4-di-(tert-butyl peroxy) valerate, 1,1-bis(tert-butylperoxy)cyclohexane, 1,1-bis(tert-butylperoxy)-3,3,5-trimethylcyclohexane, 2,2-bis(tert-butylperoxy)butane, dicumylperoxide, tert-butylcumylperoxide, a,a'-bis(tert-butylperoxy-isopropyl)benzene, di-tert-butylperoxide (DTBP), 2,5-dimethyl-2,5-di(tert-butylperoxy)-hexane, 2,5-dimethyl-2,5-di(tert-butylperoxy)-hexane, cyclohexanone peroxide, t-butylperoxyisopropyl carbonate, di-t-butyl perphthalate, 2,5-dimethyl-2,5-di(t-butylperoxy)hexene, 2,5-dimethyl-2,5-di(t-butylperoxy)hexene-3, di-t-butyl peroxide, cumene hydroperoxide, t-butyl hydroperoxide, hydroperoxides, dilauryl peroxide, dicumyl peroxide, and the like. In a preferred embodiment the functionalization is conducted at a temperature above the melting point of the polymer but below the decomposition temperature of the initiator. Useful temperature ranges include from 35° C. to 350° C., preferably from 40° C. to 250° C., preferably from 45° C. to 200° C.

A particularly preferred process for preparing the inventive functionalized polymer component of the present invention includes melt blending the polymer component to be functionalized in the substantial absence of a solvent, with a free radical generating catalyst, such as a peroxide catalyst, in the presence of the grafting monomer (e.g., maleic anhydride) in a shear-imparting reactor, such as an extruder reactor. One or more single screw and/or multiple screw reactors may be used, preferably twin screw extruder reactors such as co-rotating intermeshing extruders, counter-rotating non-intermeshing extruders, and/or co-kneaders such as those sold by Buss are especially preferred.

A preferred sequence of events used for the functionalization reaction (e.g., the grafting reaction) comprise the steps of melting the polymer, adding and dispersing the grafting monomer, introducing the peroxide catalyst, and venting the unreacted grafting monomer and by-products resulting from the peroxide decomposition. Other sequences may include feeding the grafting monomers and the peroxide catalyst pre-dissolved in a solvent. The grafting monomer may be introduced into the reactor at a rate of about 0.01 to about 10 wt. % of the total of the polymeric composition and functional group, and preferably at about 1 to about 5 wt. % based on the total reaction mixture weight.

The grafting reaction is preferably carried out at a temperature selected to minimize or avoid rapid vaporization and consequent losses of the catalyst and grafting monomer and to have residence times about 6 to 7 times the half life time of the peroxide. A temperature profile where the temperature of the polymer melt increases gradually through the length of the reactor up to a maximum in the grafting reaction zone of the reactor, and then decreases toward the reactor output is preferred. Temperature attenuation in the last sections of the reactor (e.g., an extruder) is desirable for product pelletizing purposes. In order to optimize the consistency of feeding, the peroxide is usually dissolved at an approximate 10% concentration in a mineral oil whereas the polymer to be functionalized and the grafting monomer are preferably fed neat.

The radical initiator catalyst is preferably used in a ratio of from 0.00001 to 100 wt %, more preferably from 0.1 to 10 wt %, based on the weight of the grafting monomer. The heating temperature depends upon whether or not the reaction is carried out in the presence of a solvent, but it is usually from about 50° C. to 350° C. When the heating temperature is less than 50° C., the reaction may be slow and thus efficiency may be low. When it is more than 350° C., decomposition of the polymer or blend of polymers to be functionalized may occur.

In a solvent based process, the reaction may be carried out using the polymer to be functionalized in the form of a solution or a slurry having a concentration of from 0.1 to 50 wt % in the presence of a halogenated hydrocarbon compound having 2 to 20 carbon atoms, an aromatic compound, a halogenated aromatic compound, an alkyl substituted aromatic hydrocarbon, a cyclic hydrocarbon, and/or a hydrocarbon compound having 6 to 20 carbon atoms, which is stable to the radicals. Preferred solvents include hexane and cyclohexane.

The functionalized polymer component may be a single polymer (homopolymer, copolymer, terpolymer, or the like) which has been functionalized as described herein. In another embodiment, the functionalized polymer component of the present invention may be a blend comprising the functionalized polymer which is functionalized during a single process. The functionalized polymer component of the present invention may also include a plurality of functionalized polymers, either the same or different, and/or additives, which have been functionalized as a blend, and/or combined after being individually functionalized, or any combination thereof.

The functionalization process, also referred to herein as the grafting process, may be performed in presence of other components that allow minimization of beta scission reactions such as styrene derivatives or others known to one of minimum skill in the art.

The functionalized polymer component may be functionalized (e.g., grafted) to include about 0.001 wt % or greater of one or more functional groups attached to and/or incorporated into the functionalized polymer component. The functionalized polymer component may also be functionalized to a higher degree. Preferably, the level of functionalization (e.g., the grafting level) of the functionalized polymer component of the present invention may be less than about 50 wt %, preferably less than about 45 wt %, preferably less than about 40 wt %, preferably less than about 35 wt %, preferably less than about 30 wt %, preferably less than about 25 wt %, preferably less than about 20 wt %, preferably less than about 15 wt %, preferably less than about 10 wt %, preferably less than about 9 wt %, preferably less than about 8 wt %, preferably less than about 7 wt %, preferably less than about 6 wt %, preferably less than about 5 wt %, preferably less than about 4 wt %, preferably less than about 3 wt %, preferably less than about 2 wt %, preferably less than about 1.5 wt % of the total functionalized polymer component weight.

Preferably, the level of functionalization (e.g., the grafting level) of the functionalized polymer component of the present invention may be greater than about 0.5 wt %, more preferably greater than about 1 wt %. In a preferred embodiment, the functionalized polypropylene may comprise 0.1 to about 10 wt % of the functional group, more preferably 0.5 to about 5 wt % of the functional group, based on the total weight of the functionalized polymer component.

Preferably, the functionalized polymer component comprises maleic anhydride (e.g., random propylene polymer-g-MA). The level of maleic anhydride in the functionalized polymer component may be less than about 50 wt %, preferably less than about 45 wt %, preferably less than about 40 wt %, preferably less than about 35 wt %, preferably less than about 30 wt %, preferably less than about 25 wt %, preferably less than about 20 wt %, preferably less than about 15 wt %, preferably less than about 10 wt %, preferably less than about 9 wt %, preferably less than about 8 wt %, preferably less than about 7 wt %, preferably less than about 6 wt %, preferably less than about 5 wt %, preferably less than about 4 wt %, preferably less than about 3 wt %, preferably less than about 2 wt % maleic anhydride. Also preferably the level of maleic anhydride in the functionalized polymer component may be greater than about 0.5 wt %, more preferably greater than about 1 wt % maleic anhydride. In a preferred embodiment, the functionalized polypropylene may comprise 0.1 to about 10 wt % of the maleic anhydride, more preferably 0.25 to about 5 wt % more preferably 0.5 to 4 wt %, more preferably 0.75 to 3.5 wt %, more preferably 1.5 to 2.5 wt % of the maleic anhydride.

The maleic anhydride content of the functionalized polymer component may be determined by Fourier Transformed Infrared spectroscopy based on a calibration with standards whose absolute maleic anhydride content has been determined according to the procedure described by M. Sclavons et al. (M. Sclavons, P. Franquinet, V. Carlier, G. Verfaillie, I. Fallais, R. Legras, M. Laurent, and F. C. Thyrion, Polymer, 41, 1989 (2000)) wherein a sample of the functionalized polymer component is first purified from residual monomer by complete solubilization in xylene followed by re-precipitation in acetone, or other appropriate solvents. This precipitated functionalized polymer component is then dried. Approximately 0.5 g of the re-precipitated functionalized polymer component is dissolved in 150 ml of toluene at boiling temperature. A potentiometric titration with TBAOH (tetra-butylammonium hydroxide) using bromothymol blue as the color indicator is performed on the heated solution in which the functionalized polymer component does not precipitate during titration. The functionalized polymer component is preferably pre-heated to 200° C. for 1 hour prior to dissolution in order to make sure that all diacid resulting from hydrolysis of maleic anhydride with ambient moisture has been converted back to the anhydride.

The stress-strain properties of the functionalized polymer component may be evaluated using a dumbbell shaped sample as is known in the art. The samples may be compression molded at 180° C. to 200° C. for 15 minutes at a force of 15 tons into a plaque of dimensions of 6 inches×6 inches. The cooled plaques may then be removed and the specimens may be cut with a die. The stress strain evaluation of the samples may be conducted on an Instron 4465, made by Instron Corporation of 100 Royal Street, Canton, Mass. For use herein, the digital data was collected in a file collected by the Series IX Material Testing System available from Instron Corporation and analyzed using Excel 5, a spreadsheet program available from Microsoft Corporation of Redmond, Wash. Comparative compositions having similar levels of isotactic crystallinity (as determined by $^{13}$C-NMR) often cannot be extended to 500% extension for evaluation of the 500% modulus and thus cannot be compared to the compositions of the current invention. Flexural modulus (secant 1%) may be determined according to ASTM D790.

Preferably, the functionalized polymer component comprises at least 30 wt % (alternatively at least 40 wt %, alternatively at least 50 wt %, alternatively at least 60 wt %, alternatively at least 70 wt %, alternatively at least 80 wt %, alternatively at least 90 wt %, alternatively 100 wt %) of functionalized random propylene polymer. Preferably, the functionalized polymer component comprises at least 30 wt % (alternatively at least 40 wt %, alternatively at least 50 wt %, alternatively at least 60 wt %, alternatively at least 70 wt %, alternatively at least 80 wt %, alternatively at least 90 wt %, alternatively 100 wt %) of functionalized iPP-g-aPP polymer. Preferably the functionalized polymer component comprises two or more different (co)polymers. Preferably the functionalized copolymer component comprises three or more different (co)polymers. Preferably the functionalized copolymer component comprises four or more different (co) polymers. By different is meant that the (co)polymer has a different physical property, such as molecuar weight, Mw/Mn, tacticity, etc.) or has a different comonomer, or if the copolymers have the same comonomer, it is present in different weight %'s.

Functionalized Random Propylene Polymers

The adhesive composition of the present invention comprises a random propylene polymer component and a functionalized polymer component. The functionalized polymer component comprises a $C_2$-$C_{20}$ olefin polymer comprising at least 0.1 wt % of a functional group. In an embodiment, the functionalized polymer component may comprise the above disclosed random propylene polymer which has been functionalized as described above.

Unless stated otherwise, the properties of the functionalized random propylene polymer are obtained in the same fashion as the same property prior to functionalization, as described herein. Various techniques may be used to characterize the functionalized random propylene polymers of this invention, some of which are described in "Structure Characterization" The Science and Technology of Elastomers, F. Eirich, editor, Academic Press 1978, Chapter 3 by G. Ver Strate which is incorporated by reference for purposes of U.S. Patent Practice.

It has also been unexpectedly discovered herein that a compatibilizing effect within the inventive composition may be obtained by inclusion of the functionalized random propylene polymer, which may be influenced by the level of grafting of the random propylene polymer.

The functionalized random propylene polymer, preferably random propylene polymer-g-MA, may have a percent elongation at break of 300% or more, according to the procedure described in ASTM D 638 modified to use a "small" dumbbell having a base of about 1 cm×1 cm and a center, narrow strip of about 0.6 cm×0.2 cm, and a 850 μm per second separation speed. In a preferred embodiment, the random propylene polymer-g-MA of the present invention may have a percent elongation at break in excess of 300%, more preferably in excess of 500% and even more preferably in excess of about 800%.

The benefit of the above invention is that the functionalized random propylene polymer, preferably random propylene polymer-g-MA, may have a low flexural modulus. Low flexural modulus is a 1% secant modulus less than 1400 Mpa, more preferably less than 700 MPa and more preferably less than 350 MPa.

Accordingly, it is to be understood that the inventive functionalized random propylene polymers, preferably random propylene polymer-g-MA of the present invention are directed to easy processing materials which can be handled in conventional thermoplastics processing machinery.

The random propylene polymer-g-MA polymer may have a weight average molecular weight (Mw) of 5,000,000 or less, a number average molecular weight (Mn) of about 3,000,000 or less, a z-average molecular weight (Mz) of about 5,000,000 or less, and a g' index of 0.99 or greater measured at the weight average molecular weight (Mw) of the polymer using isotactic polypropylene as the baseline (e.g., PP4612E2 polypropylene available from ExxonMobil Chemical Company), all of which may be determined by size exclusion chromatography, e.g., 3D SEC, also referred to as GPC-3D as described herein.

In a preferred embodiment, the functionalized random propylene polymer, preferably random propylene polymer-g-MA polymer may have a Mw of about 5,000 to about 5,000,000 g/mole, more preferably a Mw of about 10,000 to about 1,000,000, more preferably a Mw of about 20,000 to about 500,000, more preferably a Mw of about 50,000 to about 300,000, wherein Mw is determined as described herein.

In a preferred embodiment, the functionalized random propylene polymer, preferably random propylene polymer-g-MA polymer may have a Mn of about 5,000 to about 3,000,000 g/mole, more preferably a Mn of about 10,000 to about 1,000,000, more preferably a Mn of about 10,000 to about 500,000, more preferably a Mn of about 10,000 to about 200,000, wherein Mn is determined as described herein.

In a preferred embodiment, the functionalized random propylene polymer, preferably random propylene polymer-g-MA polymer may have a Mz of about 10,000 to about 5,000,000 g/mole, more preferably a Mz of about 50,000 to about 1,000,000, more preferably a Mz of about 80,000 to about 500,000, more preferably a Mz of about 100,000 to about 300,000, wherein Mz is determined as described herein.

The molecular weight distribution index (MWD=(Mw/Mn)) of the functionalized random propylene polymer, preferably random propylene polymer-g-MA polymer may be about 1.5 to 40.0, more preferably about 1.8 to 10 and most preferably about 1.8 to 7.

In a preferred embodiment, the functionalized random propylene polymer, preferably random propylene polymer-g-MA polymer may have a g' index value of 0.99 or greater, more preferably a g' of about 1 (i.e., essentially linear) when measured at the Mw of the polymer using the intrinsic viscosity of isotactic polypropylene as the baseline.

In a preferred embodiment, the functionalized random propylene polymer, preferably random propylene polymer-g-MA polymer may have a crystallization temperature (Tc) measured with differential scanning calorimetry (DSC) of about 200° C. or less, more preferably, 140° C. or less.

In a preferred embodiment, the functionalized random propylene polymer, preferably random propylene polymer-g-MA polymer may have a density of about 0.85 to about 0.92 g/ml, more preferably, about 0.87 to 0.90 g/ml, more preferably about 0.88 to about 0.89 g/ml at room temperature as measured per the ASTM D-1505 test method.

In a preferred embodiment, the functionalized random propylene polymer, preferably random propylene polymer-g-MA polymer may have a melt flow rate (MFR), which is inversely related to weight average molecular weight Mw, equal to or greater than 0.2 g/10 min., preferably between 2-500 g/10 min., and more preferably between 20-200 g/10 min., as measured according to the ASTM D-1238 test method.

In a preferred embodiment, the functionalized random propylene polymer, preferably random propylene polymer-g-MA polymer may have a heat of fusion (Hf) determined according to the procedure described in ASTM E 794-85, which is less than about 75 J/g. Preferably greater than or equal to about 0.5 J/g, and is less than or equal to about 75 J/g. Preferably less than or equal to about 50 Joules/g, preferably less than or equal to about 30 J/g, with less than or equal to about 25 J/g more preferred. Also preferably greater than or equal to about 1 J/g, preferably greater than or equal to about 5 J/g according to the procedure described in ASTM E 794-85.

In another embodiment the functionalized polymer component present in the adhesive composition of the invention consists essentially of, (preferably consists of), at least 80 wt %, preferably at least 90 wt %, preferably 100 wt % functionalized random propylene polymer preferably having a heat of fusion between 0.5 and 70 J/g.

Amorphous Syndiotactic Rich Polyolefins

A syndiotactic rich polyolefin polymer (srPP) may comprise at least about 50% r-dyads as determined according to the Ewen method (see J. A. Ewen, "Catalytic Polymerization of Olefins," Eds. T. Keii, K. Soga; Kodanska Elsevier Pub., Tokyo, 1986, P. 271). In a preferred embodiment, a srPP may include about at least about 55% r dyads, preferably at least about 60% r dyads, preferably at least about 65% r dyads, preferably at least about 70% r dyads, preferably at least about 75% r dyads, more preferably less than about 80% r-dyads, based on the total number of r and m dyads present in the polymer.

An amorphous syndiotactic rich polyolefin polymer (a-srPP) may include a syndiotactic rich polyolefin polymer, essentially all of which is soluble in hexane, cyclohexane, toluene or xylene at room temperature.

An amorphous syndiotactic rich polyolefin polymer (a-srPP) may comprise about 50% r-dyads to less than about 80% r-dyads, based on the total number of dyads present in the polymer. In a preferred embodiment, an amorphous srPP may include about 55% r dyads to about 75% r dyads, preferably about 60% r dyads to about 75% r dyads, preferably about 60% r dyads to about 70% r dyads, preferably about 65% r dyads to about 70% r dyads, based on the total number of r-dyads present in the polymer.

An amorphous syndiotactic rich polyolefin polymer (a-srPP) may comprise about 6.25% to about 31.6% r-pentads, based on the total number of r-pentads present in the polymer. In a preferred embodiment, an amorphous srPP may include about 9.15% r-pentads to about 31.6% r-pentads, preferably about 13.0% r-pentads to about 31.6% r-pentads, preferably about 13.0% r-pentads to about 24.0% r-pentads, preferably about 17.9% r-pentads to about 24.0% r-pentads, based on the total number of r-pentads present in the polymer.

In a preferred embodiment, the amorphous syndiotactic rich polyolefin polymer is amorphous syndiotactic rich polypropylene (a-srPPr). The a-srPPr preferably has a weight average molecular weight (Mw) of 5,000,000 or less, a number average molecular weight (Mn) of about 3,000,000 or less, a z-average molecular weight (Mz) of about 10,000,000 or less, and a g' index of 1.0 or less measured at the weight average molecular weight (Mw) of the polymer using isotactic polypropylene as the baseline, all of which may be determined by size exclusion chromatography, e.g., 3D SEC, also referred to as GPC-3D as described herein.

In a preferred embodiment, the a-srPPr of the present invention, may have a Mw of about 5,000 to about 5,000,000 g/mole, more preferably a Mw of about 10,000 to about 1,000,000, more preferably a Mw of about 20,000 to about 500,000, more preferably a Mw of about 50,000 to about 300,000, wherein Mw is determined as described herein.

In a preferred embodiment, the a-srPPr of the present invention may have a Mn of about 5,000 to about 3,000,000 g/mole, more preferably a Mn of about 10,000 to about 1,000, 000, more preferably a Mn of about 30,000 to about 500,000, more preferably a Mn of about 50,000 to about 200,000, wherein Mn is determined as described herein.

In a preferred embodiment, the a-srPPr of the present invention may have a Mz of about 10,000 to about 10,000,000 g/mole, more preferably a Mz of about 50,000 to about 1,000, 000, more preferably a Mz of about 80,000 to about 500,000, more preferably a Mz of about 100,000 to about 300,000, wherein Mw is determined as described herein.

In a preferred embodiment, the a-srPPr of the present invention may have a g' index value of about 1 to about 1.5, more preferably a g' of about 1.25 to about 1.45, when measured at the Mw of the polymer using the intrinsic viscosity of isotactic polypropylene as the baseline, wherein g' is defined, and is determined as described herein.

In a preferred embodiment, the a-srPPr of the present invention may have a crystallization temperature (Tc) measured with differential scanning calorimetry (DSC) of about 200° C. or less, more preferably, 140° C. or less, more preferably no crystallization temperature is not discernable.

In a preferred embodiment, the a-srPPr of the present invention may have a density of about 0.85 to about 0.95 g/ml, more preferably, about 0.87 to 0.92 g/ml, more preferably about 0.88 to about 0.91 g/ml at room temperature as measured per the ASTM D-1505 test method.

In a preferred embodiment, the a-srPPr of the present invention may have a melt flow rate (MFR), which is inversely related to weight average molecular weight Mw, equal to or greater than 0.2 g/10 min., preferably between 2-500 g/10 min. and more preferably between 20-200 g/10 min., as measured according to the ASTM D-1238 (190c,2.16 kg)test method.

The amorphous syndiotactic rich polyolefin may include alpha olefins within the base polymer such that the amorphous syndiotactic rich polyolefin may have greater than about 50 wt % $C_3$-$C_{20}$ alpha olefins, preferably greater than about 50 wt % $C_3$-$C_{12}$ alpha olefins, and more preferably greater than about 50 wt % $C_3$-$C_{10}$ alpha olefins.

Preferably, the amorphous syndiotactic rich polyolefin may include greater than about 60 wt % propylene, preferably greater than about 70 wt % propylene, preferably greater than about 80 wt % propylene, preferably greater than about 90 wt % propylene, preferably greater than about 95 wt % propylene, preferably greater than about 99 wt % propylene, based on the total weight of the polymer.

The amorphous syndiotactic rich polyolefin of the present invention may further include greater than about 0.5 wt % ethylene, preferably greater than about 1 wt % ethylene, preferably greater than about 2 wt % ethylene, preferably greater than about 3 wt % ethylene, preferably greater than about 4 wt % ethylene, preferably greater than about 5 wt % ethylene, based on the total weight of the polymer.

For example, a-srPPr may include at least about 50 wt % propylene ($C_3$) as the base polymer, along with ethylene ($C_2$) and from $C_4$ to $C_{40}$ alpha olefins, preferably $C_4$ to $C_{20}$ alpha olefins, more preferably $C_4$ to $C_{12}$ alpha olefins, with $C_2$ and $C_4$ to $C_{10}$ alpha olefins being still more preferred.

Examples of preferred alpha olefins include butene-1, pentene-1, hexene-1, heptene-1, octene-1, nonene-1, decene-1, undecene-1, dodecene-1, tridecene-1, penetdecene-1, hexadecene-1, heptadecene-1, octadecene-1, and branched olefins including 3-methylbutene-1,4-methylepentene-1, and 4,4-dimethylepentene-1.

The amount of alpha olefins in addition to the base polymer, when present in the a-srPP, may be greater than about 0.001% by weight (wt %), based on the total weight of the polymer. Preferably, the amount of the alpha olefins is greater than or equal to about 0.1 wt %, more preferably greater than or equal to about 1 wt %. The other alpha olefins may also be present in the base polymer at about 50 wt % or less. Preferably, the amount of the other alpha olefins is less than or equal to about 20 wt %, more preferably less than or equal to about 10 wt %.

In a preferred embodiment, essentially all of the a-srPP (preferably a-srPPr) of the present invention is essentially amorphous, by which it is meant that essentially all of the a-srPP is soluble in hexane, cyclohexane, xylene or toluene at room temperature. As used herein, by essentially all of the s-srPP it is meant that at least about 95 wt %, preferably at least about 96 wt %, preferably at least about 97 wt %, preferably at least about 98 wt %, preferably at least about 99 wt %, preferably at least about 99.5 wt % of the a-srPP is soluble in hexane, cyclohexane, xylene or toluene at room temperature (i.e., 25° C.), based on the total weight of the a-srPP present.

In a preferred embodiment, the a-srPP, more preferably the a-srPPr, of the present invention may have a heat of fusion (Hf) determined according to the procedure described in ASTM E 794-85, which is less than or equal to about 10 Joules/g, preferably less than or equal to about 9 Joules/g, preferably less than or equal to about 8 Joules/g, preferably less than or equal to about 7 Joules/g, preferably less than or equal to about 6 Joules/g, preferably less than or equal to about 5 Joules/g, preferably less than or equal to about 4 Joules/g, preferably less than or equal to about 3 Joules/g, preferably less than or equal to about 2 Joules/g, preferably less than or equal to about 1 Joule/g, still more preferably, a heat of fusion which is not detectable according to the procedure described in ASTM E 794-85.

In a preferred embodiment, the a-srPP, more preferably the a-srPPr, of the present invention may have an ash content, determine according to the procedure described in ASTM D 5630, which is less than or equal to about 1 wt %, based on the total amount of the polymer present, more preferably less than or equal to about 0.9 wt %, more preferably less than or equal to about 0.8 wt %, more preferably less than or equal to about 0.7 wt %, more preferably less than or equal to about 0.6 wt %, more preferably less than or equal to about 0.5 wt %, more preferably less than or equal to about 0.4 wt %, more preferably less than or equal to about 0.3 wt %, more preferably less than or equal to about 0.2 wt %, more preferably less than or equal to about 0.1 wt %, more preferably less than or equal to about 0.05 wt %, more preferably less than or equal to about 0.01 wt %, more preferably less than or equal to about 0.005 wt %, with an ash content, as determined according to ASTM D-5630 of less than or equal to about 0.001 wt % ash content being still more preferred.

In another embodiment, the adhesive blends of this invention comprise 5 wt % or less of syndiotactic rich polyolefin polymer (such as syndiotactic rich polypropylene), preferably 4 wt % or less of syndiotactic rich polyolefin polymer, 3 wt % or less of syndiotactic rich polyolefin polymer, 2 wt % or less of syndiotactic rich polyolefin polymer, 1 wt % or less of syndiotactic rich polyolefin polymer. Preferably the adhesive blends of this invention comprise 0 wt % of syndiotactic rich polyolefin polymer (such as syndiotactic rich polypropylene).

Preparation of Amorphous Syndiotactic Rich Polyolefin Polymers

Catalyst capable of producing amorphous syndiotactic rich polyolefins, and in particular amorphous syndiotactic rich polypropylene include those disclosed in U.S. Pat. Nos. 5,476,914, 6,184,326, 6,245,870, 5,373,059, 5,374685, and 5,326,824. Preparation of srPP polymers, in particular srPPr polymers have been disclosed in U.S. Pat. Nos. 3,305,538 and 3,258,455 to Natta et al, U.S. Pat. No. 4,892,851 to Ewen et al, U.S. Pat. No. 5,270,410 to Job, U.S. Pat. No. 5,340,917 to Eckman et al, U.S. patent and U.S. Pat. No. 5,476,914 to Ewen et al., the entire disclosures of which are hereby incorporated by reference.

In addition to the selection of the catalyst, the concentration of the reactants, and the pressure of the reaction used for the preparation of the amorphous syndiotactic rich polyolefins of the present invention, temperature control of the reaction may also be critical. The temperature of the reaction is preferably controlled to within about 10° C. to a set point, more preferably within about 9° C., more preferably within about 8° C., more preferably within about 7° C., more preferably within about 6° C., more preferably within about 5° C., more preferably within about 4° C., more preferably within about 3° C., more preferably within about 2° C.

Polymers prepared by using the method disclosed in U.S. Pat. No. 5,476,914 with a metallocene catalyst system are preferred. Compared with other methods, the a-srPPr prepared with metallocene catalyst will have a narrower molecular weight distribution and/or more uniform comonomer distribution, as compared to the polymers produced using other catalysts, such as vanadium catalysts as disclosed in, which tend to produce polymers having ash contents greater than those of the present invention. Thus, metallocene produced a-srPP may have better physical and mechanical properties and superior processability, compared to other a-srPP. The most preferred type of a-srPP polymers is metallocene catalyzed copolymer of propylene with ethylene or butene-1 having ethylene or butene-1 comonomer content ranging from about 2 to 20 wt %.

In general, a-srPP may by produced in a liquid filled, single-stage reactor such as a continuous reactor using an appropriate catalyst such as di(p-triethylsilylphenyl)methylene(cyclopentadienyl)(3,8-di-t-butylfluorenyl) zirconium dichloride, di(p-triethylsilylphenyl)methylene(cyclopentadienyl)(3,8-di-t-butylfluorenyl) hafnium dichloride, di(p-triethylsilylphenyl)methylene(cyclopentadienyl)(3,8-di-t-butylfluorenyl) zirconium dimethyl, di(p-triethylsilylphenyl)methylene(cyclopentadienyl)(3,8-di-t-butylfluorenyl) hafnium dimethyl, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) zirconium dichloride, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) hafnium dichloride, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) zirconium dimethyl, and di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) hafnium dimethyl.

The catalyst may be activated (or pre-activated) with an appropriate activator (cocatalyst) including alumoxane compounds, modified alumoxane compounds, and ionizing anion precursor compounds that abstract one reactive, σ-bound, metal ligand making the metal complex cationic and providing a charge-balancing noncoordinating or weakly coordinating anion such as methylalumoxane (MAO) and N,N-dimethylanilinium tetrakis(pentafluorophenyl) borate. Additional preferred activators are those described at paragraphs [00121] to [00151] of WO 2004/026921]. Particularly preferred activators include those listed on page 77-78 at paragraph [00135] of WO 2004/026921.

The catalysts and catalyst systems described above are suitable for use in a solution, bulk, gas or slurry polymerization process or a combination thereof, preferably solution phase or bulk phase polymerization process.

In one embodiment, this invention is directed toward the solution, bulk, slurry or gas phase polymerization reactions involving the polymerization of one or more of monomers having from 3 to 30 carbon atoms, preferably 3-12 carbon atoms, and more preferably 3 to 8 carbon atoms. Preferred monomers include one or more of propylene, butene-1, pentene-1,4-methyl-pentene-1, hexene-1, octene-1, decene-1,3-methyl-pentene-1, and cyclic olefins or a combination thereof. Other monomers can include vinyl monomers, diolefins such as dienes, polyenes, norbornene, norbornadiene, vinyl norbornene, ethylidene norbornene monomers. Preferably a homopolymer or copolymer of propylene is produced. In another embodiment, both a homopolymer of propylene and a copolymer of propylene and one or more of the monomers listed above are produced.

One or more reactors in series or in parallel may be used in the present invention. Catalyst component and activator may be delivered as a solution or slurry, either separately to the reactor, activated in-line just prior to the reactor, or preactivated and pumped as an activated solution or slurry to the reactor. A preferred operation is two solutions activated in-line. For more information on methods to introduce multiple catalysts into reactors, please see U.S. Pat. No. 6,399,722, and WO0130862A1. While these references may emphasize gas phase reactors, the techniques described are equally applicable to other types of reactors, including continuous stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors.

In one embodiment 500 ppm or less of hydrogen may be added to the polymerization, or 400 ppm or less, or 300 ppm or less. In other embodiments at least 50 ppm of hydrogen may be added to the polymerization, or 100 ppm or more, or 150 ppm or more.

Functionalized Amorphous Syndiotactic Rich Polyolefins

The present invention may comprise the contact product of the above described amorphous syndiotactic rich polyolefin, a functional group, and a functionalization catalyst, which results in a functionalized amorphous syndiotactic rich polyolefin (F-srPO). Preferably, the amorphous syndiotactic rich polyolefin is amorphous syndiotactic rich polypropylene, the functional group is maleic anhydride, and a functionalization catalyst is an organic peroxide, which may result in a contact product comprising a amorphous syndiotactic rich polypropylene functionalized with maleic anhydride.

Accordingly, the present invention may comprise the above described amorphous syndiotactic rich polyolefin which has been further functionalized with one or more additional compounds to impart one or more functionalities into the polyolefin. This functionalized amorphous syndiotactic rich polyolefin is preferably amorphous syndiotactic rich polypropylene, functionalized with maleic anhydride. Accordingly, the amorphous syndiotactic rich polyolefin may be functionalized with an unsaturated compound (e.g., compounds comprising a carbon-carbon double bond, a carbon-carbon triple bond, and/or a compound comprising a heteroatom (e.g., B, N, O, Si, P, halogens (e.g., F, Cl, Br, I), and/or S). The functional group may comprise an aromatic compound, a vinyl compound, an organic acid, an organic amide, an organic amine, an organic ester, an organic di-ester, an organic imide, an organic anhydride, an organic alcohol, an organic acid halide, an organic-peroxide, and/or salts or derivatives thereof For ease of reference, unless otherwise stated, unsaturated compound(s) and/or compound(s) comprising a heteroatom are collectively referred to herein as "a functional group or functional groups, (abbreviated FG)". By functionalized (or grafted) it is meant that one or more functional group(s) are incorporated, grafted, bonded to, physically and/or chemically attached to the amorphous syndiotactic rich polyolefin (a-srPP) of the present invention, to produce an amorphous syndiotactic rich polyolefin functionalized with a functional group (abbreviated "a-srPP-g-FG", where "-g-FG" represents the grafted functional group). Functionalization of the polyolefin preferably occurs at or on the polymer backbone, but may also occur at the polymer ends, and on portions of the polymer which are pendant to the polymer backbone. Functionalization may also occur at other functional groups, and between various polymer chains.

In a preferred embodiment the functionalized syndiotactic rich polyolefin is essentially amorphous in that essentially all of the a-srPP-g-FG of the present invention is soluble in hexane, cyclohexane, xylene or toluene at room temperature. As such, at least about 95 wt %, preferably at least about 96 wt %, preferably at least about 97 wt %, preferably at least about 98 wt %, preferably at least about 99 wt %, preferably at least about 99.5 wt % of the a-srPP-g-FG is soluble in hexane, cyclohexane, xylene or toluene at room temperature, based on the total weight of the a-srPP-g-FG present.

As an exemplary embodiment, functional groups (i.e., compounds comprising a functional group) may be grafted onto an amorphous syndiotactic rich polypropylene (a-srPPr) utilizing radical copolymerization as described in detail herein, which may include use of a free radical initiator. Such a process is referred to herein as graft copolymerization. The end result being a functionalized amorphous syndiotactic rich propylene polymer or blend of functionalized polymers. Accordingly, the present invention comprises the result of contacting a polyolefin, preferably an amorphous syndiotactic rich polyolefin, with a functional group in the presence of a free radical initiator.

Preferred examples of functional groups include unsaturated carboxylic acids and salts thereof, along with acid derivatives including, but are not limited to, maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo (2.2.2)oct-5-ene-2,3-dicarboxylic acid anhydride, 1,2,3,4, 5,&g, 1o-octahydronaphthalene-2,3-dicarboxylic acid anhydride, 2-oxa-1,3-diketospiro(4.4)non-7-ene, bicyclo(2.2.1) hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and/or x-methyl-bicyclo(2.2.1)hept-5-ene-2,3-dicarboxylic acid anhydride (XMNA).

Examples of the esters of the carboxylic acids include esters of unsaturated carboxylic acids including methyl acrylate, ethyl acrylate, butyl acrylate, methyl methacrylate, ethyl methacrylate and butyl methacrylate.

Hydrolyzable unsaturated silane compounds may include radical polymerizable unsaturated group and an alkoxysilyl group or a silyl group in its molecule, such that the compound has a hydrolyzable silyl group bonded to a vinyl group and/or a hydrolyzable silyl group bonded to the vinyl group via an alkylene group, and/or a compound having a hydrolyzable silyl group bonded to an ester or an amide of acrylic acid, methacrylic acid or the like. Examples thereof include vinyltrichlorosilane, vinyltris(beta-methoxyethoxy)silane, vinyl-triethoxysilane, vinyltrimethoxysilane, gamma-methacryloxypropyltrimethoxysilane monovinylsilane and monoallylsilane.

Examples of unsaturated halogenated hydrocarbons include vinyl chloride and vinylidene chloride.

Preferable examples of the radical initiator used in the graft copolymerization include organic peroxides such as benzoyl peroxide, methyl ethyl ketone peroxide, cyclohexanone peroxide, t-butylperoxyisopropyl carbonate, di-ti-butyl perphthalate, 2,5-dimethyl-2,5-di(t-butylperoxy)hexene (Lupersol 101, ElfAtochem), 2,5-dimethyl-2,5-di(t-butylperoxy) hexene-3, di-t-butyl peroxide, cumene hydroperoxide, t-butyl hydroperoxide, dilauryl peroxide and dicumyl peroxide.

In a preferred embodiment, a-srPPr may be grafted with maleic anhydride (MA), to produce the functionalized amorphous syndiotactic rich polypropylene grafted with maleic anhydride (a-srPPr-g-MA), wherein the maleic anhydride may be covalently bonded to any one of the polymer chains of which the a-srPPr is comprised. The anhydride functionality grafted onto the polymer may remain as an anhydride, may be oxidized into acid and/or aldehyde functional groups, and/or may be further reacted by processes known in the art to induce other derivatives of the functional group such as amides, amines, esters, acid salts, and the like.

In a preferred embodiment the functional group is present in the functionalized polymer (e.g., a-srPP-g-FG) at about 0.005 to 99 wt %, based on the total weight of the functionalized polyolefin present. In a preferred embodiment, the functional group is present at about 0.01 to 99 wt %, preferably 0.05 to 90 wt %, preferably at 0.1 to 75 wt %, more preferably at 0.5 to 60 wt %, more preferably at 0.5 to 50 wt %, more preferably at 0.5 to 40 wt %, more preferably at 0.5 to 30 wt %, more preferably at 0.5 to 20 wt %, more preferably at 0.5 to 15 wt %, more preferably at 0.5 to 10 wt %, more preferably at 0.5 to 5 wt %, more preferably at 0.5 to 3 wt %, more preferably at 0.5 to 2 wt %, more preferably at 0.5 to 1 wt %, based upon the total weight of the functionalized polyolefin or blend thereof present.

In a still more preferred embodiment, the functionalized amorphous polyolefin is amorphous syndiotactic rich polypropylene grafted maleic anhydride (a-srPPr-g-MA). In yet a more preferred embodiment, the functional group maleic anhydride, is present in the polymer or polymer blend comprising amorphous syndiotactic rich polypropylene at a concentration of about 0.005 to 10 wt % MA, more preferably 0.01 to 10 wt % MA, more preferably at 0.5 to 10 wt % MA, more preferably at 0.5 to 5 wt % MA, more preferably at 1 to 5 wt % MA, more preferably at 1 to 2 wt % MA, more preferably at 1 to 1.5 wt % MA, as determined as described herein and based upon the weight of the functionalized amorphous syndiotactic rich polypropylene or blend thereof present.

The functionalized amorphous syndiotactic rich polyolefin of the present invention (a-srPP-FG), preferably amorphous syndiotactic rich polypropylene functionalized with maleic anhydride (a-srPPr-g-MA) may comprise at least about 50% r-dyads, and less than about 80% r-dyads, as determined according to the Ewen method. In a preferred embodiment, a-srPPr-g-MA may include at least about 55% r dyads, preferably at least about 60% r dyads, preferably at least about 65% r dyads, preferably at least about 70% r dyads, preferably at least about 75% r dyads, more preferably less than about 80% r-dyads, based on the total number of r and m dyads present in the polymer.

A functionalized amorphous syndiotactic rich polyolefin polymer (a-srPP-g-FG), preferably amorphous syndiotactic rich polypropylene functionalized with maleic anhydride (a-srPPr-g-MA) may comprise about 6.25% to about 31.6% r-pentads, based on the total number of r-pentads present in the polymer. In a preferred embodiment, a-srPP-g-FG may include about 9.15% r-pentads to about 31.6% r-pentads, preferably about 13.0% r-pentads to about 31.6% r-pentads, preferably about 13.0% r-pentads to about 24.0% r-pentads, preferably about 17.9% r-pentads to about 24.0% r-pentads, based on the total number of r-pentads present in the polymer.

In a preferred embodiment, the functionalized amorphous syndiotactic rich polyolefin polymer is a functionalized amorphous syndiotactic rich polypropylene (a-srPPr-g-FG), preferably amorphous syndiotactic rich polypropylene functionalized with maleic anhydride (a-srPPr-g-MA). The a-srPPr-g-FG, preferably amorphous syndiotactic rich polypropylene functionalized with maleic anhydride (a-srPPr-g-MA), preferably has a weight average molecular weight (Mw) of 5,000,000 or less, preferably about 5000 to about 5,000,000; a number average molecular weight (Mn) of about 3,000,000 or less, preferably about 5000 to about 3,000,000; and a z-average molecular weight (Mz) of about 10,000,000 or less, preferably about 5000 to about 10,000,000;, all of which may be determined by size exclusion chromatography, e.g., 3D SEC, also referred to as GPC-3D as described herein.

In a preferred embodiment, the a-srPPr-g-FG of the present invention, preferably amorphous syndiotactic rich polypropylene functionalized with maleic anhydride (a-srPPr-g-MA), may have a Mw of about 5,000 to about 1,000,000 g/mole, more preferably a Mw of about 10,000 to about 500,000, more preferably a Mw of about 20,000 to about 300,000, more preferably a Mw of about 50,000 to about 200,000, wherein Mw is determined as described herein.

In a preferred embodiment, the a-srPPr-g-FG of the present invention, preferably amorphous syndiotactic rich polypropylene functionalized with maleic anhydride (a-srPPr-g-MA), may have a Mn of about 2,000 to about 500,000 g/mole, more preferably a Mn of about 5,000 to about 300,000, more preferably a Mn of about 10,000 to about 200,000, more preferably a Mn of about 20,000 to about 150,000, wherein Mn is determined as described herein.

In a preferred embodiment, the a-srPPr-g-FG of the present invention, preferably amorphous syndiotactic rich polypropylene functionalized with maleic anhydride (a-srPPr-g-MA), may have a Mz of about 10,000 to about 10,000,000 g/mole, more preferably a Mz of about 20,000 to about 1,000,000, more preferably a Mz of about 40,000 to about 500,000, more preferably a Mz of about 100,000 to about 400,000, wherein Mz is determined as described herein.

In a preferred embodiment, the a-srPPr-g-FG of the present invention, preferably amorphous syndiotactic rich polypropylene functionalized with maleic anhydride (a-srPPr-g-MA), may have a crystallization temperature (Tc) measured with differential scanning calorimetry (DSC) of about 140° C. or less, more preferably, 100° C. or less, more preferably no crystallization temperature is not discernable.

In a preferred embodiment, the a-srPPr-g-FG of the present invention, preferably amorphous syndiotactic rich polypropylene functionalized with maleic anhydride (a-srPPr-g-MA), may have a melt flow rate (MFR), which is inversely related to weight average molecular weight Mw, equal to or greater than 0.2 g/10 min., preferably between 2-500 g/10 min. and more preferably between 20-200 g/10 min., as measured per the ASTM D-1238 (190c,2.16 kg)test method.

The amorphous syndiotactic rich polyolefin of the a-srPPr-g-FG, preferably amorphous syndiotactic rich polypropylene functionalized with maleic anhydride (a-srPPr-g-MA), may include alpha olefins within the base polymer. For example, a-srPPr-g-FG may include propylene ($C_3$) as the base polymer, along with ethylene ($C_2$) and from $C_4$ to $C_{40}$ alpha olefins, preferably $C_4$ to $C_{20}$ alpha olefins, more preferably $C_4$ to $C_{12}$ alpha olefins, with $C_2$ and $C_4$ to $C_{10}$ alpha olefins being still more preferred.

Examples of preferred alpha olefins include butene-1, pentene-1, hexene-1, heptene-1, octene-1, nonene-1, decene-1, undecene-1, dodecene-1, tridecene-1, penetdecene-1, hexadecene-1, heptadecene-1, octadecene-1, and branched olefins including 3-methylbutene-1,4-methylepentene-1, and 4,4-dimethylepentene-1.

The amount of alpha olefins in addition to the base polymer, when present in the a-srPPr-g-FG, preferably amorphous syndiotactic rich polypropylene functionalized with maleic anhydride (a-srPPr-g-MA), may be greater than about 0.001% by weight (wt %), based on the total weight of the polymer. Preferably, the amount of the alpha olefins is greater than or equal to about 0.1 wt %, more preferably greater than or equal to about 1 wt %. The other alpha olefins may also be present in the base polymer at about 50 wt % or less. Preferably, the amount of the other alpha olefins is less than or equal to about 20 wt %, more preferably less than or equal to about 10 wt %.

In a preferred embodiment, the a-srPP-g-FG, more preferably the a-srPPr-g-FG, still more preferably amorphous syndiotactic rich polypropylene functionalized with maleic anhydride (a-srPPr-g-MA) of the present invention may have a heat of fusion (Hf) determined according to the procedure described in ASTM E 794-85, which is less than or equal to about 10 Joules/g, preferably less than or equal to about 9 Joules/g, preferably less than or equal to about 8 Joules/g, preferably less than or equal to about 7 Joules/g, preferably less than or equal to about 6 Joules/g, preferably less than or equal to about 5 Joules/g, preferably less than or equal to about 4 Joules/g, preferably less than or equal to about 3 Joules/g, preferably less than or equal to about 2 Joules/g, preferably less than or equal to about 1 Joule/g, still more preferably, a heat of fusion which is not detectable according to the procedure described in ASTM E 794-85.

In a preferred embodiment, the a-srPP, more preferably the a-srPPr, prior to functionalization into a-srPP-g-FG of the present invention, preferably amorphous syndiotactic rich polypropylene functionalized with maleic anhydride (a-srPPr-g-MA), may have an ash content, determine according to the procedure described in ASTM D 5630, which is less than or equal to about 1 wt %, based on the total amount of the polymer present, more preferably less than or equal to about 0.9 wt %, more preferably less than or equal to about 0.8 wt %, more preferably less than or equal to about 0.7 wt %, more preferably less than or equal to about 0.6 wt %, more preferably less than or equal to about 0.5 wt %, more preferably less than or equal to about 0.4 wt %, more preferably less than or equal to about 0.3 wt %, more preferably less than or equal to about 0.2 wt %, more preferably less than or equal to about 0.1 wt %, more preferably less than or equal to about 0.05 wt %, more preferably less than or equal to about 0.01 wt %, more preferably less than or equal to about 0.005 wt %, with an ash content, as determined according to ASTM D 5630 of less than or equal to about 0.001 wt % ash content being still more preferred.

In a preferred embodiment, the functionalized amorphous syndiotactic rich polyolefin, preferably amorphous syndiotactic rich polypropylene functionalized with maleic anhydride (a-srPPr-g-MA), is heat stable, by which is meant that the Gardner color of the a-srPP-g-FG (as determined by ASTM D-1544-68) that has been heat aged (e.g., maintained) at or 180° C. for 48 hours, does not change by more than 7 Gardner units when compared to the Gardner color of the initial composition. Preferably, the Gardner color of the functionalized polymer or composition comprising the functionalized polymer, after heating above its melting point for 48 hours, does not change by more than 6, more preferably 5, still more preferably 4, still more preferably 3, still more preferably 2, still more preferably 1 Gardner color unit, as compared to the initial functionalized polymer prior to being heated (e.g., prior to heat aging).

In the case of amorphous syndiotactic rich polypropylene functionalized (e.g., grafted) with maleic anhydride (a-srPPr-g-MA) it has been discovered that free acid groups present in the composition may result in reduced heat stability. Accordingly, in a preferred embodiment, the amount of free acid groups present in the a-srPPr-g-MA, or blend comprising a-srPPr-g-MA, is less than about 1000 ppm, more preferably less than about 500 ppm, still more preferably less than about 100 ppm, based on the total weight of the a-srPPr-g-MA present.

It has also been discovered that various phosphites may contribute to instability. Accordingly, in yet another preferred embodiment, the a-srPP-g-FG, more preferably the a-srPPr-g-MA, is essentially free from phosphites, by which it is meant that phosphites are present at 100 ppm or less, based on the weight of a-srPP-g-FG, more preferably the a-srPPr-g-MA.

In another embodiment, the functionalized syndiotactic rich polyolefin (F-srPO) (such as a maleic ahydride or maleic acid grafted syndiotactic rich polypropylene) is present in the adhesive of the invention at 5 wt.% or less, preferably 4 wt.% or less, preferably 3 wt.% or less, preferably 2 wt.% or less, preferably 1 wt.% or less preferably at 0 wt.%, based upon the weight of the composition.

Functionalization of an Amorphous Syndiotactic Rich Polyolefin

Functionalization of an amorphous syndiotactic rich polyolefin (a-srPP) with a functional group (FG) to produce a functionalized amorphous syndiotactic rich polyolefin (a-srPP-g-FG), preferably amorphous syndiotactic rich polypropylene functionalized with maleic anhydride (a-srPPr-g-MA) of the present invention, may be obtained by contacting the polymer to be functionalized along with the functional group, preferably in the presence of the radical initiator. In an preferred embodiment, the combination is heated to a temperature at, near, or above the decomposition temperature of one or more of the radical initiator(s) being used.

In some embodiments, no particular restriction need be put on the amount of functional group to be used, accordingly, conventional conditions such as may be utilized for functionalizing an isotactic polypropylene may be used to produce the functionalized amorphous syndiotactic rich polyolefin, preferably amorphous syndiotactic rich polypropylene functionalized with maleic anhydride (a-srPPr-g-MA) of the present invention. Since in some cases the efficiency of the copolymerization is relatively high, the amount of the functional group may be small (i.e., less than or equal to about 1 wt % functional group, based on the total weight of the functionalized polymer.

The radical initiator is preferably used in a ratio of from 0.00001 to 10 wt %, based on the weight of the functional group. When applicable, the heating temperature depends upon whether or not the contact (e.g., the reaction) of the polymer, the functional group, and the radical initiator when used, is carried out in the presence of a solvent. The contact temperature is preferably greater than about 0° C. and less than about 500° C., with from about 50° C. to 350° C. being more preferred. When the heating temperature is less than 50° C., the reaction may be slow and thus efficiency may be low. When it is more than 350° C., decomposition of the polymer or other components may occur. Accordingly, the a-srPP, preferably the a-srPPr of the present invention may be functionalized with a functional group utilizing a solvent based functionalization process and/or utilizing a melt based functionalization process without a solvent.

In the solvent based process, the reaction may be carried out using the a-srPP, preferably the a-srPPr in solution, or as a slurry having a concentration of from 0.1 to 50 wt % in the presence of a halogenated hydrocarbon compound having 2 to 20 carbon atoms, an aromatic compound, a halogenated aromatic compound, and/or an alkyl substituted aromatic hydrocarbon which is stable to the radicals.

Importantly, it has been discovered herein that, amorphous polyolefins, more preferably amorphous syndiotactic rich polyolefins, still more preferably amorphous syndiotactic rich polypropylene of the present invention, may functionalized in aliphatic solvents including cyclic hydrocarbons, and/or hydrocarbons having 6 to 20 carbon atoms. Preferred aliphatic solvents include cyclohexane, hexane, and mixtures comprising cyclohexane and/or hexane.

Accordingly, this unexpected discovery thus may avoid use of aromatic and/or halogenated solvents and thus the present invention may by utilized to reduce environmental issues and restraints that may be associated with the use of aromatic and/or halogenated solvents, especially in mass production. This discovery also provides for direct use of a polymer solution from a polymerization reactor for functionalization, thus avoiding an added finishing and/or re-dissolving step(s), as described in more detail herein. Further, this discovery also allows for the advantages associated with the use of solvents having lower boiling points than those associated with aromatic solvents. Use of solvents in functionalization having boiling points below that of benzene, toluene, xylene, or the like, for example, will facilitate removal of solvent from the functionalized polymer at a lower temperature and/or higher pressure relative to a particular aromatic solvent. Lower temperature removal may thus result in less degradation of the polymer, more efficient solvent removal, and an increase in productivity/lower cost of solvent removal resultant from operation at a lower temperature and/or a higher pressure relative to operational conditions required for solvent removal of an aromatic solvent.

In the functionalization process utilizing a melt based functionalization process the reaction may be carried out with little or no solvent present, preferably in the absence of the solvent, in a device such as an extruder, a mixer, or the like, which can produce sufficient physical contact between what may be highly viscous components to affect contact and thus functionalization of the amorphous syndiotactic rich polyolefin. In the melt based functionalization process, the functionalization reaction may be effected at a relatively high temperature as compared to the same reaction a solution or solvent based functionalization process.

Other methods for functionalizing the a-srPP, preferably the a-srPPr of the present invention may include, but are not limited to, selective oxidation, ozonolysis, epoxidation, and the like, both in solution or slurry (i.e., with a solvent and or diluent), or in a melt or mixer (i.e., without a solvent).

In the present invention, the functionalization (e.g., graft polymerization) may also be carried out in an aqueous medium. In this case one or more dispersants may be used. Examples of suitable dispersants include: saponified polyvinyl acetate, modified celluloses such as hydroxyethyl cellulose and hydroxypropyl cellulose, and compounds containing an OH group such as polyacrylic acid and polymethacrylic acid. In addition, compounds which are used in a usual aqueous suspension polymerization can also be widely employed.

The aqueous functionalization may be carried out by suspending the polymer, the functional group, the water-insoluble radical initiator and/or the dispersant in water, and then heating the mixture. Here, a ratio of water to the sum of the functional group is preferably 1:0.1 to 1:200, more preferably 1:1 to 1:100. The heating temperature is such that the half-life of the radical initiator is preferably from 0.1 to 100 hours, more preferably from 0.2 to 10 hours, and it is preferably from 30° to 200° C., more preferably from 40° to 150° C. In the heating step, it is preferred that the mixture is stirred sufficiently so as to become in a suspension state. In this way, the grafted polyolefin may be obtained in granular form.

A weight ratio of the functional group to the polyolefin or blend comprising the polyolefin to be functionalized may preferably be from 1:01 to 1:10000, and a weight ratio of the radical initiator to the functional group may be from 0.00001 to 0.1.

As stated above, the presence of free acid groups and phosphites in functionalized srPP may affect heat stability of the a-srPP-g-FG, in particular with respect to a-srPPr-g-MA. The concentration of free acid groups and other moieties which may negatively affect heat stability in a-srPPr-g-MA may be reduced and/or controlled by:

1. Reaction control, wherein the materials are contacted at a temperature, and for a period of time sufficient to insure an essentially complete reaction and thus essentially complete consumption of the added functional group (e.g., maleic anhydride) during the functionalization process;
2. Post washing, wherein the functionalized polymer is contacted (e.g., washed) at least once with a solvent, with water, with a dilute acid, with a dilute base, or a combination thereof, after the functionalization reaction;
3. Master batching, wherein a master batch of functionalized polymer is produced and/or processed to be essentially free from free acid groups and/or other moieties, and wherein the master batch has a concentration of maleic anhydride functional groups above that required in the final composition, and wherein the master batch is blended in the final blend (also referred to as being "let down") in an amount sufficient to produce the desired level of a-srPP-FG, preferably a-srPPr-MA, in the final blend; or 4. Moisture control, wherein moisture (e.g., water) level in the functionalized polymer is kept at a level which maintains the anhydride functionality of the anhydride (e.g., MA).

Solution functionalization utilizing an aliphatic solvent is a preferred functionalization method to improve heat stability of a-srPP-FG, preferably a-srPPr-g-MA.

For reaction in solution, the a-srPP may be dissolved in an appropriate solvent (e.g., an aromatic solvent such as benzene, toluene, or xylene, or an aliphatic solvent such as hexane or cyclohexane). After the solution containing a-srPP is heated to the desired temperature (e.g., from about 60 to 150° C.), a free radical initiator and a functional group (e.g., a reactive amide and/or maleic anhydride) may be added to initiate the grafting process. After stirring for about 30 min. to about 5 hr or more, the solution is precipitated into a second solvent such as acetone, to separate functionalized polymer from unreacted modifier. The filtered product may then be dried under vacuum (e.g., at 120° C.) to afford the final functionalized amorphous polyolefin product.

Accordingly, in one embodiment, functionalization process may comprise the steps of:

1) providing olefin monomer (e.g., propylene), catalyst, activator and the like to a reactor in hexane or a mixture of aliphatic solvents;

2) catalytic solution polymerization;

3) monomer stripping;

4) solvent removal and product drying to produce polymer;

5) redissolution of polymer in non-aliphatic solvent (e.g., benzene, toluene, or non-hydrocarbon solvent) for solution functionalization;

6) solvent based functionalization; and 7) removal of solvent used in solvent based functionalization.

In a preferred embodiment, functionalization process may comprise the steps of:

1) providing olefin monomer (e.g., propylene), catalyst, activator and the like to a reactor in hexane or a mixture of aliphatic solvents;

2) catalytic solution polymerization;

3) monomer stripping;

4) solvent based functionalization; and 5) separation of the functionalized polyolefin (e.g., via precipitation upon addition of a solvent, temperature control, and/or removal of solvent used in solvent based functionalization. Such a preferred process can be realized by a continuous stirred tank reactor or sequential reactor tank.

Accordingly, a method to produce the functionalized amorphous syndiotactic rich polyolefin of the present invention may comprise the steps of:

1) providing an olefin monomer, metallocene catalyst, and an activator to a reactor in an aliphatic solvent;

2) catalytic solution polymerization of the olefin monomer in the reactor to produce an amorphous syndiotactic rich polyolefin;

3) monomer stripping to remove unreacted olefin monomer;

4) solvent based functionalization; comprising contacting the amorphous syndiotactic rich polyolefin with a functional group in the presence of a free radical initiator in the aliphatic solvent utilized in the solution polymerization step, at a temperature and for a period of time sufficient to produce the functionalized amorphous syndiotactic rich polyolefin; and optionally, 5) precipitation of functionalized amorphous syndiotactic rich polyolefin via addition of a solvent such as acetone, and/or the removal of the aliphatic solvent.

It is desirable to functionalize propylene-based homopolymers and copolymers in solution for best control of the functionalization chemistry. It is further desirable in some applications that the functionalized polymer can be delivered to target application—such as primer for a TPO bumper—in solution.

Functionalization in a melt involves a process similar to that in solution, except that no solvent is required, the reaction takes place in a mixing device (e.g., an extruder or Brabender), and the temperature may be higher than that used in the solvent based process. Accordingly, a method to produce the functionalized amorphous syndiotactic rich polyolefin of the instant invention may comprise the steps of:

A. providing a melt comprising an amorphous syndiotactic rich polyolefin, a functional group, and a free radical initiator to a mixing device; and B. contacting said melt within said mixing device at a temperature and for a period of time sufficient to produce the functionalized amorphous syndiotactic rich polyolefin.

In a preferred embodiment, the method may comprise the steps of:

A. providing a melt comprising an amorphous syndiotactic rich polypropylene, maleic anhydride, and an organic peroxide as a free radical initiator to a mixing device; and B. contacting the melt within the mixing device at a temperature and for a period of time sufficient to produce a-srPP-g-MA of the present invention.

In a preferred embodiment, wherein a nanoclay may be added to the polymer, a method to produce a functionalized amorphous syndiotactic rich polyolefin may comprise the steps of:

A. providing a melt comprising an amorphous syndiotactic rich polyolefin, a functional group, and a free radical initiator to a mixing device;

B. contacting said melt within said mixing device at a temperature and for a period of time sufficient to produce said functionalized amorphous syndiotactic rich polyolefin, wherein the amorphous syndiotactic rich polyolefin comprises greater than about 50 wt % $C_3$-$C_{40}$ alpha olefins;

about 50% to less than about 80% r dyads, based on the total number of r and m dyads present in the polyolefin;

and a heat of fusion of 10 joules/g or less according to the procedure described in ASTM E 794-85.

Preferably, the method includes wherein the amorphous syndiotactic rich polyolefin further comprises an ash content of 1 wt % or less, and/or wherein the functionalized amorphous syndiotactic rich polyolefin is amorphous syndiotactic rich polypropylene functionalized with maleic anhydride, and/or further comprising the addition of an organoclay after said contacting step B.

Functionalized iPP-g-aPP Polymer Component

In an embodiment, the functionalized polymer component may comprise a polymer wherein isotactic polypropylene is grafted to atactic polypropylene (iPP-g-aPP) which has been functionalized using the method to functionalize a-srPP as described above.

Polymers referred to herein as "iPP-g-aPP's" or "iPP-g-aPP polymers" useful in this invention are those described in U.S. Ser. No. 10/686,951, filed Oct. 15, 2003 and U.S. Ser. No. 10/687,508, filed Oct. 15, 2003, which are incorporated by reference herein. In particular, pages 23 to 91 of U.S. Ser. No. 10/686,951 and pages 22 to 168 of U.S. Ser. No. 10/687,508 provide specific instruction on how to produce the iPP-g-aPP polymers useful herein. In general preferred iPP-g-aPP's comprise a polypropylene prepared utilizing two or more catalysts (typically metallocene catalysts), wherein one catalyst is selected as being capable of producing essentially atactic polypropylene (aPP), and the other metallocene catalyst is selected as being capable of producing isotactic polypropylene (iPP) under the polymerization conditions utilized. Preferably, under the polymerization conditions utilized, incorporation of aPP and iPP polymer chains may occur within the in-reactor blend such that an amount of amorphous polypropylene present in the iPP-g-aPP polymer is grafted to isotactic polypropylene, represented herein as (aPP-g-iPP) and/or such that an amount of isotactic polypropylene present in the iPP-g-aPP polymer is grafted to amorphous polypropylene, represented herein as (iPP-g-aPP).

The functionalized iPP-g-aPP polymer component, preferably (iPP-g-aPP)-g-MA, may have a percent elongation at break of 50 to 1000%, preferably 80 to 200%, according to the procedure described in ASTM D 638 modified to use a "small" dumbbell having a base of about 1 cm×1 cm and a center, narrow strip of about 0.6 cm×0.2 cm, and a 850 µm per second separation speed, as described above. In a preferred embodiment, the functionalized iPP-g-aPP polymer component, preferably (iPP-g-aPP)-g-MA, of the present invention may have a percent elongation at break of 100 to 500%.

The functionalized iPP-g-aPP polymer component, preferably (iPP-g-aPP)-g-MA, may have a tensile strength at break (as measured by ASTM D 638 modified to use a "small" dumbbell having a base of about 1 cm×1 cm and a center, narrow strip of about 0.6 cm×0.2 cm, and a 850 µm per second separation speed, as described above) of 0.5 MPa or more, alternatively 0.75 MPa or more, alternatively 1.0 MPa or more, alternatively 1.5 MPa or more, alternatively 2.0 MPa or more, alternatively 2.5 MPa or more, alternatively 3.0 MPa or more, alternatively 3.5 MPa or more.

The functionalized iPP-g-aPP polymer component, preferably (iPP-g-aPP)-g-MA, may have a weight average molecular weight (Mw) of 60,000 or less, a number average molecular weight (Mn) of about 20,000 or less, a z-average molecular weight (Mz) of about 110,000 or less, and a g' index of 0.99 or less, preferably of 0.93 or less, measured at the weight-average molecular weight (Mw) of the polymer using isotactic polypropylene as the baseline (e.g., PP4612E2 polypropylene available from ExxonMobil Chemical Company), all of which may be determined by size exclusion chromatography, e.g., 3D SEC, also referred to as GPC-3D as described herein.

In a preferred embodiment, the functionalized iPP-g-aPP polymer component, preferably (iPP-g-aPP)-g-MA, may have a Mw of about 20,000 to about 50,000 g/mole, more preferably a Mw of about 30,000 to about 45,000, wherein Mw is determined as described herein.

In a preferred embodiment, the functionalized iPP-g-aPP polymer component, preferably (iPP-g-aPP)-g-MA, may have a Mn of about 7,000 to about 20,000 g/mole, more preferably a Mn of about 10,000 to about 15,000, wherein Mn is determined as described herein.

In a preferred embodiment, the functionalized iPP-g-aPP polymer component, preferably (iPP-g-aPP)-g-MA, may have a Mz of about 40,000 to about 100,000 g/mole, more preferably a Mz of about 60,000 to about 90,000, wherein Mz is determined as described herein.

The molecular weight distribution index (MWD=(Mw/Mn)) of the functionalized iPP-g-aPP polymer component, preferably (iPP-g-aPP)-g-MA, may have be about 1.5 to 40.0, more preferably about 1.8 to 10 and most preferably about 1.8 to 7.

In a preferred embodiment, the functionalized iPP-g-aPP polymer component, preferably (iPP-g-aPP)-g-MA, may have a g' index value of 0.93 or less, preferably 0.65 or less; preferably between 0.45 to 0.65 when measured at the Mw of the polymer using the intrinsic viscosity of isotactic polypropylene as the baseline.

In a preferred embodiment, the functionalized iPP-g-aPP polymer component, preferably (iPP-g-aPP)-g-MA, may have a crystallization temperature (Tc) measured with differential scanning calorimetry (DSC) of about 200° C. or less, more preferably, 150° C. or less.

In a preferred embodiment, The functionalized iPP-g-aPP polymer component, preferably (iPP-g-aPP)-g-MA, may have a heat of fusion (Hf) determined according to the procedure described in ASTM E 794-85, which is less than about 75 J/g. preferably greater than or equal to about 0.5 J/g, and is less than or equal to about 75 J/g. Preferably less than or equal to about 50 Joules/g, preferably less than or equal to about 30 J/g, with less than or equal to about 25 J/g more preferred. Also preferably greater than or equal to about 1 J/g, preferably greater than or equal to about 5 J/g according to the procedure described in ASTM E 794-85.

Functionalized $C_2$-$C_{20}$ Polymers

In an embodiment, the adhesive composition may comprise a functionalized polymer component wherein the functionalized polymer component comprises various $C_2$-$C_{20}$ polyolefin polymers ("polymers"), which have been functionalized as described herein. A Suitable $C_2$-$C_{20}$ functionalized polymer component may comprise a single discrete polymer, or a blend of discrete polymers. Such blends may include two or more polyolefins such as polypropylene-polyethylene copolymers, two or more polypropylene copolymers, where each of the components of the polymer blend would individually qualify as a $C_2$-$C_{20}$ functionalized polymer component.

In a preferred embodiment the $C_2$-$C_{20}$ functionalized polymer component may comprises a metallocene polyethylene (mPE) and/or metallocene polypropylene (mPP) which has been functionalized. The mPE and mPP homopolymers or copolymers are typically produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings by may substituted or unsubstituted. Several commercial products produced with such catalyst/activator combinations are commercially available from ExxonMobil Chemical Company in Baytown, Tex. under the trade names EXCEED™, ACHIEVE™ and EXACT™. For more information on the methods and catalysts/activators to produce such mPE homopolymers and copolymers see WO 94/26816; WO 94/03506; EPA 277,003; EPA 277,004; U.S. Pat. Nos. 5,153,157; 5,198,401; 5,240,894; 5,017,714; CA 1,268,753; U.S. Pat. No. 5,324,800; EPA 129,368; U.S. Pat. No. 5,264,405; EPA 520,732; WO 92 00333; U.S. Pat. Nos. 5,096,867; 5,507,475; EPA 426 637; EPA 573 403; EPA 520 732; EPA 495 375; EPA 500 944; EPA 570 982; W091/09882; W094/03506 and U.S. Pat. No. 5,055,438.

In another embodiment, the $C_2$-$C_{20}$ functionalized polymer component may comprise homopolypropylene, propylene copolymerized with up to 50 wt % of ethylene or a $C_4$ to $C_{20}$ alpha-olefin, isotactic polypropylene, highly isotactic polypropylene (e.g., having greater than about 50% m-pentads), syndiotactic polypropylene, copolymers of propylene and ethylene and/or butene and/or hexene, polybutene, ethylene vinyl acetate, low density polyethylene (density 0.915 to less than 0.935 g/cm$^3$) linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), ethylene vinyl acetate, ethylene methyl acrylate, copolymers of acrylic acid, terpolymers of ethylene acrylic acid and methyl methacrylate, zinc, magnesium or sodium ionomers, polymethylmethacrylate or any other polymers polymerizable by a high-pressure free radical process, polyvinylchloride, polybutene-1, isotactic polybutene, ABS resins, elastomers such as ethylene-propylene rubber (EPR), vulcanized EPR, EPDM, block copolymer elastomers such as SBS, nylons (polyamides), polycarbonates, PET (polyester resins), crosslinked polyethylene, copolymers of ethylene and vinyl alcohol (EVOH), polymers of aromatic monomers such as polystyrene, poly-1 esters, graft copolymers generally, polyacrylonitrile homopolymer or copolymers, thermoplastic polyamides, polyacetal, polyvinylidine fluoride and other fluorinated elastomers, polyethylene glycols and copolymers of isobutylene and para methyl styrene, polybutadiene, polyisoprene, block copolymers of styrene and butadiene, hydrogenated block copolymers of styrene and butadiene (SEBS) wherein any of the above $C_2$-$C_{20}$ polymers has been functionalized with a functional group, as described above.

In a preferred embodiment, the $C_2$-$C_{20}$ functionalized polymer component may comprise propylene, one or more comonomers (such as ethylene, alpha-olefins having 4 to 8 carbon atoms, and styrenes) and optionally one or more α, ω dienes. The amount of diene is preferably no greater than about 10 wt %, more preferably no greater than about 5 wt %. Preferred dienes include those used for vulcanization of ethylene propylene rubbers, preferably ethylidene norbornene, vinyl norbornene, dicyclopentadiene, and 1,4-hexadiene.

In an embodiment, the $C_2$-$C_{20}$ functionalized polymer component may comprise two or more polypropylene copolymers, each of which preferably differ in α-olefin content, with one being in the range of 7 to 13 mol % α-olefin while the other is in the range of 14 to 22 mol % α-olefin. The preferred α-olefin is ethylene. In still another embodiment, the $C_2$-$C_{20}$ functionalized polymer component comprises 13 to 23 mol % ethylene. The use of two-polymer components may lead to beneficial improvements in the tensile-elongation properties of the final blends.

In an embodiment, a $C_2$-$C_{20}$ functionalized polymer component suitable for use in the adhesive composition may also include amorphous syndiotactic rich $C_3$-$C_{40}$ homopolymer or copolymer, and/or an at least partially crystalline syndiotactic rich $C_3$-$C_{40}$ homopolymer or copolymer. An at least partially crystalline polyolefin being defined as a polyolefin homopolymer or copolymer having at least 10 wt % solubility in xylene or toluene at room temperature. Preferably, the $C_2$-$C_{20}$ functionalized polymer component comprises a syndiotactic rich polyolefin, having a 15 wt %, preferably a 20 wt %, preferably a 25 wt %, preferably a 30 wt %, preferably a 35 wt %, preferably a 40 wt %, preferably a 45 wt %, preferably a 50 wt %, preferably a 55 wt %, preferably a 60 wt %, preferably a 65 wt %, preferably a 70 wt %, preferably a 75 wt %, preferably an 80 wt %, preferably an 85 wt %, preferably a 90 wt %, preferably a 95 wt % solubility in xylene at room temperature (25° C.). Still more preferably, the $C_2$-$C_{20}$ functionalized polymer component comprises an at least partially crystalline syndiotactic rich polypropylene (srPP) functionalized with a functional group.

The at least partially crystalline syndiotactic rich polypropylene, (srPP) may be defined herein to comprise at least about 80% [r] dyads. Preferably at least about 85% [r] dyads, with at least about 90% [r] dyads preferred, with at least about 95% [r] dyads more preferred, with at least about 99% [r] dyads yet still more preferred. See U.S. Application having the docket number 2004B132, filed Oct. 28, 2004, which is incorporated by reference herein.

Non-Functionalized Plasticizer

The compositions of the present invention include at least one non-functionalized plasticizer ("NFP"). The classes of materials described herein that are useful as non-functionalized plasticizers can be utilized alone or admixed with other NFP's described herein in order to obtain desired properties. Any NFP useful in the present invention may also be described by any number of, or any combination of, parameters described herein.

Unless noted otherwise:

Percents express a weight percent (wt %), based on the total amount of the material or component at issue;

Kinematic viscosity (KV), also referred to merely as viscosity, is expressed as centistokes (cSt) and is determined at the temperature specified according to ASTM D445;

Glass transition temperature (Tg) is determined according to ASTM E 1356;

Distillation range is determined according to ASTM D 86;

Initial boiling point and final boiling point are each determined according to ASTM D 86;

Pour point is determined according to ASTM D 97;

Specific gravity is determined according to ASTM D 4052, 15.6° C.;

Weight average molecular weight (Mw), number average molecular weight (Mn), and z average molecular weight (Mz) are each determined utilizing gel permeation chromatography (GPC);

Molecular weight distribution (MWD) is defined as the weight average molecular weight divided by the number average molecular weight (Mw/Mn);

Flash point is determined according to ASTM D 56;

Dielectric constant is determined at 1 kHz, 20° C.;

Density is determined according to ASTM 4052, 15.6° C; and

Viscosity index is determined according to ASTM D-2270.

For any other properties where the testing method is not stated please refere to WO 2004/014998.

Upper and lower limitations on physical properties and process conditions may comprise any combination of those limits recited in any combination herein for a particular component, compound, composition, and/or process.

Non-functionalized plasticizer may be present in the adhesive composition of the present invention at about 0.1 wt % or more, to less than less than about 99 wt %. Preferably, the non-functionalized plasticizer is present in the adhesive composition of the present invention at greater than or equal to about 1 wt %, preferably 2 wt %, preferably 3 wt %, preferably 4 wt %, preferably 5 wt %, preferably 10 wt %, preferably 20 wt %, preferably 30 wt %, preferably 40 wt %, preferably 50 wt %, preferably 60 wt %, preferably 70 wt %, preferably 80 wt %, depending on the additive or combination of additives selected and desired properties of the final adhesive composition.

Preferably the NFP is a liquid with no distinct melting point above 0° C. and a kinematic viscosity at 25° C. of 30,000 cSt or less.

In one embodiment, the NFP of the present invention is a compound comprising carbon and hydrogen, and does not include to an appreciable extent, functional groups selected from hydroxide, aryls and substituted aryls, halogens, alkoxys, carboxylates, esters, carbon unsaturation, acrylates, oxygen, nitrogen, and carboxyl. In yet another embodiment, aromatic moieties (including any compound whose molecules have the ring structure characteristic of benzene, naphthalene, phenanthrene, anthracene, etc.) are substantially absent from the NFP. By "appreciable extent", it is meant that these groups and compounds comprising these groups are not deliberately added to the NFP, and if present at all, are present at less than 5 wt % by weight of the NFP in one embodiment, more preferably less than 4 weight %, more preferably less than 3 weight %, more preferably less than 2 weight %, more preferably less than 1 weight %, more preferably less than 0.7 weight %, more preferably less than 0.5 weight %, more preferably less than 0.3 weight %, more preferably less than 0.1 weight %, more preferably less than 0.05 weight %, more preferably less than 0.01 weight %, more preferably less than 0.001 weight %, based upon the weight of the NFP. By "substantially absent", it is meant that these compounds are not added deliberately to the compositions and if present at all, are present at less than 0.5 wt %.

In another embodiment, the NFP of the present invention is a hydrocarbon that does not contain olefinic unsaturation to an appreciable extent. By "appreciable extent of olefinic unsaturation" it is meant that the carbons involved in olefinic bonds account for less than 10%, preferably less than 9%, more preferably less than 8%, more preferably less than 7%, more preferably less than 6%, more preferably less than 5%, more preferably less than 4%, more preferably less than 3%, more preferably less than 2%, more preferably less than 1%, more preferably less than 0.7%, more preferably less than 0.5%, more preferably less than 0.3%, more preferably less than 0.1%, more preferably less than 0.05%, more preferably less than 0.01%, more preferably less than 0.001%, of the total number of carbons. In some embodiments, the percent of carbons of the NFP involved in olefinic bonds is between 0.001 and 10% of the total number of carbon atoms in the NFP, preferably between 0.01 and 7%, preferably between 0.1 and 5%, more preferably less than 1%.

In another embodiment, the NFP comprises $C_6$ to $C_{200}$ paraffins (preferably $C_8$ to $C_{100}$ paraffins), where the NFP has a) a specific gravity of 0.85 or less and b) a pour point of −20° C. or less. In another embodiment, the NFP consists essentially of $C_6$ to $C_{200}$ paraffins (preferably the NFP consists essentially of $C_8$ to $C_{100}$ paraffins) where the NFP has a) a specific gravity of 0.85 or less and b) a pour point of −20° C. or less.

In certain embodiments of the present invention, the NFP having a) a specific gravity of 0.85 or less and b) a pour point of −20° C. or less has one or more of the following properties:
1. a distillation range as determined by ASTM D86 having a difference between the upper temperature and the lower temperature of 40° C. or less, preferably 30° C. or less, preferably 20° C. or less, preferably 10° C. or less, preferably between 6 and 40° C.; and/or
2. a final boiling point as determined by ASTM D 86 of from 115° C. to 500° C., preferably from 200° C. to 450° C., preferably from 250° C. to 400° C.; and/or
3. a number average molecular weight (Mn) between 2,000 and 100 g/mol, preferably between 1,500 and 150 g/mol, more preferably between 1,000 and 200 g/mol; and/or
4. a dielectric constant at 20° C. of less than 3.0, preferably less than 2.8, preferably less than 2.5, preferably less than 2.3, preferably less than 2.1; and/or
5. a viscosity (ASTM 445, 25° C.) of from 0.5 to 20 cSt at 25° C.; and/or
6. a glass transition temperature (Tg) determined by ASTM E1356 of less than 0° C., preferably less than −10° C., more preferably less than −20° C., more preferably less than −30° C., more preferably less than −50° C., or most preferably a Tg that can not be determined by ASTM E1356.

In other embodiments, the NFP having a) a specific gravity of 0.85 or less and b) a pour point of −20° C. or less preferably comprises at least 50 wt %, preferably at least 60 wt %, preferably at least 70 wt %, preferably at least 80 wt %, preferably at least 90 wt %, preferably at least 95 wt %, preferably 100 wt % of $C_6$ to $C_{150}$ isoparaffins, preferably $C_6$ to $C_{100}$ isoparaffins, preferably $C_6$ to $C_{25}$ isoparaffins, more preferably C8 to $C_{20}$ isoparaffins. Preferably the density (ASTM 4052, 15.6/15.6° C.) of these isoparaffins ranges from 0.70 to 0.83 g/cm$^3$; the pour point is −40° C. or less, preferably −50° C. or less, the viscosity (ASTM 445, 25° C.) is from 0.5 to 20 cSt at 25° C.; and the number average molecular weights in the range of 100 to 300 g/mol. Suitable isoparaffins are described in, for example, U.S. Pat. Nos. 6,197,285, 3,818,105 and 3,439,088, and are commercially available under the tradename ISOPAR™ (ExxonMobil Chemical), some of which are summarized in the Table below.

| Name | ISOPAR Series Isoparaffins Distillation range (° C.) | pour point (° C.) | Specific Gravity | Kinematic Visc. @ 25° C. (cSt) | saturates & aromatics (wt %) |
|---|---|---|---|---|---|
| ISOPAR E | 117-136 | −63 | 0.72 | 0.85 | <0.01 |
| ISOPAR G | 161-176 | −57 | 0.75 | 1.46 | <0.01 |
| ISOPAR H | 178-188 | −63 | 0.76 | 1.80 | <0.01 |
| ISOPAR K | 179-196 | −60 | 0.76 | 1.85 | <0.01 |
| ISOPAR L | 188-207 | −57 | 0.77 | 1.99 | <0.01 |
| ISOPAR M | 223-254 | −57 | 0.79 | 3.80 | <0.01 |
| ISOPAR V | 272-311 | −63 | 0.82 | 14.8 | <0.01 |

Other suitable isoparaffins are also commercial available under the trade names SHELLSOL™ (Royal Dutch/Shell), SOLTROL™ (Chevron Phillips) and SASOL™ (Sasol Limited).

In another embodiment, the isoparaffins are a mixture of branched and normal paraffins having from 6 to 50 carbon atoms, and from 10 to 24 carbon atoms in another embodiment, in the molecule. The isoparaffin composition has a ratio of branch paraffin to n-paraffin ratio (branch paraffin:n-paraffin) ranging from 0.5:1 to 9:1 in one embodiment, and from 1:1 to 4:1 in another embodiment.

The isoparaffins of the mixture in this embodiment contain greater than 50 wt % (by total weight of the isoparaffin composition) mono-methyl species, for example, 2-methyl, 3-methyl, 4-methyl, 5-methyl or the like, with minimum formation of branches with substituent groups of carbon number greater than 1, such as, for example, ethyl, propyl, butyl or the like, based on the total weight of isoparaffins in the mixture. In one embodiment, the isoparaffins of the mixture contain greater than 70 wt % of the mono-methyl species, based on the total weight of the isoparaffins in the mixture. The isoparaffinic mixture boils within a range of from 100° C. to 350° C. in one embodiment, and within a range of from 110° C. to 320° C. in another embodiment. In preparing the different grades, the paraffinic mixture is generally fractionated into cuts having narrow boiling ranges, for example, 35° C. boiling ranges. These branch paraffin/n-paraffin blends are described in, for example, U.S. Pat. No. 5,906,727.

In another embodiment, the NFP of the present invention comprises $C_{25}$ to $C_{1500}$ paraffins, and $C_{30}$ to $C_{500}$ paraffins in another embodiment, and has a flash point of 200° C. or more and a pour point of −10° C. or less and a viscosity index of 120 or more. Alternately the NFP comprises $C_{25}$ to $C_{1500}$ paraffins, preferably $C_{30}$ to $C_{500}$ paraffins, and has a flash point of 200° C. or more and a pour point of −20° C. or less. Alternately the NFP comprises $C_{25}$ to C2500 paraffins, preferably $C_{30}$ to $C_{500}$ paraffins, and has a flash point of 200° C. or more and a kinematic viscosity at 100° C. of 35 cSt or more. In another embodiment, the NFP consists essentially of $C_{35}$ to $C_{300}$ paraffins, preferably the NFP consists essentially of $C_{40}$ to $C_{250}$ paraffins, and has a flash point of 200° C. or more and a pour point of −10° C. or less and a viscosity index of 120 or more. Alternately the NFP consists essentially of $C_{35}$ to $C_{300}$ paraffins, preferably $C_{40}$ to $C_{250}$ paraffins, and has a flash point of 200° C. or more and a pour point of −20° C. or less. Alternately the NFP consists essentially of $C_{35}$ to $C_{300}$ paraffins, preferably $C_{40}$ to $C_{250}$ paraffins, and has a flash point of 200° C. or more and a kinematic viscosity at 100° C. of 35 cSt or more. Alternately the NFP has a flash point of 200° C. or more and a pour point of −20° C. or less. Alternately the NFP has a flash point of 200° C. or more and a kinematic viscosity at 100° C. of 35 cSt or more.

In another embodiment, the NFP comprises polyalphaolefin (PAO) oligomers of $C_5$ to $C_{20}$ olefins, and oligomers of $C_6$ to $C_{18}$ olefins in another embodiment, and oligomers of $C_6$ to $C_{14}$ olefins in yet another embodiment. In a preferred embodiment the NFP comprises oligomers of C8 to $C_{12}$ 1-olefins. In a more preferred embodiment, the NFP comprises oligomers of linear $C_8$ to $C_{12}$ 1-olefins, and most preferred are oligomers of linear $C_{10}$ 1-olefins. In a preferred embodiment, the NFP comprises oligomers of $C_8$ $C_{10}$ and $C_{12}$ 1-olefins, preferably 1-octene, 1-decene and 1-dodecene.

In another embodiment the NFP comprises polyalphaolefins (PAO) oligomers of linear olefins having 5 to 18 carbon atoms, more preferably 6 to 12 carbon atoms, more preferably 10 carbon atoms, where an individual PAO or a combination of PAO's has a kinematic viscosity (KV) at 100° C. of 3 cSt or more, preferably 6 cSt or more, preferably 8 cSt or more, preferably 10 cSt or more (as measured by ASTM D445); and preferably having a viscosity index (VI) of 100 or more, preferably 110 or more, more preferably 120 or more, more preferably 130 or more, more preferably 140 or more, preferably 150 or more (as determined by ASTM D2270); and preferably having a pour point of −10° C. or less, more preferably −20° C. or less, more preferably −30° C. or less (as determined by ASTM D97).

In another embodiment, the NFP comprises $C_{20}$ to $C_{1500}$ (preferably $C_{35}$ to $C_{400}$, more preferably $C_{40}$ to $C_{250}$) polyalphaolefin oligomers. The PAO oligomers are preferably dimers, trimers, tetramers, pentamers, etc. of $C_5$ to $C_{14}$ α-olefins in one embodiment, and $C_6$ to $C_{14}$ α-olefins in another embodiment, and $C_8$ to $C_{12}$ α-olefins in another embodiment, and $C_{10}$ α-olefins in another embodiment. Suitable olefins include 1-pentene, 1-hexene, 1-heptene, 1-octene, 1-nonene, 1-decene, 1-undecene and 1-dodecene, and blends thereof. In one embodiment, the olefin is 1-decene, and the NFP is a mixture of dimers, trimers, tetramers and pentamers (and higher) of 1-decene. In another embodiment, the PAO is comprised of oligomers or polymers of 1-octene, 1-decene, and 1-dodecene. Preferred PAO's are described more particularly in, for example, U.S. Pat. Nos. 5,171,908, and 5,783,531 and in SYNTHETIC LUBRICANTS AND HIGH-PERFORMANCE FUNCTIONAL FLUIDS 1-52 (Leslie R. Rudnick & Ronald L. Shubkin, ed.

Marcel Dekker, Inc. 1999). The PAO oligomers or polymers useful in the present invention may be characterized by any degree of tacticity, including isotacticity or syndiotacticity, and may be atactic. In another embodiment the polyalphaolefin has more than 50% meso dyads as measured by $^{13}$Carbon NMR, preferably more than 60%. In another embodiment the polyalphaolefin has more than 50% racemic dyads as measured by $^{13}$Carbon NMR, preferably more than 60%.

PAO's useful in the present invention typically possess a number average molecular weight of from 300 to 21,000 g/mol in one embodiment, from 400 to 20,000 g/mol in another embodiment, from 500 to 10,000 g/mol in another embodiment, from 500 to 5,000 g/mol in another embodiment, from 600 to 3,000 g/mol in another embodiment, and from 500 to 1,500 g/mol in yet another embodiment. Preferred PAO's have kinematic viscosities at 100° C. in the range of 3 to 3000 cSt in one embodiment, from 4 to 3000 cSt in another embodiment, from 6 to 300 cSt in another embodiment, and from 8 to 100 cSt in another embodiment, and 10 cSt or greater in another embodiment; and have pour points of less than −10° C. in one embodiment, and less than −20° C. in another embodiment, and less than −25° C. in another embodiment, and less than −30° C. in another embodiment, and less than −35° C. in another embodiment, and less than −40° C. in yet another embodiment,. Desirable PAO's are commercially available as SpectraSyn™ and SpectraSyn Ultra™ (ExxonMobil Chemical, previously sold under the SHF and SuperSyn™ tradenames), some of which are summarized in the Table below.

| PAO | KV @ 100° C., cSt | VI | Pour Point, ° C. | Specific gravity | Flash Point, ° C. | APHA Color |
|---|---|---|---|---|---|---|
| SpectraSyn 4 | 4 | 126 | −66 | 0.820 | 220 | 10 |
| SpectraSyn 6 | 6 | 138 | −57 | 0.827 | 246 | 10 |
| SpectraSyn 8 | 8 | 139 | −48 | 0.833 | 260 | 10 |
| SpectraSyn 10 | 10 | 137 | −48 | 0.835 | 266 | 10 |
| SpectraSyn 40 | 39 | 147 | −36 | 0.850 | 281 | 10 |
| SpectraSyn 100 | 100 | 170 | −30 | 0.853 | 283 | 60 |
| SpectraSyn Ultra 150 | 150 | 218 | −33 | 0.850 | >265 | 10 |
| SpectraSyn Ultra 300 | 300 | 241 | −27 | 0.852 | >265 | 20 |
| SpectraSyn Ultra 1000 | 1,000 | 307 | −18 | 0.855 | >265 | 30 |

SpectraSyn™ Series Polyalphaolefins

Other useful PAO's include those sold under the tradenames Synfluid™ available from ChevronPhillips Chemical Company (Pasedena, Tex.), Durasyn™ available from BP Amoco Chemicals (London, England), Nexbase™ available from Fortum Corporation (Keilaniemi, Finland), and Synton™ available from Crompton Corporation (Middlebury, Conn.).

In other embodiments the PAO's have a kinematic viscosity at 100° C. of 3 cSt or more, preferably 6 cSt or more, preferably 8 cSt or more, preferably 10 cSt or more, preferably 20 cSt or more, preferably 300 cSt or less, preferably 100 cSt or less. In another embodiment the PAO's have a kinematic viscosity at 100° C. of between 3 and 1000 cSt, preferably between 6 and 300 cSt, preferably between 8 and 100 cSt, preferably between 8 and 40 cSt.

In other embodiments the PAO's have a Viscosity Index of 100 or more, preferably 110 or more, preferably 120 or more, preferably 130 or more, preferably 140 or more, preferably 150 or more, preferably 170 or more, preferably 200 or more, preferably 250 or more.

In other embodiments the PAO's have a pour point of −10° C. or less, preferably −20° C. or less, preferably −25° C. or less, preferably −30° C. or less, preferably −35° C. or less, preferably −40° C. or less, preferably −50° C. or less.

In other embodiments the PAO's have a flash point of 200° C. or more, preferably 210° C. or more, preferably 220° C. or more, preferably 230° C. or more, preferably between 240° C. and 290° C.

Particularly preferred PAO's for use herein are those having a) a flash point of 200° C. or more (preferably 210° C. or more, preferably 220° C. or more, preferably 230° C. or more); and b) a pour point less than −20° C. (preferably less than −25° C., preferably less than −30° C., preferably less than −35°, preferably less than −40° C.) or a kinematic viscosity at 100° C. of 35 cSt or more (preferably 40 cSt or more, preferably 50 cSt or more, preferably 60 cSt or more).

In another preferred embodiment, the NFP (preferably a PAO) has a kinematic viscosity of 35 cSt or more at 100° C., preferably 40 cSt or more, preferably 50 cSt or more, preferably 60 cSt or more and a flash point of 200° C. or more, preferably 220° C., ore more, preferably 230° C. or more, preferably 250° C. or more.

In another preferred embodiment, the NFP (preferably a PAO) has a pour poi not less than −20° C., preferably less than −25° C., preferably less than −30° C., preferably less than −40° C. and a flash point of 200° C. or more preferably 220° C., ore more, preferably 230° C. or more, preferably 250° C. or more.

In another embodiment, the NFP is a high purity hydrocarbon fluid with a branched paraffin: normal paraffin ratio ranging from about 0.5:1 to 9:1, preferably from about 1:1 to 4:1. The branched paraffins of the mixture contain greater than 50 wt % (based on the total weight of the branched paraffins) mono-methyl species, for example, 2-methyl, 3-methyl, 4-methyl, 5-methyl or the like, with minimum formation of branches with substituent groups of carbon number greater than 1, such as, for example, ethyl, propyl, butyl or the like; preferably, greater than 70 wt % of the branched paraffins are mono-methyl species. The paraffin mixture has a number-average molecular weight in the range of 280 to 7000 g/mol, preferably 420 to 5600 g/mol, preferably 560 to 2800 g/mol, preferably 350 to 2100 g/mol, preferably 420 to 1400 g/mol, more preferably 280 to 980 g/mol; has a kinematic viscosity at 100° C. ranging from 3 to 500 cSt, preferably 6 to 200 cSt, preferably 8 to 100 cSt, more preferably 6 to 25 cSt, more preferably 3 to 25 cSt, more preferably 3 to 15 cSt; and boils within a range of from 100 to 350° C., preferably within a range of from 110 to 320° C., preferably within a range of 150 to 300° C. In a preferred embodiment, the paraffinic mixture is derived from a Fischer-Tropsch process. These branch paraffin/n-paraffin blends are described in, for example, U.S. Pat. No. 5,906,727.

In another embodiment, the NFP comprises paraffinic hydrocarbons having:

1. a number average molecular weight of 300 to 10,000 g/mol, preferably 400 to 5,000 g/mol, preferably 500 to 2,500 g/mol, preferably 300 to 1,200 g/mol;
2. less than 10% of sidechains with 4 or more carbons, preferably less than 8%, preferably less than 5%, preferably less than 3%, preferably less than 2%, preferably less than 1%, preferably less than 0.5%, preferably less than 0.1%;
3. at least 15% of sidechains with 1 or 2 carbons, preferably 20% or more, preferably 25% or more, preferably 30% or more, preferably 35% or more, preferably 40% or more, preferably 45% or more, preferably 50% or more;
4. less than 2.5 wt % cyclic paraffins (based on the total weight of paraffins in the mixture), preferably less than 2 wt %, preferably less than 1 wt %, preferably less than 0.5 wt %, preferably less than 0.1 wt %, preferably at less than 0.1 wt %, preferably at 0.001 wt %;
5. a kinematic viscosity at 100° C. of 3 cSt or more, preferably 6 cSt or more, preferably 8 cSt or more, preferably between 3 and 25 cSt; and
6. a viscosity index (VI) of 110 or more, preferably 120 or more, preferably 130 or more, preferably 140 or more, preferably 150 or more, preferably 180 or more, preferably 200 or more, preferably 250 or more, preferably 300 or more;
7. a pour point of −10° C. or less, preferably −20° C. or less; and
8. a flash point of 200° C. or more, preferably 210° C. or more, preferably 220° C. or more.

In another embodiment, the NFP comprises a wax isomerate lubricant oil basestock, which includes hydroisomerized waxy stocks (e.g. waxy stocks such as gas oils, slack waxes, fuels hydrocracker bottoms, etc.), hydroisomerized Fischer-Tropsch hydrocarbons and waxes, Gas-to-Liquids (GTL) base stocks and base oils, and other waxy feedstock derived hydroisomerized base stocks and base oils, or mixtures thereof. Fischer-Tropsch waxes, the high boiling point residues of Fischer-Tropsch synthesis, are highly paraffinic hydrocarbons with very low sulfur content, and are often preferred feedstocks in processes to make hydrocarbon fluids of lubricating viscosity.

The hydroprocessing used for the production of such base stocks may use an amorphous hydrocracking/hydroisomerization catalyst, such as one of the specialized lube hydrocracking catalysts or a crystalline hydrocracking/hydroisomerization catalyst, preferably a zeolitic catalyst. For example, one useful catalyst is ZSM-48 as described in U.S. Pat. No. 5,075,269. Processes for making hydrocracked/hydroisomerized distillates and hydrocracked/hydroisomerized waxes are described, for example, in U.S. Pat. Nos. 2,817,693; 4,975,177; 4,921,594 and 4,897,178 as well as in British Patent Nos. 1,429,494; 1,350,257; 1,440,230 and 1,390,359. Particularly favorable processes are described in European Patent Application Nos. 464546 and 464547. Processes using Fischer-Tropsch wax feeds are described in U.S. Pat. Nos. 4,594,172 and 4,943,672.

Gas-to-Liquids (GTL) base stocks and base oils, Fischer-Tropsch hydrocarbon derived base stocks and base oils, and other waxy feedstock derived base stocks and base oils (or wax isomerates) that can be advantageously used in the present invention have kinematic viscosities at 100° C. of about 3 cSt to about 500 cSt, preferably about 6 cSt to about 200 cSt, preferably about 8 cSt to about 100 cSt, more preferably about 3 cSt to about 25 cSt. These Gas-to-Liquids (GTL) base stocks and base oils, Fischer-Tropsch hydrocarbon derived base stocks and base oils, and other waxy feedstock derived base stocks and base oils (or wax isomerates) have low pour points (preferably less than −10° C., preferably about −15° C. or lower, preferably about −25° C. or lower, preferably −30° C. to about −40° C. or lower); have a high viscosity index (preferably 110 or greater, preferably 120 or greater, preferably 130 or greater, preferably 150 or greater); and are of high purity (high saturates levels (preferably 90 wt % or more, preferably 95 wt % or more, preferably 99 wt % or more), low-to-nil sulfur content (preferably 0.03 weight % or less), low-to-nil nitrogen content (preferably 0.05 wt % or less), low-to-nil aromatics content (preferably 0.05 wt % or less), low bromine number (preferably 1 or less), low iodine number (preferably 1 or less), and high aniline point (preferably 120° C. or more). Useful compositions of Gas-to-Liquids (GTL) base stocks and base oils, Fischer-Tropsch hydrocarbon derived base stocks and base oils, and wax isomerate hydroisomerized base stocks and base oils are recited in U.S. Pat. Nos. 6,080,301; 6,090,989, and 6,165,949 for example, and are incorporated herein in their entirety by reference.

In a preferred embodiment, the NFP of the present invention comprises a GTL-derived base-stock or base-oil that has a kinematic viscosity at 100° C. of 3 to 500 cSt, preferably 6 to 200 cSt, preferably 8 to 100 cSt, more preferably 3 to 25 cSt; and/or a number average molecular weight ($M_n$) of 300 to 10,000 g/mol, preferably 400 to 5,000 g/mol, preferably 500 to 2,500 g/mol, more preferably 300 to 1,200 g/mol.

In another embodiment, the NFP comprises a Group III hydrocarbon oil (also called a lubricant basestock), which is a special class of mineral oils that is severely hydrotreated. Preferably the NFP has a saturates levels of 90% or more, preferably 92% or more, preferably 94% or more, preferably 95% or more, and sulfur contents less than 0.03%, preferably between 0.001 and 0.01%, and VI of 120 or more, preferably 130 or more. Preferably the Group III hydrocarbon oil has a kinematic viscosity at 100° C. of 3 to 100, preferably 4 to 100 cSt, preferably 6 to 50 cSt, preferably 8 to 20; and/or a number average molecular weight of 300 to 5,000 g/mol, preferably 400 to 2,000 g/mol, more preferably 500 to 1,000 g/mol. Preferably the Group III hydrocarbon oil has a pour point of −10° C. or less, and a flash point of 200° C. or more.

In some embodiments, the NFP comprises a low molecular weight of $C_4$ olefins (including n-butene, 2-butene, isobutylene, and butadiene, and mixtures thereof). Such a material is referred to as a "polybutenes" liquid when the oligomers comprise isobutylene and/or 1-butene and/or 2-butene. It is commonly used as an additive for polyolefins; e.g. to introduce tack or as a processing aid. The ratio of $C_4$ olefin isomers can vary by manufacturer and by grade, and the material may or may not be hydrogenated after synthesis. In some cases, the polybutenes liquid is a polymer of a $C_4$ raffinate stream. In other cases, it consists essentially of polyisobutylene or poly (n-butene) oligomers. Typically, the polybutenes liquid has a number-average molecular weight of less than 15,000 g/mol, and commonly less than 5,000 g/mol or even less than 1,000 g/mol. They are described in, for example, SYNTHETIC LUBRICANTS AND HIGH-PERFORMANCE FUNCTIONAL FLUIDS 357-392 (Leslie R. Rudnick & Ronald L. Shubkin, ed., Marcel Dekker 1999). Commercial sources of polybutenes include BP (Indopol grades) and Infineum (C-Series grades). When the $C_4$ olefin is exclusively isobutylene, the material is referred to as "polyisobutylene" or PIB. Commercial sources of PIB include Texas Petrochemical (TPC Enhanced PIB grades). When the $C_4$ olefin is exclusively 1-butene, the material is referred to as "poly-n-butene" or PNB. Properties of some liquids made from $C_4$ olefin(s) are summarized in the Table below. Note that grades with a flash point of 200° C. or more also have a pour point greater than −10° C. and/or a VI less than 120. Preferably, the NFP is not a polybutenes liquid.

| Commercial Examples of Oligomers of $C_4$ olefin(s) | | | | | |
|---|---|---|---|---|---|
| Grade | KV @ 100° C., cSt | VI | Pour Point, ° C. | Specific gravity | Flash Point, ° C. |
| TPC 137 (PIB) | 6 | 132 | −51 | 0.843 | 120 |
| TPC 1105 (PIB) | 220 | 145 | −6 | 0.893 | 200 |
| TPC 1160 (PIB) | 660 | 190 | 3 | 0.903 | 230 |
| BP Indopol H-25 | 52 | 87 | −23 | 0.869 | ~150 |
| BP Indopol H-50 | 108 | 90 | −13 | 0.884 | ~190 |
| BP Indopol H-100 | 218 | 121 | −7 | 0.893 | ~210 |
| Infineum $C_9$945 | 11 | 74* | −34 | 0.854 | 170 |
| Infineum $C_9$907 | 78 | 103* | −15 | 0.878 | 204 |
| Infineum $C_9$995 | 230 | 131* | −7 | 0.888 | 212 |
| Infineum $C_9$913 | 630 | 174* | 10 | 0.888 | 240 |

*Estimated based on the kinematic viscosity at 100° C. and 38° C..

In another embodiment, when a NFP is present, an oligomer or polymer of $C_4$ olefin(s) (including all isomers, e.g. n-butene, 2-butene, isobutylene, and butadiene, and mixtures thereof) may be present in the composition. In a preferred embodiment, the composition comprises less than 50 wt % (preferably less than 40%, preferably less than 30 wt %, preferably less than 20 wt %, more preferably less than 10 wt %, more preferably less than 5 wt %, more preferably less than 1 wt %, preferably 0 wt %) polymer or oligomer of $C_4$ olefin(s) such as PIB, polybutene, or PNB, based upon the weight of the composition.

In a preferred embodiment, the NFP contains less than 90 weight % of $C_4$ olefin(s), preferably isobutylene, based upon the weight of the NFP. Preferably the NFP contains less than 80 weight %, preferably less than 70 wt %, preferably less than 60 wt %, preferably less than 50 wt %, preferably less than 40 wt %, preferably less than 30 wt %, preferably less than 20 wt %, preferably less than 10 wt %, preferably 5 wt %, preferably less than 2%, preferably less than 1 wt %, preferably 0 wt % of $C_4$ olefin(s), preferably isobutylene, based upon the weight of the NFP.

In another embodiment, any NFP described herein has a pour point (ASTM D97) of less than −10° C. in one embodiment, less than −20° C. in another embodiment, less than −25° C. in yet another embodiment, less than −30° C. in yet another embodiment, less than −35° C. in yet another embodiment, less than −40° C. in yet another embodiment, less than −45° C. in yet another embodiment, less than −50° C. in yet another embodiment, and less than −60° C. in yet another embodiment, and greater than −120° C. in yet another embodiment, wherein a desirable range may include any upper pour point limit with any lower pour point limit described herein.

In another embodiment, any NFP described herein has a Viscosity Index (VI, ASTM D2270) of 100 or more, preferably 105 or more, more preferably 110 or more, more preferably 115 or more, more preferably 120 or more, more preferably 125 or more, more preferably 130 or more, more preferably 150 or more. In another embodiment the NFP has a VI between 100 and 300, preferably between 120 and 180.

In another embodiment, any NFP described herein has a kinematic viscosity at 100° C. ($KV_{100}$, ASTM D445) of from 3 to 3000 cSt, and from 6 to 300 cSt in another embodiment, and from 6 to 200 cSt in another embodiment, and from 8 to 100 cSt in yet another embodiment, and from 4 to 50 cSt in yet another embodiment, and less than 50 cSt in yet another embodiment, and less than 25 cSt in yet another embodiment, wherein a desirable range may comprise any upper viscosity limit with any lower viscosity limit described herein. In other embodiments, the NFP has a kinematic viscosity at 100° C. of less than 2 cSt.

In another embodiment, any NFP described herein has a flash point (ASTM D92) of 200° C. or more, preferably 210° or more, preferably 220° C. or more, preferably 230° C. or more, preferably 240° C. or more, preferably 245° C. or more, preferably 250° C. or more, preferably 260° C. or more, preferably 270° C. or more, preferably 280° C. or more. In another embodiment the NFP has a flash point between 200° C. and 300° C., preferably between 220° C. and 280° C. In other embodiments, the NFP has a flash point between 100° C. and 200° C.

In another embodiment, any NFP described herein has a dielectric constant measured at 20° C. of less than 3.0 in one embodiment, and less than 2.8 in another embodiment, less than 2.5 in another embodiment, and less than 2.3 in yet another embodiment, and less than 2.1 in yet another embodiment. Polyethylene itself has a dielectric constant (1 kHz, 23° C.) of at least 2.3 according to the CRC HANDBOOK OF CHEMISTRY AND PHYSICS (David R. Lide, ed. $_{82}$d ed. CRC Press 2001).

In another embodiment, any NFP described herein has a specific gravity (ASTM D4052, 15.6/15.6° C.) of less than 0.86 in one embodiment, and less than 0.85 in another embodiment, and less than 0.84 in another embodiment, and less than 0.83 in another embodiment, and from 0.80 to 0.86 in another embodiment, and from 0.81 to 0.85 in another embodiment, and from 0.82 to 0.84 in another embodiment, wherein a desirable range may comprise any upper specific gravity limit with any lower specific gravity limit described herein.

In other embodiments, any NFP described herein may have an initial boiling point (ASTM D1160) of from 300° C. to 600° C. in one embodiment, and from 350° C. to 500° C. in another embodiment, and greater than 400° C. in yet another embodiment.

In other embodiments any NFP described herein may have a low degree of color, such as typically identified as "water white", "prime white", "standard white", or "bright and clear," preferably an APHA color of 100 or less, preferably 80 or less, preferably 60 or less, preferably 40 or less, preferably 20 or less, as determined by ASTM D1209.

Any NFP described herein preferably has a number-average molecular weight ($M_n$) of 21,000 g/mol or less in one embodiment, preferably 20,000 g/mol or less, preferably 19,000 g/mol or less, preferably 18,000 g/mol or less, preferably 16,000 g/mol or less, preferably 15,000 g/mol or less, preferably 13,000 g/mol or less and 10,000 g/mol or less in yet another embodiment, and 5,000 g/mol or less in yet another embodiment, and 3,000 g/mol or less in yet another embodiment, and 2,000 g/mol or less in yet another embodiment, and 1500 g/mol or less in yet another embodiment, and 1,000 g/mol or less in yet another embodiment, and 900 g/mol or less in yet another embodiment, and 800 g/mol or less in yet another embodiment, and 700 g/mol or less in yet another embodiment, and 600 g/mol or less in yet another embodiment, and 500 g/mol or less in yet another embodiment. Preferred minimum $M_n$ is at least 200 g/mol, preferably at least 300 g/mol. Further a desirable molecular weight range can be any combination of any upper molecular weight limit with any lower molecular weight limit described above. $M_n$ is determined according to the methods specified under Fluid Properties in the Test Methods section below.

Any of the NFP's may also be described by any number of, or any combination of, parameters described herein.

In a preferred embodiment, any NFP described herein has a flash point of 200° C. or more (preferably 210° C. or more) and a pour point of −20° C. or less (preferably −25° C. or less, more preferably −30° C. or less, more preferably −35° C. or less, more preferably −45° C. or less, more preferably −50° C. or less).

In another preferred embodiment, the NFP has a flash point of 220° C. or more (preferably 230° C. or more) and a pour point of −10° C. or less (preferably −25° C. or less, more preferably −30° C. or less, more preferably −35° C. or less, more preferably −45° C. or less, more preferably −50° C. or less).

In another preferred embodiment, the NFP has a kinematic viscosity at 100° C. of 35 cSt or more (preferably 40 cSt or more, preferably 50 cSt or more, preferably 60 cSt or more) and a specific gravity (15.6/15.6° C.) of 0.87 or less (preferably 0.865 or less, preferably 0.86 or less, preferably 0.855 or less) and a flash point of 200° C. or more (preferably 230° C. or more).

In another preferred embodiment, the NFP has a) a flash point of 200° C. or more, b) a specific gravity of 0.86 or less, and $C_1$) a pour point of −10° C. or less and a viscosity index of 120 or more, or $C_2$) a pour point of −20° C. or less, or $C_3$) a kinematic viscosity at 100° C. of 35 cSt or more.

In another preferred embodiment, the NFP has a specific gravity (15.6/15.6° C.) of 0.85 or less (preferably between 0.80 and 0.85) and a kinematic viscosity at 100° C. of 3 cSt or more (preferably 4 or more, preferably 5 cSt or more, preferably 8 cSt or more, preferably 10 cSt or more, preferably 15 cSt or more, preferably 20 cSt or more) and/or a number-average molecular weight ($M_n$) of at least 280 g/mol.

In another preferred embodiment, the NFP has a specific gravity (15.6/15.6° C.) of 0.86 or less (preferably between 0.81 and 0.855, preferably between 0.82 and 0.85) and a kinematic viscosity at 100° C. of 5 cSt or more (preferably 6 or more, preferably 8 cSt or more, preferably 10 cSt or more, preferably 12 cSt or more, preferably 15 cSt or more, preferably 20 cSt or more) and/or a number-average molecular weight ($M_n$) of at least 420 g/mol.

In another preferred embodiment, the NFP has a specific gravity (15.6/15.6° C.) of 0.87 or less (preferably between 0.82 and 0.87) and a kinematic viscosity at 100° C. of 10 cSt or more (preferably 12 cSt or more, preferably 14 cSt or more, preferably 16 cSt or more, preferably 20 cSt or more, preferably 30 cSt or more, preferably 40 cSt or more) and/or a number-average molecular weight ($M_n$) of at least 700 g/mol.

In another preferred embodiment, the NFP has a specific gravity (15.6/15.6° C.) of 0.88 or less (preferably 0.87 or less, preferably between 0.82 and 0.87) and a kinematic viscosity at 100° C. of 15 cSt or more (preferably 20 cSt or more, preferably 25 cSt or more, preferably 30 cSt or more, preferably 40 cSt or more) and/or a number-average molecular weight ($M_n$) of at least 840 g/mol.

In another preferred embodiment the NFP has a kinematic viscosity at 100° C. of 3 to 3000 cSt, preferably 6 to 300 cSt, more preferably 8 to 100 cSt; and a number average molecular weight ($M_n$) of 300 to 21,000 g/mol, preferably 500 to 5,000 g/mol, more preferably 600 to 3,000 g/mol.

In another preferred embodiment the NFP has a kinematic viscosity at 100° C. of 3 to 500 cSt, preferably 6 to 200 cSt, more preferably 8 to 100 cSt, more preferably 3 to 25 cSt; and a number average molecular weight ($M_n$) of 300 to 10,000 g/mol, preferably 400 to 5,000 g/mol, more preferably 500 to 2,500 g/mol, more preferably 300 to 1,200 g/mol.

In another preferred embodiment the NFP has a kinematic viscosity at 100° C. of 3 to 100 cSt, preferably 4 to 50 cSt, more preferably 6 to 25 cSt, more preferably 3 to 15 cSt; and a number average molecular weight ($M_n$) of 300 to 3,000 g/mol, preferably 350 to 2,000 g/mol, more preferably 400 to 1,000 g/mol, more preferably 300 to 800 g/mol.

In another preferred embodiment, the NFP has a pour point of −25° C. or less, preferably between −30° C. and −90° C., and a kinematic viscosity in the range of from 20 to 5000 cSt at 40° C. In another preferred embodiment, the NFP has a pour point of −25° C. or less and a Mn of 400 g/mol or greater. Most mineral oils, which typically include functional groups, have a pour point of from 10° C. to −25° C. at the same viscosity and molecular weight ranges.

In another preferred embodiment the NFP has kinematic viscosity at 100° C. of 3 cSt or greater, preferably 6 cSt or greater, more preferably 8 cSt or greater, and one or more of the following properties:

1. a pour point of −10° C. or less, preferably −20° C. or less, preferably −30° C. or less, preferably −40° C. or less; and/or,
2. a Viscosity Index of 120 or greater; and/or,
3. a low degree of color, such as typically identified as "water white", "prime white", "standard white", or "bright and clear," preferably an APHA color of 100 or less, preferably 80 or less, preferably 60 or less, preferably 40 or less, preferably 20 or less, preferably 15 or less as determined by ASTM D1209; and/or
4. a flash point of 200° C. or more, preferably 220° C. or more, preferably 240° C. or more; and/or
5. a specific gravity (15.6° C.) of less than 0.86.

Most mineral oils at the same viscosity range have a pour point greater than −20° C. or an APHA color of greater than 20 or a specific gravity (15.6° C.) of 0.86 or more.

In another preferred embodiment, the NFP has a Viscosity Index of 120 or more and one or more of the following properties:

1. a pour point of −10° C. or less, preferably −20° C. or less, preferably −30° C. or less, preferably −40° C. or less; and/or,
2. a kinematic viscosity at 100° C. of 3 cSt or greater, preferably 6 cSt or greater, preferably 8 cSt or greater, preferably 10 cSt or greater; and/or,
3. a low degree of color, such as typically identified as "water white", "prime white", "standard white", or "bright and clear," preferably an APHA color of 100 or less, preferably 80 or less, preferably 60 or less, preferably 40 or less, preferably 20 or less, preferably 15 or less, as determined by ASTM D1209; and/or
4. a flash point of 200° C. or more, preferably 220° C. or more, preferably 240° C. or more; and/or
5. a specific gravity (15.6° C.) of less than 0.86.

Most mineral oils have a Viscosity Index of less than 120.

In another preferred embodiment, the NFP has a pour point of −20° C. or less, preferably −30° C. or less, and one or more of the following properties:

1. a kinematic viscosity at 100° C. of 3 cSt or greater, preferably 6 cSt or greater, preferably 8 cSt or greater, preferably 10 cSt or more; and/or,
2. a Viscosity Index of 120 or greater, preferably 130 or greater; and/or,
3. a low degree of color, such as typically identified as "water white", "prime white", "standard white", or "bright and clear," preferably APHA color of 100 or less, preferably 80 or less, preferably 60 or less, preferably 40 or less, preferably 20 or less, preferably 15 or less as determined by ASTM D1209; and/or 4. a flash point of 200° C. or more, preferably 220° C. or more, preferably 240° C. or more; and/or
5. a specific gravity (15.6° C.) of less than 0.86.

Most mineral oils have a kinematic viscosity at 100° C. of less than 6 cSt, or an APHA color of greater than 20, or a flash point less than 200° C. when their pour point is less than −20° C.

In another preferred embodiment the NFP has a glass transition temperature ($T_g$) that cannot be determined by ASTM E1356 or, if it can be determined, then the $T_g$ according to ASTM E1356 is less than 0° C., preferably less than −10° C., more preferably less than −20° C., more preferably less than −30° C., more preferably less than −40° C., and, preferably, also has one or more of the following properties:

1. an initial boiling point as determined by ASTM D1160 greater than 300° C., preferably greater than 350° C., preferably greater than 400° C.; and/or
2. a pour point of −10° C. or less, preferably −15° C. or less, preferably −25° C. or less, preferably −35° C. or less, preferably −45° C. or less; and/or
3. a specific gravity (ASTM D4052, 15.6/15.6° C.) of less than 0.88, preferably less than 0.86, preferably less than 0.84, preferably from 0.80 to 0.88, preferably from 0.82 to 0.86; and/or
4. a final boiling point as determined by ASTM D1160 of from 300° C. to 800° C., preferably from 400° C. to 700° C., preferably greater than 500° C.; and/or
5. a weight average molecular weight (Mw) between 30,000 and 400 g/mol preferably between 15,000 and 500 g/mol, more preferably between 5,000 and 600 g/mol; and/or
6. a number average molecular weight (Mn) between 10,000 and 400 g/mol, preferably between 5,000 and 500 g/mol, more preferably between 2,000 and 600 g/mol; and/or
7. a flash point as measured by ASTM D92 of 200° C. or greater, and/or
8. a dielectric constant at 20° C. of less than 3.0, preferably less than 2.8, preferably less than 2.5, preferably less than 2.3, preferably less than 2.2.

Additives

The adhesive composition of the present invention may also comprise a one or more additives. As used herein, an additive may be any material or combination of materials which facilitates, improves, modifies, or retards physical properties of the adhesive composition, or which facilitates the use of the adhesive composition of the present invention.

Additive may include homopolypropylene, propylene copolymerized with up to 50 wt % of ethylene or a $C_4$ to $C_{20}$ alpha-olefin, isotactic polypropylene, highly isotactic polypropylene (e.g., having greater than about 50% m-pentads), syndiotactic polypropylene, copolymers of propylene and ethylene and/or butene and/or hexene, polybutene, ethylene vinyl acetate, low density polyethylene (density 0.915 to less than 0.935 g/cm³) linear low density polyethylene, ultra low density polyethylene (density 0.86 to less than 0.90 g/cm³), very low density polyethylene (density 0.90 to less than 0.915 g/cm³), medium density polyethylene (density 0.935 to less than 0.945 g/cm³), high density polyethylene (density 0.945 to 0.98 g/cm³), ethylene vinyl acetate, ethylene methyl acrylate, copolymers of acrylic acid, terpolymers of ethylene acrylic acid and methyl methacrylate, zinc, magnesium or sodium ionomers, polymethylmethacrylate or any other polymers polymerizable by a high-pressure free radical process, polyvinylchloride, polybutene-1, isotactic polybutene, ABS resins, elastomers such as ethylene-propylene rubber (EPR), vulcanized EPR, EPDM, block copolymer elastomers such as SBS, nylons (polyamides), polycarbonates, PET (polyester resins), crosslinked polyethylene, copolymers of ethylene and vinyl alcohol (EVOH), polymers of aromatic monomers such as polystyrene, poly-1 esters, graft copolymers generally, polyacrylonitrile homopolymer or copolymers, thermoplastic polyamides, polyacetal, polyvinylidine fluoride and other fluorinated elastomers, polyethylene glycols and polyisobutylene.

Preferred additives include tackifiers, crosslinking agents, antioxidants, neutralizing agents, nucleating agents, fillers, nano-compositions, adhesion promoters, oils, plasticizers, waxes, low molecular weight polymers, ester polymers, stabilizers, polyalpha olefins (PAOs), and other additives as described herein.

When present, additives may be present in the adhesive composition of the present invention at about 0.1 wt % or more, to less than less than about 99 wt %. Preferably, the additives are present in the adhesive composition of the present invention at greater than or equal to about 1 wt %, preferably 2 wt %, preferably 3 wt %, preferably 4 wt %, preferably 5 wt %, preferably 10 wt %, preferably 20 wt %, preferably 30 wt %, preferably 40 wt %, preferably 50 wt %, preferably 60 wt %, preferably 70 wt %, preferably 80 wt %, depending on the additive or combination of additives selected and desired properties of the final adhesive composition.

Tackifiers

The adhesive composition of the present invention may include one or more tackifiers. Examples of suitable tackifiers may be selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier may be hydrogenated.

In other embodiments, the tackifier may be non-polar, meaning that the tackifier is substantially free of monomers having polar groups. Preferably, the polar groups are not present, however if they are present, they are preferably not present at more that 5 wt %, preferably not more that 2 wt %, even more preferably no more than 0.5 wt %. In some embodiments the tackifier may have a Ring and Ball softening point, as measured by ASTM E-28 of 80° C. to 150° C., preferably 100° C. to 130° C. In another embodiment the resins is liquid and has a Ring and Ball softening point of between 10° C. and 70° C.

In a preferred embodiment, the tackifier may be present in the adhesive composition at about 1 to about 80 wt %, based upon the weight of the adhesive composition, more preferably 2 to 40 wt %, even more preferably 3 to 30 wt %.

Preferred additives include hydrocarbon resins used as tackifiers or modifiers which include resins such as $C_5/C_6$ terpene resins, styrene terpenes, alpha-methyl styrene terpene resins, $C_8$ terpene resins, aromatic modified $C_5/C_6$, aromatic modified cyclic resins, aromatic modified dicyclopentadiene based resins or mixtures thereof. Additional preferred resins include those described in WO 91/07472, U.S. Pat. Nos. 5,571,867, 5,171,793 and 4,078,132. These resins may be obtained from the cationic polymerization of compositions containing one or more of the following monomers: $C_5$ diolefins (such as 1-3 pentadiene, isoprene, and the like); $C_5$ olefins (such as 2- methylbutenes, cyclopentene, and the like); $C_6$ olefins (such as hexene), $C_9$ vinylaromatics (such as styrene, alpha methyl styrene, vinyltoluene, indene, methyl indene, and the like); cyclics (such as dicyclopentadiene, methyldicyclopentadiene, and the like); and or terpenes (such as limonene, carene, thujone, and the like).

Also preferred additives include hydrocarbon resins used as tackifiers or modifiers which include resins obtained by the thermal polymerization of dicyclopentadiene, and/or the thermal polymerization of dimers or oligomers of cyclopentadiene and/or methylcyclopentadiene, and/or with vinylaromatics (such as styrene, alpha-methyl styrene, vinyl toluene, indene, methyl indene, and the like).

The resins obtained after polymerization and separation of unreacted materials, can be hydrogenated if desired. Examples of preferred resins for use as additives herein include those described in U.S. Pat. No. 4,078,132; WO 91/07472; U.S. Pat. No. 4,994,516; EP 0 046 344 A; EP 0 082 726 A; and U.S. Pat. No. 5,171,793.

In an embodiment, the adhesive composition of the present invention may comprise a tackifier comprising a hydrogenated aromatic modified resin produced from dicyclopentadiene feedstock, having a Ring and Ball softening point of 10° C. to 150° C. as determined according to ASTM E-28.

Crosslinking Agents

In another embodiment the adhesive composition may further comprise a crosslinking agent. Preferred crosslinking agents include those having functional groups that can react with the functional group present on the functionalized polymer component, for example, the anhydride group present on a random propylene polymer-g-MA. Preferred crosslinking agents include alcohols, multiols, amines, diamines and/or triamines, peroxide with or without co-agents. Particular examples of crosslinking agents useful in this invention include polyamines such as ethylenediamine, diethylenetriamine, hexamethylenediamine, diethylaniinopropylamine, and/or menthanediamine.

Antioxidants

In another embodiment, the adhesive composition may comprise one or more phenolic antioxidants. Preferred examples of phenolic antioxidants include substituted phenols such as 2,6-di-t-butylphenol in which a hydrogen atom at 2 and/or 6 position is substituted by an alkyl residue. Typical examples of the phenolic antioxidant include 2,6-di-t-butyl-p-cresol, 2,4,6-tri-t-butylphenol, vitamin E, 2-t-butyl-6-(3'-t-butyl-5'-methyl-2'-hydroxybenzyl)-4-methylphenyl acrylate, 2,2'-methylene-bis(4-methyl-6-t-butylphenyl), 2,2'-methylene-bis(4-ethyl-6-t-butyl-phenol), 2,2'-methylene-bis(6-cyclohexyl-4-methylphenol), 1,6-hexanediol-bis([3-(3,5-di-t-butyl[4-hydroxyphenyl])] propionate, and pentaerythrityl-tetrakis-[3-(3,5-di-t-butyl-4-hydroxyphenyl)] propionate. Preferred antioxidants include phenolic antioxidants, such as Irganox 1010, Irganox, 1076 both available from Ciba-Geigy. Secondary stabilizers such as organophosphites such as Irgafos 168 available from Ciba-Geigy can also be used.

Neutralizing Agents/Nucleating Agents

The adhesive composition of the present invention may also include a neutralizing agent such as calcium stearate, magnesium hydroxide, aluminum hydroxide or hydrotalcite, and/or a nucleating agent such as a salt of benzoic acid, sodium-2,2'-methylene-bis(4,6-di-t-butylphenyl) phosphate and benzyl sorbitol, and the like.

Fillers

In another embodiment, the adhesive composition may comprise one or more fillers. Suitable fillers include titanium dioxide, calcium carbonate, barium sulfate, silica, silicon dioxide, carbon black, sand, glass beads or glass fibers, mineral aggregates, talc, clay, wolastonite, and the like.

Nanocomposite Compositions

Additional embodiments contemplated include a nanoclay, also referred to herein as a nanocomposite, comprising an organoclay which may in-turn include a stabilization functionality, preferably the stabilization functionality being covalent.

The organoclay may comprise one or more of ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides.

The organoclay may be selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite and/or florine mica.

In a preferred embodiment, the organoclay is preferably present in the adhesive of the present invention at from 0.1 to 50 wt %, based on the total weight of the composition. The stabilization functionality may be selected from one or more of phenols, ketones, hindered amines, substituted phenols, substituted ketones, substituted hindered amines, and combinations thereof.

Preferably, the stabilization functionality is present in the at least one stabilization functionalized thermoplastic, and the organoclay is present in the nanocomposite, each in an effective amount such that the heat aged failure of a molded sample of the nanocomposite by 10% when compared to a reference nanocomposite made with a thermoplastic polyolefin containing functionality substantially free of covalently-bonded stabilization functionality. In an embodiment, the stabilization functionality may be present in the at least one stabilization functionalized thermoplastic polyolefin from 0.01 to 15 wt % based on the total weight of the at least one stabilization functionalized thermoplastic.

In another embodiment, a nanocomposite suitable for use in the adhesive of the present invention may comprise a stabilization functionality selected from one or more of phenols; ketones, hindered amines, substituted phenols, substituted ketones, substituted hindered amines, or combinations thereof. The organoclay may also comprises one or more of hexyl ammonium ion, octyl ammonium ion, 2-ethylhexyl ammonium ion, dodecyl ammonium ion, octadecyl ammonium ion, dioctyl dimethyl ammonium ion, trioctyl ammonium ion, distearyl ammonium ion, ammonium salt, pyridinium salt, sulfonium salt, phosphonium salt, or combinations thereof, wherein the organoclay further comprising a clay selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite or florine mica, and wherein the organoclay is present in the adhesive composition at from 1 to 30 wt %, based on the total weight of the adhesive composition.

Adhesion Promoters

In another embodiment the adhesive composition may comprise one or more adhesion promoters including polar acids, polyaminoamides (such as Versamid 115, 125, 140, available from Henkel), urethanes (such as isocyanate/hydroxy terminated polyester systems, e.g. bonding agent TN/Mondur Cb-75 from Miles, Inc.), coupling agents, (such as silane esters (Z-6020 from Dow Corning)), titanate esters (such as Kr-44 available from Kenrich), reactive acrylate monomers (such as sarbox SB-600 from Sartomer), metal acid salts (such as Saret 633 from Sartomer), polyphenylene oxide, oxidized polyolefins, acid modified polyolefins, and anhydride modified polyolefins. Examples include silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxypropyltrimethoxysilane, aminopropyltriethoxysilane, aminoethylaminopropyltrimethoxysilane, ureidopropyltrimethyloxysilane, bis-gamma-trimethoxysilylpropylurea, 1,3,5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof.

Oils

The adhesive composition may also comprise oils including aliphatic napthenica oils, white oils, and the like. Particularly preferred oils include paraffinic or napthenic oils such as Primol 352, or Primol 876 available from ExxonMobil Chemical France, S.A. in Paris, France.

Plasticizers

Preferred plasticizers suitable for use in the adhesive composition include mineral oils, polybutenes, phthalates and the like. Preferred plasticizers include phthalates such as di-iso-undecyl phthalate (DIUP), di-iso-nonylphthalate (DINP), dioctylphthalates (DOP) combinations thereof, and/or derivatives thereof, and/or the like. Particularly preferred plasticizers include polybutenes, such as Parapol 950 and Parapol 1300 formerly available from ExxonMobil Chemical Company in Houston Texas, as well as polyalpha olefins.

Waxes

Preferred waxes suitable for use in the adhesive composition include polar or non-polar waxes, polypropylene waxes, polyethylene waxes, and wax modifiers. Particularly preferred waxes may be selected from the group consisting of: polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, amorphous waxes, carnauba waxes, castor oil waxes, microcrystalline waxes, beeswax, carnauba wax, castor wax, vegetable wax, candelilla wax, japan wax, ouricury wax, douglas-fir bark wax, rice-bran wax, jojoba wax, bayberry wax, montan wax, peat wax, ozokerite wax, ceresin wax, petroleum wax, paraffin wax, polyethylene wax, chemically modified hydrocarbon wax, substituted amide wax, and combinations and derivatives thereof. In some embodiments, the polar and non-polar waxes may be used together in the same composition.

Low Molecular Weight Polymers

Other additives suitable for use in the adhesive composition include low molecular weight polymers (i.e., low Mn polymer, where low means below Mn of 5000, preferably below 4000, more preferably below 3000, even more preferably below 2500). Preferred low Mn polymers include polymers of lower alpha olefins such as propylene, butene, pentene, hexene and the like (e.g., a poly alpha olefin comprising propylene, butene, pentene, and/or hexene, having a number average molecular weight below 5000 g/mole). A particularly preferred polymer includes polybutene having an Mn of less than 1000. An example of such a polymer is available under the trade name PARAPOL™ 950 from ExxonMobil Chemical Company. PARAPOL™ 950 is a liquid polybutene polymer having an Mn of about 950 and a kinematic viscosity of 220 centi-Stokes (cSt) at 100° C., as measured by ASTM D 445. Other low molecular weight polymers include ethylene propylene copolymers or terpolymers sold by Crompton under the Trilene trade name.

Ester Polymers

In another embodiment the adhesive composition may comprise one or more ester polymers (polyesters). In a preferred embodiment the additive comprises a blend of two (or more) phase system, where the polyester is a discontinuous phase and the phase comprising the random propylene polymer component and the functionalized polymer component is the continuous phase.

Stabilizers

In another embodiment the adhesive composition may comprise one or more stabilizers. Stabilizers suitable for use herein include hindered phenols, sulfur phenols, phosphorous-containing phenols, 1,3,5-trimethyl-2,4,6-tris(3-5-di-tert-butyl-4-hydroxybenzyl) benzene, pentaerythritol tetrakis-3(3,5-di-tert-butyl-4-hydroxyphenyl) propionate, n-octadecyl-3(3,5-di-tert-butyl-4-hydroxyphenyl) propionate, 4,4'-methylenebis(4-methyl-6-tert butylphenol), 4,4'-thiobis(6-tert-butyl-o-cresol), 2,6-di-tert-butylphenol, 6-(4-hydroxyphenoxy)-2,4-bis(n-octylthio)-1,3,5-triazine, 2,4,6-tris(4-hydroxy-3,5-di-tert-butyl-phenoxy)-1,3,5-triazine, di-n-octadecyl-3,5-di-tert-butyl-4-hydroxybenzylphosphonate, 2-(n-octylthio)ethyl-3,5-di-tert-butyl-4-hydroxybenzoate, sorbitol hexa-(3,3,5-di-tert-butyl-4-hydroxy-phenyl) propionate, and combinations or derivatives thereof.

Other Additives

Other preferred additives suitable for use in the adhesive composition include block, antiblock, pigments, dyes, dyestuffs, processing aids, UV stabilizers, lubricants such as polydimethylsiloxane and calcium sterate, adjuvants, surfactants, color masterbatches, flow improvers, crystallization aids, defoamers, preservatives, thickeners, rheology modifiers, humectants, water, solvents, and the like.

Properties of the Adhesive Composition

The adhesive composition of the present invention preferably has a T-peel adhesion to a non-polar substrate (e.g., isotactic polypropylene) of greater than about 175 N/m (1 lb/in) (as measured according to a modified ASTM D-1876 described below). Preferably, the T-peel adhesion to a polar substrate (e.g., Mylar) is greater than about 1.1 lb/in, with greater than about 2.5 lb/in being more preferred.

In a preferred embodiment, the adhesive has a T-peel adhesion to a polar substrate of at least 1 n/m, preferably 2 N/m, more preferably 3 N/m, still more preferably 4 N/m or more, still more preferably 4.5 N/m or more, still more preferably 5 N/m or more, still more preferably 10 N/m or more, still more preferably 20 N/m or more, still more preferably 50 N/m or more, still more preferably 100 N/m or more, and/or a T-peel adhesion to a non polar substrate of at least 1 n/m, preferably 2 N/m, more preferably 3 N/m, still more preferably 4 N/m or more, still more preferably 5 N/m or more, still more preferably 10 N/m or more, still more preferably 20 N/m or more, still more preferably 50 N/m or more, still more preferably 100 N/m or more.

In a preferred embodiment, the adhesive has a T-peel adhesion to a polar substrate of at least 1 pound per inch (lb/in), preferably 2 lb/in, more preferably 3 lb/in, still more preferably 4 lb/in or more, still more preferably 5 lb/in or more, and/or a T-peel adhesion to a non polar substrate of at least 1 lb/in, preferably 2 lb/in, more preferably 3 lb/in, still more preferably 4 lb/in or more, still more preferably 5 lb/in or more.

As demonstrated by fiber tear examples herein, the adhesive composition of the present invention provides excellent adhesion properties to cellulose and other materials of a similar polarity. The adhesive composition of the present invention preferably has a set time of less than about 10 minutes, with less than about 1 minute being more preferred, with less than about 30 seconds being still more preferred. Set time is defined for use herein as the time it takes for a compressed adhesive substrate construct to fasten together with enough adhesion so as to give substrate fiber tear when pulled apart, and thus the bond is sufficiently strong to remove the compression. The bond will likely still strengthen upon further cooling, however, it no longer requires compression.

These set times were measured by placing a molten dot of adhesive on to a file folder substrate taped to a flat table. A file folder tab (1 inch by 3 inch (2.5 cm×7.6 cm)) was placed upon the dot 3 seconds later and compressed with a 500 gram weight. The weight was allowed to sit for about 0.5 to about 10 seconds. The construct thus formed was pulled apart to check for a bonding level sufficient to produce substrate fiber tear. The set time was recorded as the minimum time required for this bonding to occur. Standards of commercially available adhesives were used to calibrate this process.

The adhesive composition of the present invention preferably has a percent 20. substrate fiber tear of from 97 to 100% at 25° C. and 50 to 100% at about −8 to about −30° C. Adhesive test specimens were created by bonding the substrates together with a portion (e.g., a dot) of molten adhesive and compressing the bond with a 500-gram weight until cooled to room temperature (i.e., about 25° C.). The dot size was controlled by the adhesive volume such that in most cases the compressed disk which formed gave a uniform circle just inside the dimensions of the substrates. Once a construct has been produced, it was be subjected to various insults in order to assess the effectiveness of the bond. For low temperature fiber tear test, the bond specimens were placed in a freezer or refrigerator to obtain the desired test temperature. For substrate fiber tear at room temperature, the specimens were aged at ambient conditions. The bonds were separated by hand and a determination made as to the type of failure observed. The amount of substrate fiber tear is expressed herein as a percentage.

Use of the Adhesive Composition

For any of the above described adhesive compositions, the final properties and the suitability for a particular applications depends on the type of tacticity, (stereoregularity), the melting point, the average molecular weight, the molecular weight distribution, the type and level of monomer and comonomer, the sequence distribution, the presence or absence of any additional functionality, and the type and quantity of adhesion additives utilized therein.

The adhesive composition of this invention can be used in any adhesive application, including but not limited to, disposables, packaging, laminates, pressure sensitive adhesives, tapes, labels, wood binding, paper binding, non-wovens, road marking, reflective coatings, tie layers, and the like.

Accordingly, in an embodiment, the package may comprise the adhesive composition, wherein the adhesive composition is applied to at least a portion of one or more packaging elements selected from the group consisting of paper, paperboard, containerboard, tagboard, corrugated board, chipboard, kraft, cardboard, fiberboard, plastic resin, metal, metal alloys, foil, film, plastic film, laminates, and sheeting.

In another embodiment, a disposable article comprises the adhesive composition of the present invention, wherein the adhesive is applied to at least a portion of one or more disposable elements selected from the group consisting of non-woven fabrics, non-woven webs, non-elastic nonwoven fabrics, elastic nonwoven fabrics, necked-bonded laminates, stretch-bonded laminates, spunbond-meltblown-spunbond laminates, polypropylene spunbonded layers, polyethylene layers, combination polyethylene and polypropylene spunbonded layers, elastic strands, styrene-isoprene-styrene, styrene-butadiene-styrene, styrene-ethylene/propylene-styrene, styrene-co-butadiene-styrene, polyurethane, woven fabrics, polypropylene, polyester, body fluid impermeable backsheets, body fluid impermeable layers, body fluid permeable layers, body fluid permeable covers, absorbents, tissues, elastomeric materials, superabsorbent polymers, polyolefin films, polyester films, polyvinylchloride films, polyvinylidine chloride films, polyvinyl acetate films, elastic attachment tape, frontal tape backing, wood, paper, barrier films, film laminates, nonwoven composites, textile materials, woven materials, durable fabrics, absorbents, elastomeric strands, elastomeric webs, tissues, films, coverstock materials, nonwoven polyethylene, perforated polyethylene, superabsorbent polymers, filaments, porous webs, fibers, loop fastener material, spunbonded nonwoven articles, liners, elastic side panels, fastening tape, elastic bands, rayon, nylon, cellulosic pulp, cellulosic fluff, and/or superabsorbent batts.

The inventive adhesive composition may include a consumer good. In addition, a film may comprise the adhesive composition and further comprise an additional component selected from the group consisting of polyethylene, polypropylene, polyester, polyethylene terephthalate, polyvinyl chloride, polyvinylidine chloride, polyvinyl acetate, polyamides, paper, foil, metal, metal alloys, and combinations thereof. The adhesive composition disclosed herein may also comprise a pressure sensitive adhesive.

In an embodiment, the present invention may include a laminate article comprising two or more layers in combination with the inventive adhesive composition, preferably wherein at least one of the layers comprises one or more materials selected from the group consisting of wood, plastic, paper, rubber, thermoplastic, cardboard, metal, metal foil, metallized surfaces, cloth, non-wovens, spunbonded fibers, stone, plaster, glass, rock, ceramics, films, releasing paper, a releasing agent, foam, and a combination thereof.

In an embodiment, the present invention may include a fiber product comprising one or more fibrous materials in combination with the adhesive composition, wherein the fibrous material comprises one or more materials selected from the group consisting of cotton, hemp, cellulose esters, polyesters, wool, Kevlar, nylon, nomax, polyamides, polyacrylates, polyolefins, and combinations thereof. In addition, the present invention may comprise a hot melt adhesive, a carpet, and/or a tape.

In an embodiment, a roofing element comprises the adhesive composition, wherein the roofing element further comprises rubber, fiberglass, aramid, carbon, polyester, nylon, asphalt, fabric, aggregate, copper, steel, zinc, aluminum, and combinations thereof. The present invention may also include a reflective article comprising: a reflective material at least partially applied to a substrate surface.

In an embodiment, a tape comprising the adhesive composition may also include a backing element selected from the group consisting of polymeric films, polyester films, polyolefin-based films, polyurethane films, polyvinylchloride foam, polyethylene foam, nonwoven polyurethane, nonwoven polyester, knitted fabric, face stock, paper, synthetic polymeric material, plastic, polyolefins, such as polyethylene and polypropylene, polyester, polyethylene terphthalate, polyvinyl chloride, kraft paper, polymers, laminates, latex saturated paper, foil, litho stock, lightweight stock, styrene foam, laminated foam, expanded polystyrene foam, woven fabric, non-woven fabric, cloth, creped paper, thermoplastic, and mixtures thereof.

The adhesive composition of the present invention is also suitable for use in a woodworking article, comprising the adhesive composition and a structural element, wherein the adhesive is applied to at least a portion of the structural element. The structural element of the woodworking article may also comprise wood, plywood, plastic, and/or veneer. Examples include lumber, hardwood, fiberboard, plasterboard, gypsum, wallboard, plywood, PVC, melamine, polyester, impregnated paper, and/or sheetrock.

In an embodiment, a label for adhering to a substrate comprises the adhesive composition, a backing element, and a release liner, wherein the release liner is adhered to the backing element using the adhesive. In another embodiment, a bookbinding article comprises the adhesive composition and a binder element, preferably wherein the adhesive is applied to at least a portion of the binder element.

In an embodiment, a road marking composition comprises a binder comprising the adhesive composition, and one or more fillers selected from the group consisting of sand, pigments, glass beads, polymer-based beads, calcium carbonate, crushed marble, aggregate, dolomite, talc, glass pearls, prismatic reflectors, lens reflectors, calcite spar, silica sand, graphite, fly ash, cement dust, clay, feldspar, nepheline, fumed silica, alumina, magnesium oxide, zinc oxide, barium sulfate, aluminum silicate, calcium silicate, tianates, chalk, reflective inorganic fillers, extending fillers, beads, calcium sulfate, calcium metasilicate, quartz powder, calcined flint powder, mica, calcium silicate glass fibers, dyes, granite, plaster, slaked lime, alumina, diatomaceous earth, reflecting agents, modifiers, white lead, lithopone, chrome yellow, cadmium yellow, resin beads, polymeric gels, polymers, ceramic materials, crushed glass, stone, corundum, aluminum hydroxide, silicon oxide, glass bubbles, and zinc neodecanoate.

In another embodiment is a sealant composition comprising a sealant mixture comprising the adhesive composition, wherein the sealant mixture comprises one or more adhesion promoters selected from the group consisting of silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxpropyltrimethoxysilane, aminopropyltriethoxysilane, aminoethylaminopropyltrimethoxysilane, ureidopropyltrimethyloxysilane, bis-gamma-trimethoxysilyl-propylurea, 1,3,5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof.

The present invention may also include a paving composition comprising asphalt, aggregate, and the adhesive composition. The adhesive composition may also be included in a glue stick comprising an elongated member, in a pipe wrapping article comprising the adhesive composition and a wrapping element, wherein the adhesive is at least partially disposed on or within the wrapping element. Also, in an embodiment, the present invention may include an article having a transparent pane, comprising one or more transparent panels and the adhesive composition applied to at least a portion of the one or more panels.

In a preferred embodiment of the present invention, an article comprises the adhesive as disclosed herein. The article may comprise a diaper, a feminine hygiene product, a non-woven substrate, or the like. An embodiment of the present invention may also include a molded part, a fiber, a non-woven fabric, or the like comprising the adhesive disclosed herein. In another embodiment, the present invention may include a fiber, a non-woven fabric, a molded article or the like which is at least partially coated with the adhesive disclosed herein.

In an effort to further clarify our invention, we provide a brief history and examples of our own testing. This is provided as exemplification, and not for limitation. Exemplary adhesive compositions are selected herein to provide meaningful comparisons between the inventive adhesive composition and the prior art. Accordingly, concentrations of the various components of the adhesive compositions are selected to provide samples having data in ranges which allow for meaningful comparison based on industry standards. Those skilled in the art will recognize other unnamed applications and processes which fall within the scope of this invention. It is not our intent to exclude such applications and processes which are apparent in light of our description, but merely offer helpful exemplification of our invention.

EXAMPLES

Materials

The random propylene polymers were produced as described above in the "Random Propylene Polymer" section using metallocene catalyst (dimethylsilylbisindenyl hafnium dimethyl with dimethylaniliniumtetrakis (pentafluorophenyl) borate) in a solution process at about 70° C.

Functionalization of RPP-1, RPP-2 and RPP-3 was carried out in a non-intermeshing counter-rotating twin screw extruder (30 mm, L/D =48) by using the following conditions: 97.5-98.5 wt % of polymer, 1.5-2.5 wt % of Crystalman™ maleic anhydride fed at a rate of 7 kg/hr to the hopper of the extruder and 0.24-0.40 wt % of a 10% solution of Luperox™ 101 dissolved in Marcol™ 52 oil added to the second barrel. The screw speed was set at 125 rpm and the following temperature profile was used: 180, 190, 190, 190° C. with the die at 180° C. Excess reagents as well as peroxide decomposition products were removed with vacuum prior to the recovery of the polymer.

Properties of the RPP's and the random propylene polymer functionalized with a functional group (e.g., random propylene polymer functionalized with maleic anhydride (random propylene polymer-g-MA)) used herein are described in the following table:

| Material | Wt % MA | Wt % (Mol %) $C_2$ | $M_n$/1000 | $M_w$/1000 | Tacticity Index | $M_z$/1000 | ΔHf (J/g) |
|---|---|---|---|---|---|---|---|
| RPP-1 | | 15.5 (21.6) | 142 | 249 | 90.9 | 384 | 11 |
| RPP-2 | | 15.0 (20.9) | 82 | 136 | 88.0 | 200 | 14 |
| RPP-3 | | 11.0 (15.6) | 98 | 162 | 90.1 | 240 | 40 |
| RPP-g-MA-1 | 1.17 | 14.9 (20.8) | 19 | 88 | | 140 | |
| RPP-g-MA-4 | 1.98 | 14.4 (20.1) | 16 | 66 | | 103 | |
| RPP-g-MA-5 | 1.92 | 10.7 (15.2) | 17 | 74 | | 116 | |

The precursor polymer for random propylene polymer-g-MA-1 was random propylene polymer-1. The precursor polymer for random propylene polymer-g-MA-4 was a random propylene polymer with about 15 wt % $C_2$ similar to random propylene polymer-2. The precursor for random propylene polymer-g-MA-5 was a random propylene polymer with about 11 wt % $C_2$, similar to random propylene polymer-3.

Preparation of Polymers

Unless otherwise noted, polymers used for adhesive evaluation herein were produced according to the following general procedure. Polymerization was performed in a liquid filled, single-stage continuous reactor using mixed metallocene catalyst systems. The reactor was a 0.5-liter stainless steel autoclave reactor and was equipped with a stirrer, a water-cooling/steam-heating element with a temperature controller, and a pressure controller. Solvents, monomers such as ethylene and propylene, and comonomers (such as butene and hexene), if present, were first purified by passing through a three-column purification system. The purification system consists of an Oxiclear column (Model #RGP-R1-500 from Labclear) followed by a 5A and a 3A molecular sieve columns. Purification columns were regenerated periodically whenever there is evidence of lower activity of polymerization. Both the 3A and 5A molecular sieve columns were regenerated in-house under nitrogen at a set temperature of 260° C. and 315° C., respectively. The molecular sieve material was purchased from Aldrich. Oxiclear column was regenerated in the original manufacture.

The solvent, monomers and comonomers were fed into a manifold first. Ethylene (when used) from in-house supply was delivered as a gas solubilized in the chilled solvent/monomer mixture in the manifold. The mixture of solvent and monomers were then chilled to about −15° C. by passing through a chiller before fed into the reactor through a single tube. All liquid flow rates were measured using Brooksfield mass flow meters or Micro-Motion Coriolis-type flow meters. . Ethylene flow rate was metered through a Brookfield mass flow controller.

The catalyst compounds used to produce semi-crystalline polypropylene rac-dimethylsilylbis(2-methyl-4-phenylindenyl)zirconium dimethyl (obtained from Albemarle) and rac-1,2-ethylene-bis(4,7-dimethylindenyl)hafnium dimethyl (obtained from Boulder Scientific Company).

The catalyst compounds used to produce amorphous polypropylene were, dimethylsilyl(tetramethylcyclopentadienyl)(cyclododecylamido)titanium dimethyl (Obtained from Albemarle) and [di(p-triethylsilylphenyl)methylene](cyclopentadienyl) (3,8-di-t-butylfluorenyl)hafnium dimethyl (Obtained from Albemarle).

The catalysts were preactivated with N,N-dimethylanilinium tetrakis(pentafluorophenyl) borate (obtained from Albemarle) at a molar ratio of 1:1 to 1:1.1 in 700 ml of toluene at least 10 minutes prior to the polymerization reaction. The catalyst systems were diluted to a concentration of catalyst ranging from 0.2 to 1.4 mg/ml in toluene. All catalyst solutions were kept in an inert atmosphere with <1.5 ppm water content and fed into reactor by metering pumps. The catalyst solution was used for all polymerization runs carried out in the same day. New batch of catalyst solution was prepared in case that more than 700 ml of catalyst solution was consumed in one day.

In cases of polymerization involving multiple catalyst, each catalyst solution was pumped through separate lines, and then mixed in a manifold, and fed into the reactor through a single line. The connecting tube between the catalyst manifold and reactor inlet was about 1 meter long. The contact of catalyst, solvent and monomers took place in the reactor. Catalyst pumps were calibrated periodically using toluene as the calibrating medium. Catalyst concentration in the feed was controlled through changing the catalyst concentration in catalyst solution and/or changing in the feed rate of catalyst solution. The feed rate of catalyst solution varied in a range of 0.2 to 5 ml/minute.

As an impurity scavenger, 55 ml of tri-iso-butyl aluminum (25 wt.% in toluene, Akzo Noble) was diluted in 22.83 kilogram of hexane. The diluted tri-iso-butyl aluminum solution was stored in a 37.9-liter cylinder under nitrogen blanket. The solution was used for all polymerization runs until about 90% of consumption, and then a new batch was prepared. Feed rates of the tri-iso-butyl aluminum solution varied from polymerization reaction to reaction, ranging from 0 (no scavenger) to 4 ml per minutes.

The reactor was first cleaned by continuously pumping solvent (e.g., hexane) and scavenger through the reactor system for at least one hour at a maximum allowed temperature (about 150° C.). After cleaning, the reactor was heated/cooled to the desired temperature using water/steam mixture flowing through the reactor jacket and controlled at a set pressure with controlled solvent flow. Monomers and catalyst solutions were then fed into the reactor when a steady state of operation was reached. An automatic temperature control system was used to control and maintain the reactor at a set temperature. Onset of polymerization activity was determined by observations of a viscous product and lower temperature of water-steam mixture. Once the activity was established and system reached steady state, the reactor was lined out by continuing operating the system under the established condition for a time period of at least five times of mean residence time prior to sample collection. The resulting mixture, containing mostly solvent, polymer and unreacted monomers, was collected in a collection box after the system reached a steady state operation. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of 2.41 MPa-g and in the temperature range of 110 to 130° C.

The propylene-based polymers (iPP-g-aPP) are in-reactor blends of propylene homopolymers prepared with two metallocene catalysts, wherein a first catalyst, di(p-triethylsilylphenyl)methylene(cyclopentadienyl)(3,8-di-t-butylfluorenyl)hafnium dimethyl), produces atactic polypropylene, (aPP), and wherein a second catalyst (e.g., rac-dimethylsilyl bis(2-methyl-4-phenylindenyl) zirconium dimethyl), produces isotactic polypropylene, (iPP).

Two iPP-g-aPPs used in these examples are described as follows:

|  | iPP-g-aPP-1 | iPP-g-aPP-2 |
|---|---|---|
| $T_c$, °C. | 86 | 73 |
| $T_m$, °C. | 138 | 133 |
| $T_g$, °C. | −4 |  |
| $\Delta H_f$, J/g | 30 | 30 |
| 190° C. η, cp | 6000 | 1700 |
| $M_n$ | 18,000 | 13,000 |
| $M_w$ | 48,000 | 38,000 |
| $M_z$ | 83,000 | 69,000 |
| Tacticity Index |  | 43.0 |

| Functionalized Polymer Component | | | | |
|---|---|---|---|---|
| Material | Wt % MA | $M_n$ | $M_w$ | $M_z$ |
| PP 3155 | — | 50,000 | 144,000 | 271,000 |
| a-srPP-3-g-MA | 1.92 | 17,000 | 33,000 | 55,000 |
| a-srPP-5-g-MA | 1.00 | 29,000 | 68,000 | 116,000 |
| a-srPP-6-g-MA | 1.12 | 60,000 | 135,000 | 263,000 |
| (iPP-g-aPP-2)-g-MA | 1.41 | 12,000 | 37,000 | 65,000 |
| MA-iPP | 5.24 | 3,700 | 9,800 | 18,000 |

The (iPP-g-aPP-2)-g-MA polymer was prepared with a solution process. The precursor polymer was iPP-g-aPP-2. The experimental procedure was similar to that of preparing a-srPP-g-MA. The iPP-g-MA polymer is POLYLETS® MAPP 40 from CHUSEI. Its properties are described in the following table:

| Typical Properties: | |
|---|---|
| Softening Point, ASTM D36, °C. | 143-155 |
| Viscosity, ASTM D3236, cp @ 190° C. | 400-425 |
| Penetration, ASTM D1321, dmm @ 25° C. | <1 |
| Acid Value | 45-50 |
| $T_c$, °C. | 104 |
| $T_m$, °C. | 150 |
| $\Delta H_u$, J/g | 58 |
| $M_n/10^3$ | 3.7 |
| $M_w/10^3$ | 9.8 |
| $M_z/10^3$ | 18 |

SpectraSyn 10 is an $BF_3$ catalyzed polyalphaolefin (PAO) in which the alphaolefin used is decene. It has a viscosity of 10 cSt at 100° C., pour point of −54° C., $M_n$ of 720 and $M_w$ of 760. The iPP used in the plasticized adhesive formulations, PP 3155 (ExxonMobil Chemical Company; no nucleating agent; only stabilizers), has an MFR of 35. The substrates used for adhesion studies were Mylar® (thickness=0.08 mm; used as received), aluminum (thickness=0.10 mm; cleaned with acetone before use) and iPP (thickness=0.10 mm; a cast film of PP 4612E2 with $M_n/1000$=64, $M_w/1000$=304 and $M_z/1000$=1145).

| Substrates | | | | | | |
|---|---|---|---|---|---|---|
| Composition | Polar/non-polar | | Thickness | $M_n$ | $M_w$ | $M_z$ |
| Isotactic polypropylene (iPP) | Non-polar ($x^p = 0$) | PP 4612E2 (Note 1) | 0.1 mm | 64,000 | 304,000 | 1,145,000 |
| Polyester (PET) | Polar | Mylar ® (Note 2) | 0.08 mm | | | |
| Aluminum (Al) | Polar | Aluminum (Note 3) | 0.1 mm | | | |

(Note 1)
a cast film of PP 4612E2 from ExxonMobil Chemical Company
(Note 2)
Mylar ® polyester (thickness = 0.08 mm; used as received)
(Note 3)
cleaned with acetone before use

| Tackifiers | | |
|---|---|---|
| Escorez ® 5380 | Hydrogenated resin produced from dicyclopentadiene feedstock, exhibiting a ring and ball softening point of 85° C. according to ASTM E-28 | ExxonMobil Chemical Company |
| Escorez ® 5690 | hydrogenated aromatic modified resin produced from dicyclopentadiene feedstock, exhibiting a ring and ball softening point of 90° C. according to ASTM E-28 | ExxonMobil Chemical Company |
| Wax | | |
| C80 Sasolwax | Fischer-Tropsch wax | Sasol |

Experimental

Molecular weights of the polymers were measured using a Waters 150 C GPC (column set: 3 Polymer Labs PL gel Mixed-B LS or equivalent) using 1,2,4-trichlorobenzene as the permeation solvent (polymer concentration ~3-4 mg/ml). Maleic acid contents of the maleated polymers were determined as follows. Approximately 0.5 g of the polymer was dissolved in 150 ml of toluene at boiling temperature. A potentiometric titration with TBAOH (tetra-butylammonium hydroxide) using bromothymol blue as the color indicator was performed on the heated solution in which the polymers did not precipitate during titration.

Solid-state NMR measurements were performed in a Bruker DSX 500 spectrometer, with a 13° C. resonance frequency of 126.76 MHz, as a means of determining the $C_2$ contents of the various random propylene polymer and MA-random propylene polymers. A $^{13}C$ direct polarization/high-power $^1H$ decoupling pulse sequence was used. Spectra were acquired at 60° C. or higher to ensure most of the crystallites were melted. Recycle time was. 20 s. The method may have a systematic error of up to 1 wt %.

The blends of iPP-g-aPP/E-5380 or iPP-g-aPP/E-5690 with random propylene polymer or random propylene polymer-g-MA were mixed thoroughly and homogeneously in the thermal cell of a Brookfield viscometer equipped with an, electrically driven stirrer at 180° C. After mixing, blends were degassed in a vacuum oven (continuously purged by nitrogen) at 180° C. and subsequently cooled down to 25° C. Some blends were then molded into thin sheets of material with thickness about 0.4 mm using a molding temperature of 180° C. and a molding time of 15 min.

Blends of random proylene polymer, PP 3155, SpectraSyn 10 and functionalized polyolefin were mixed thoroughly and homogeneously in a Brabender mixer at 190° C. PP 3155 was added first, followed by Irganox 2215. The random proylene polymer was then added, followed by the functionalized polyolefin, if needed. Finally, SpectraSyn 10 was added slowly until this NFP was all incorporated in the blend. After mix, each blend was then molded into a thin sheet of material with thickness about 0.4 mm by using a molding temperature of 190° C. and a molding time of 15 min.

For the preparation of the T-peel specimens, the above thin sheet of molded sample was laminated between two pieces of PET substrate or aluminum foil in a positive pressure, Teflon-coated mold. The bonding temperature was 180° C. and the bonding time was 30 s. For the case of the iPP substrate, the bonding temperature was 150° C. and the bonding time was 30 s. These laminates were then cut into ½"=1.3 cm wide specimens. T-peel measurements were performed after about 12 hr at room temperature and at a separation speed of 2"/min=850 μm/s. Also, repeat T-peel measurements were performed after the laminates were conditioned for two weeks by using the same test temperature and test speed. Adhesion was measured by the average T-peel adhesion, F/w, where F is the average peel force and w is the width of the test specimen.

For stress-strain measurements, the polymeric compositions were molded at 180° C. for 15 min into a pad with a thickness of about 2 mm. The test specimen was die-cut from a small dumbbell (the base is ~1 cm×1 cm and the center, narrow strip is ~0.6 cm×0.2 cm). Measurements using triplicate samples were performed at room temperature and at a separation speed of 2"/min=850 μm/s in an Instron Tester. The toughness is defined as the area under the stress-strain curve.

Set time is the time it takes for a compressed adhesive/substrate laminate to bond together with sufficient adhesion so that substrate fiber tear occurs when pulled apart. It was measured by placing a molten dot of adhesive on a file folder substrate taped to a flat surface. The file folder used was a typical manila letter size (⅓ cut) stock having a minimum of 10% post consumer recycle paper content (Smead Paper, stock number 153L, UPC number 10330). A file folder tab (1 inch×3 inch (2.5 cm×7.6 cm)) was placed on the dot 3 s later and compressed with a 500-gram weight for about 0.5-1 s.

The laminate thus formed was pulled apart to check for a bonding level sufficient to produce substrate fiber tear. The set time was recorded as the minimum time required for this bonding to occur. Standards of commercially available adhesive, such as Advantra 9250 (a commercial blend of $C_2/C_8$ metallocene polymers, tackifiers, and wax from H. B. Fuller), were used to calibrate this process.

For adhesion to cardboard, the Inland paper board (high performance box board from Inland Paper Board and Packaging Company of Rome) was used. Test specimens were prepared by bonding 2 pieces of the substrate together with a dot of molten adhesive and compressing the bond with a 500-gram weight until cooled to room temperature. Upon compression, a uniform circle of adhesive was formed between the substrates. This laminate was then peeled open in order to assess the effectiveness of the bond. Once a bond failed to a paper substrate, the effectiveness of the bond was quantified by estimating the area of the adhesive dot that retained paper fibers as the laminate failed along the bond line. This estimate is referred as the % (fiber tear). For adhesion tested at room temperature, the specimens were conditioned at ambient conditions. For low temperature adhesion, they were placed in a freezer or refrigerator to obtain the desired test temperature. In all cases, the bond was separated by hand and the type of failure was observed. The amount of substrate fiber tear is expressed as a percentage. A zero % (fiber tear) under the above conditions signifies a loss of adhesion.

A portable hardness Type A durometer (Shore® Instrument & Mfg. Co., Inc., Freeport, N.Y.) was used to measure the hardness. The instantaneous value was used. Dynamic melt viscosity at 190° C. was determined by an ARES Analyzer (1998) equipped with the 25-mm diameter parallel plates. The strain was 5% and the frequency varied from 0.01 to 100 rad/s. Brookfield viscosity was measured at 170° C. according to ASTM D3236. The T-Peel results indicate triplicate analysis. The following representations are utilized in Tables I and II:

TABLE 1

Adhesion of Neat random propylene polymer and random propylene polymer-g-MA:

| | RPP-1 Comparative Sample 1 | RPP-g-MA-1 Sample-1 | RPP-2 Comparative Sample 2 | RPP-MA-4 Sample-2 | RPP-3 Comparative Sample 3 | RPP-g-MA-5 Sample-3 |
|---|---|---|---|---|---|---|
| T-Peel to PET, N/m (lb/in) | | | | | | |
| After 12 hr | 7.35 (0.042)* | 1,725.9 (9.862)* | 15.75 (0.090)* | 2612.8 (14.93)† | 18.55 (0.106)* | 200 (1.143)* |
| After 2 Weeks | 2.45 (0.014)* | 1960 (11.20)* | 6.83 (0.039)* | 2917 (16.67)† | 2.28 (0.013)* | 472.2 (2.698)* |
| T-Peel to Al, N/m (lb/in) | | | | | | |
| After 12 hr | 43.1 (0.246)* | 5,168 (29.53)* | 45.0 (0.257)* | 7,739 (44.22)† | 29.4 (0.168)* | 9,086 (51.92)† |
| After 2 Weeks | 0* | 6,370 (36.40)* | 0* | >7,000 (>40)††† | 0* | >7,000 (>40)††† |
| T-Peel to iPP, N/m (lb/in) | | | | | | |
| After 12 hr | 3518 (20.10)† | 3953 (22.59)†† | 3393 (19.39)† | 3824 (21.85)† | 3574 (20.42)† | 4,165 (23.80)†† |
| After 2 Weeks | 3,647 (20.84)† | 4,305 (24.60)* | 3,354 (19.17)† | 3,134 (17.91)† | 3,861 (22.06)† | 4,487 (25.64)* |
| 100% Modulus, MPa | 1.86 | 1.60 | 2.32 | 1.55 | 1.63 | 3.99 |
| Tensile Strength at Break, MPa | 14.1 | 8.40 | 13.2 | 5.73 | 8.46 | 11.9 |
| Percent Elongation at Break, % | 950 | 1,070 | 1,000 | 1,010 | 770 | 770 |
| Toughness, MPa | 77 | 63 | 89 | 47 | 42 | 74 |

*AIF—apparent interfacial failure (debonded adhesive left only on one side of the substrate);
†CF—cohesive failure (debonded adhesive left on both sides of the substrate);
**CF/AIF - indicates that two samples fail in CF mode and one sample fails in AIF mode;
***AIF/CF - indicates that two samples fail in AIF mode and one sample fails in CF mode;
††Substrate elongated - the substrate was elongated when the bond was opened at the same time;
†††Bond remained intact - only the substrate was elongated and eventually broken with no bond separation at all.

TABLE II

Adhesion of Formulated random propylene polymer and random propylene polymer-g-MA

| | Comparative Sample 4 Wt % | Comparative Sample 5 Wt % | Sample 5 Wt % | Comparative Sample 6 Wt % | Sample 6 Wt % | Comparative Sample 7 Wt % | Sample 7 Wt % |
|---|---|---|---|---|---|---|---|
| iPP-g-aPP-1 | 90 | 72 | 72 | 72 | 72 | 72 | 72 |
| E-5380 | 10 | 8 | 8 | 8 | 8 | 8 | 8 |
| RPP-1 | — | 20 | — | — | — | — | — |
| random RPP-g-MA-1 | — | — | 20 | — | — | — | — |

TABLE II-continued

Adhesion of Formulated random propylene polymer and random propylene polymer-g-MA

| | Comparative Sample 4 Wt % | Comparative Sample 5 Wt % | Sample 5 Wt % | Comparative Sample 6 Wt % | Sample 6 Wt % | Comparative Sample 7 Wt % | Sample 7 Wt % |
|---|---|---|---|---|---|---|---|
| RPP-2 | — | — | — | 20 | — | — | — |
| RPP-4 | — | — | — | — | 20 | 20 | — |
| RPP-3 | — | — | — | — | — | — | — |
| RPP-g-MA-5 | — | — | — | — | — | — | 20 |
| T-Peel to PET, N/m (lb/in) | | | | | | | |
| After 12 hr | 8.75 (0.050)* | 16.1 (0.092)* | 2,170 (12.40)† | 16.98 (0.097)* | 447.3 (2.556)† | 9.3 (0.053)* | 2,147 (12.27)† |
| After 2 Weeks | 4.7 (0.027)* | 8.4 (0.048)* | 3,169 (18.11)† | 13.1 (0.075)* | 1,263 (7.215)* | 3.5 (0.020)* | 1,746 (9.979)*** |
| T-Peel to iPP, N/m (lb/in) | | | | | | | |
| After 12 hr | 704 (4.023)† | 762 (4.354)* | 1,211 (6.922)† | 1,302*** | 651 (3.720)* | 2,994 (17.11)† | 810 (4.630)† |
| After 2 Weeks | 632 (3.609)† | 760 (4.340)† | 1534 (8.766)* | 1701 (9.722)† | 600 (3.426)* | 3,032 (17.33)† | 719 (4.111)* |

TABLE III random propylene polymer-g-MA Used as Adhesion Promoter in Packaging Hot Melt Adhesives

| | Comparative Sample 8 (Wt %) | Sample 4 (Wt %) | Sample 9 (Wt %) |
|---|---|---|---|
| iPP-g-aPP-2 | 80 | 75 | 75 |
| E-5690 | 10 | 10 | 10 |
| C80 Sasolwax | 10 | 10 | 10 |
| random propylene polymer-g-MA-4 | — | 5 | — |
| random propylene polymer-g-MA-5 | — | — | 5 |
| Performance | | | |
| Brookfield Viscosity at 170° C. cp | 1700 | 2300 | 2100 |
| Set Time, seconds | 3 | 2.5 | 3.5 |
| % (Fiber Tear) from Inland Cardboard @ | | | |
| 25° C. | 96 | 99 | 99 |
| −8° C. | 0 | 65 | 3 |
| −30° C. | 13 | 80 | 8 |

TABLE IV (No Functionalized Polyolefin):

| | Comp. 0 | Comp. 00 | Comp. 1 | Comp. 2 |
|---|---|---|---|---|
| RPP-1 | 80 | 72 | 64 | 52 |
| PP 3155 | 20 | 18 | 16 | 13 |
| SpectraSyn 10 | — | 10 | 20 | 35 |
| Irganox 2215 | 0.10 | 0.09 | 0.08 | 0.07 |
| T-Peel to PET, N/m (lb/in) | | | | |
| After 12 hr | 5.25 (0.03)* | 5.25 (0.03)* | 7.00 (0.04)* | 8.75 (0.05)* |
| After 2 Weeks | 0 (0)* | 0 (0)* | 22.8 (0.13)* | 0 (0)* |
| T-Peel to Al, N/m (lb/in) | | | | |
| After 12 hr | 8.75 (0.05)* | 8.75 (0.05)* | 1.75 (0.01)* | 3.50 (0.02)* |
| After 2 Weeks | 0 (0)* | 7.00 (0.04)* | 0 (0)* | 0 (0)* |
| T-Peel to PP, N/m (lb/in) | | | | |
| After 12 hr | 4,113 (23.5)†† | 3,833 (21.9)†† | 3,763 (21.5)* | 4,025 (23.0)† |
| After 2 Weeks | 4,323 (24.7)* | 4,358 (24.9)* | 4,008 (22.9)* | 3,675 (21.0)* |
| Hardness | 71A | 63A | 61A | 55A |
| 100% Modulus, MPa | 2.76 | 2.04 | 1.75 | 1.08 |
| Tensile Strength, MPa | 14.5 | 14.1 | 11.6 | 7.49 |
| Strain at Break | 790 | 960 | 960 | 1100 |
| Toughness, MPa | 81 | 90 | 76 | 58 |
| Complex Viscosity, kPa · s | | | | |
| @ 190° C., 1 rad/s | 4.95 | 3.32 | 1.96 | 0.74 |
| @ 190° C., 100 rad/s | 1.10 | 0.84 | 0.57 | 0.289 |

*AIF;
**CF/AIF;
†CF;
††Substrate elongated

TABLE V (Functionalized Polyolefin is RPP-g-MA-1):

| | Comp. 1 | Samp. 1A | Comp.-2 | Samp.-2A |
|---|---|---|---|---|
| RPP-1 | 64 | 44 | 52 | 32 |
| RPP-g-MA-1 | — | 20 | — | 20 |
| PP 3155 | 16 | 16 | 13 | 13 |

TABLE V-continued (Functionalized Polyolefin is RPP-g-MA-1):

| | Formulation | | | |
|---|---|---|---|---|
| | Comp. 1 | Samp. 1A | Comp.-2 | Samp.-2A |
| SpectraSyn 10 | 20 | 20 | 35 | 35 |
| Irganox 2215 | 0.08 | 0.08 | 0.07 | 0.07 |
| T-Peel to PET, N/m (lb/in) | | | | |
| After 12 hr | 7.00 | 1,272 | 8.75 | 116 |
| | (0.04)* | (7.27)* | (0.05)* | (0.66)* |
| After 2 Weeks | 22.8 | 2,100 | 0 | 68.3 |
| | (0.13)* | (12.0)* | (0)* | (0.39)* |
| T-Peel to Al, N/m (lb/in) | | | | |
| After 12 hr | 1.75 | 870 | 3.50 | 341 |
| | (0.01)* | (4.97)* | (0.02)* | (1.95)* |
| After 2 Weeks | 0 | 817 | 0 | 422 |
| | (0)* | (4.67)* | (0)* | (2.41)* |
| T-Peel to PP, N/m (lb/in) | | | | |
| After 12 hr | 3,763 | 3,728 | 4,025 | 4,025 |
| | (21.5)* | (21.3)† | (23.0)† | (23.0)† |
| After 2 Weeks | 4,008 | 3,955 | 3,675 | 4,673 |
| | (22.9)* | (22.6)* | (21.0)* | (26.7)* |
| Hardness | 63A | 64A | 55A | 58A |
| 100% Modulus, MPa | 1.75 | 1.79 | 1.08 | 1.29 |
| Tensile Strength, MPa | 11.6 | 9.38 | 7.49 | 5.35 |
| Strain at Break | 960 | 960 | 1100 | 1100 |
| Toughness, MPa | 76 | 66 | 58 | 47 |
| Complex Viscosity, kPa · s | | | | |
| @ 190° C., 1 rad/s | 1.96 | 0.78 | 0.74 | 0.17 |
| @ 190° C., 100 rad/s | 0.57 | 0.29 | 0.28 | 0.10 |

*AIF;
**CF/AIF;
†CF;
††Substrate elongated

TABLE V'

(Functionalized Polyolefin is RPP-g-MA-4):

| | Formulation | | | |
|---|---|---|---|---|
| | Comp. 1 | Samp. 3A | Comp.-2 | Samp.-4A |
| RPP-1 | 64 | 44 | 52 | 32 |
| RPP-g-MA-4 | — | 20 | — | 20 |
| PP 3155 | 16 | 16 | 13 | 13 |
| SpectraSyn 10 | 20 | 20 | 35 | 35 |
| Irganox 2215 | 0.08 | 0.08 | 0.07 | 0.07 |
| T-Peel to PET, N/m (lb/in) | | | | |
| After 12 hr | 7.00 | 915 | 8.75 | 26.3 |
| | (0.04)* | (5.23)* | (0.05)* | (0.15)* |
| After 2 Weeks | 22.8 | 1,691 | 0 | 133 |
| | (0.13)* | (9.66)* | (0)* | (0.76)* |
| T-Peel to Al, N/M (lb/in) | | | | |
| After 12 hr | 1.75 | 578 | 3.50 | 130 |
| | (0.01)* | (3.30)* | (0.02)* | (0.74)* |
| After 2 Weeks | 0 | 1,528 | 0 | 282 |
| | (0)* | (8.73)* | (0)* | (1.61)* |
| Hardness | 63A | 55A | 55A | 53A |
| 100% Modulus, MPa | 1.75 | 1.70 | 1.08 | 1.27 |
| Tensile Strength, MPa | 11.6 | 8.48 | 7.49 | 4.89 |
| Strain at Break | 960 | 960 | 1100 | 1030 |
| Toughness, MPa | 76 | 61 | 58 | 42 |
| Complex Viscosity, kPa · s | | | | |
| @ 190° C., 1 rad/s | 1.96 | 0.69 | 0.74 | 0.21 |
| @ 190° C., 100 rad/s | 0.57 | 0.259 | 0.28 | 0.10 |

TABLE V''

(Functionalized Polyolefin is RPP-g-MA-5):

| | Formulation | | | |
|---|---|---|---|---|
| | Comp. 1 | Samp. 5A | Comp.-2 | Samp. 6A |
| RPP-1 | 64 | 44 | 52 | 32 |
| RPP-g-MA-5 | — | 20 | — | 20 |
| PP 3155 | 16 | 16 | 13 | 13 |
| SpectraSyn 10 | 20 | 20 | 35 | 35 |
| Irganox 2215 | 0.08 | 0.08 | 0.07 | 0.07 |
| T-Peel to PET, N/m (lb/in) | | | | |
| After 12 hr | 7.00 | 1,890 | 8.75 | 602 |
| | (0.04)* | (10.8)* | (0.05)* | (3.44)* |
| After 2 Weeks | 22.8 | 2,643 | 0 | 999 |
| | (0.13)* | (15.1)* | (0)* | (5.71)* |
| T-Peel to Al, N/m (lb/in) | | | | |
| After 12 hr | 1.75 | 1,302 | 3.50 | 1,129 |
| | (0.01)* | (7.44)* | (0.02)* | (6.45)* |
| After 2 Weeks | 0 | 2,398 | 0 | 1,092 |
| | (0)* | (13.7)* | (0)* | (6.24)* |
| Hardness | 63A | 62A | 55A | 62A |
| 100% Modulus, MPa | 1.75 | 2.31 | 1.08 | 1.92 |
| Tensile Strength, MPa | 11.6 | 11.1 | 7.49 | 7.20 |
| Strain at Break, % | 960 | 1010 | 1100 | 1080 |
| Toughness, MPa | 76 | 85 | 58 | 64 |
| Complex Viscosity, kPa · s | | | | |
| @ 190° C., 1 rad/s | 1.96 | 0.75 | 0.74 | 0.21 |
| @ 190° C., 100 rad/s | 0.57 | 0.28 | 0.28 | 0.10 |

*AIF;
**CF/AIF;
†CF;
††Substrate elongated

TABLE VI (Functionalized Polyolefin is a-srPP-3-g-MA):

| | Formulation | | | |
|---|---|---|---|---|
| | Comp. 1 | Samp. 1B | Comp.-2 | Samp. 2B |
| RPP-1 | 64 | 44 | 52 | 32 |
| a-srPP-3-g-MA | — | 20 | — | 20 |
| PP 3155 | 16 | 16 | 13 | 13 |
| SpectraSyn 10 | 20 | 20 | 35 | 35 |
| Irganox 2215 | 0.08 | 0.08 | 0.07 | 0.07 |
| T-Peel to PET, N/m (lb/in) | | | | |
| After 12 hr | 7.00 | 14.0 | 8.75 | 12.3 |
| | (0.04)* | (0.08)* | (0.05)* | (0.07)* |
| After 2 Weeks | 22.8 | 8.75 | 0 | 8.75 |
| | (0.13)* | (0.05)* | (0)* | (0.05)† |
| T-Peel to Al, N/m (lb/in) | | | | |
| After 12 hr | 1.75 | 64.8 | 3.50 | 26.3 |
| | (0.01)* | (0.37)* | (0.02)* | (0.15)* |
| After 2 Weeks | 0 | 29.8 | 0 | 14.0 |
| | (0)* | (0.17)* | (0)* | (0.08)* |
| Hardness | 63A | 63A | 55A | 50A |
| 100% Modulus, MPa | 1.75 | 1.39 | 1.08 | 0.85 |
| Tensile Strength, MPa | 11.6 | 6.26 | 7.49 | 3.09 |
| Strain at Break, % | 960 | 1000 | 1100 | 970 |
| Toughness, MPa | 76 | 48 | 58 | 25 |
| Complex Viscosity, kPa · s | | | | |
| @ 190° C., 1 rad/s | 1.96 | 0.33 | 0.74 | 0.07 |
| @ 190° C., 100 rad/s | 0.57 | 0.14 | 0.28 | 0.04 |

TABLE VI'

(Functionalized Polyolefin is a-srPP-5-g-MA):

| | Formulation | | | |
|---|---|---|---|---|
| | Comp. 1 | Samp. 3B | Comp.-2 | Samp. 4B |
| RPP-1 | 64 | 44 | 52 | 32 |
| a-srPP-5-g-MA | — | 20 | — | 20 |
| PP 3155 | 16 | 16 | 13 | 13 |
| SpectraSyn 10 | 20 | 20 | 35 | 35 |
| Irganox 2215 | 0.08 | 0.08 | 0.07 | 0.07 |
| T-Peel to PET, N/m (lb/in) | | | | |
| After 12 hr | 7.00 (0.04)* | 452 (2.58)* | 8.75 (0.05)* | 19.3 (0.11)* |
| After 2 Weeks | 22.8 (0.13)* | 17.5 (0.10)* | 0 (0)* | 12.3 (0.07)** |
| T-Peel to Al, N/m (lb/in) | | | | |
| After 12 hr | 1.75 (0.01)* | 343 (1.96)* | 3.50 (0.02)* | 85.8 (0.49)* |
| After 2 Weeks | 0 (0)* | 228 (1.30)* | 0 (0)* | 114 (0.65)* |
| Hardness | 63A | 63A | 55A | 52A |
| 100% Modulus, MPa | 1.75 | 1.42 | 1.08 | 0.97 |
| Tensile Strength, MPa | 11.6 | 6.16 | 7.49 | 3.63 |
| Strain at Break, % | 960 | 970 | 1100 | 1080 |
| Toughness, MPa | 76 | 46 | 58 | 32 |
| Complex Viscosity, kPa · s | | | | |
| @ 190° C., 1 rad/s | 1.96 | 0.77 | 0.74 | 0.17 |
| @ 190° C., 100 rad/s | 0.57 | 0.30 | 0.28 | 0.10 |

*AIF;
**CF/AIF;
†CF;
††Substrate elongated

TABLE VI"

(Functionalized Polyolefin is a-srPP-6-g-MA):

| | Formulation | | | |
|---|---|---|---|---|
| | Comp. 1 | Samp. 5B | Comp.-2 | Samp. 6B |
| RPP-1 | 64 | 44 | 52 | 32 |
| a-srPP-6-g-MA | — | 20 | — | 20 |
| PP 3155 | 16 | 16 | 13 | 13 |
| SpectraSyn 10 | 20 | 20 | 35 | 35 |
| Irganox 2215 | 0.08 | 0.08 | 0.07 | 0.07 |
| T-Peel to PET, N/m (lb/in) | | | | |
| After 12 hr | 7.00 (0.04)* | 488 (2.79)* | 8.75 (0.05)* | 77.0 (0.44)* |
| After 2 Weeks | 22.8 (0.13)* | 609 (3.48)* | 0 (0)* | 606 (3.46)* |
| T-Peel to Al, N/m (lb/in) | | | | |
| After 12 hr | 1.75 (0.01)* | 312 (1.78)* | 3.50 (0.02)* | 54.3 (0.31)* |
| After 2 Weeks | 0 (0)* | 284 (1.62)* | 0 (0)* | 47.3 (0.27)* |
| Hardness | 63A | 60A | 55A | 55A |
| 100% Modulus, MPa | 1.75 | 1.34 | 1.08 | 1.02 |
| Tensile Strength, MPa | 11.6 | 6.81 | 7.49 | 4.11 |
| Strain at Break, % | 960 | 960 | 1100 | 1110 |
| Toughness, MPa | 76 | 49 | 58 | 36 |

TABLE VI"-continued (Functionalized Polyolefin is a-srPP-6-g-MA):

| | Formulation | | | |
|---|---|---|---|---|
| | Comp. 1 | Samp. 5B | Comp.-2 | Samp. 6B |
| Complex Viscosity, kPa · s | | | | |
| @ 190° C., 1 rad/s | 1.96 | 0.86 | 0.74 | 0.33 |
| @ 190° C., 100 rad/s | 0.57 | 0.34 | 0.28 | 0.16 |

*AIF;
**CF/AIF;
†CF;
††Substrate elongated

TABLE VII (Functionalized Polyolefin is iPP-g-MA):

| | Formulation | | | |
|---|---|---|---|---|
| | Comp. 1 | Samp. 1C | Comp.-2 | Samp. 2C |
| RPP-1 | 64 | 44 | 52 | 32 |
| iPP-g-MA | — | 20 | — | 20 |
| PP 3155 | 16 | 16 | 13 | 13 |
| SpectraSyn 10 | 20 | 20 | 35 | 35 |
| Irganox 2215 | 0.08 | 0.08 | 0.07 | 0.07 |
| T-Peel to PET, N/m (lb/in) | | | | |
| After 12 hr | 7.00 (0.04)* | 71.8 (0.41)* | 8.75 (0.05)* | 43.8 (0.25)* |
| After 2 Weeks | 22.8 (0.13)* | 80.5 (0.46)* | 0 (0)* | 64.8 (0.37)* |
| T-Peel to Al, N/m (lb/in) | | | | |
| After 12 hr | 1.75 (0.01)* | 585 (3.34)* | 3.50 (0.02)* | 735 (4.20)* |
| After 2 Weeks | 0 (0)* | 455 (2.60)* | 0 (0)* | 854 (4.88)** |
| Hardness | 63A | | 55A | 71A |
| 100% Modulus, MPa | 1.75 | | 1.08 | 2.48 |
| Tensile Strength, MPa | 11.6 | | 7.49 | 2.57 |
| Strain at Break, % | 960 | | 1100 | 190 |
| Toughness, MPa | 76 | | 58 | 6.1 |
| Complex Viscosity, kPa · s | | | | |
| @ 190° C., 1 rad/s | 1.96 | | 0.74 | |
| @ 190° C., 100 rad/s | 0.57 | | 0.28 | |

*AIF;
**CF/AIF;
†CF;
††Substrate elongated

TABLE X (Functionalized Polyolefin is (iPP-g-aPP-2)-g-MA):

| | Formulation | | | |
|---|---|---|---|---|
| | Comp. 1 (24090-78) | Samp. 1D (24090-102) | Comp.-2 (24090-81) | Samp. 2D (24090-103) |
| RPP-1 | 64 | 44 | 52 | 32 |
| (iPP-g-aPP-2)-g-MA | — | 20 | — | 20 |
| PP 3155 | 16 | 16 | 13 | 13 |

TABLE X-continued (Functionalized Polyolefin is (iPP-g-aPP-2)-g-MA):

| | Formulation | | | |
|---|---|---|---|---|
| | Comp. 1 (24090-78) | Samp. 1D (24090-102) | Comp.-2 (24090-81) | Samp. 2D (24090-103) |
| SpectraSyn 10 | 20 | 20 | 35 | 35 |
| Irganox 2215 | 0.08 | 0.08 | 0.07 | 0.07 |
| T-Peel to PET, N/m (lb/in) | | | | |
| After 12 hr | 7.00 (0.04)* | 504 (2.88)* | 8.75 (0.05)* | 509 (2.91)* |
| After 2 Weeks | 22.8 (0.13)* | 151 (0.86)* | 0 (0)* | 59.5 (0.34)* |
| T-Peel to Al, N/m (lb/in) | | | | |
| After 12 hr | 1.75 (0.01)* | 1,108 (6.33)* | 3.50 (0.02)* | 1,013 (5.79)* |
| After 2 Weeks | 0 (0)* | 809 (4.62)* | 0 (0)* | 571 (3.26)* |
| Hardness | 63A | 64A | 55A | 61A |
| 100% Modulus, MPa | 1.75 | 2.01 | 1.08 | 1.55 |
| Tensile Strength, MPa | 11.6 | 8.47 | 7.49 | 4.72 |
| Strain at Break, % | 960 | 1030 | 1100 | 970 |
| Toughness, MPa | 76 | 69 | 58 | 41 |
| Complex Viscosity, kPa · s | | | | |
| @ 190° C., 1 rad/s | 1.96 | 0.55 | 0.74 | 0.16 |
| @ 190° C., 100 rad/s | 0.57 | 0.22 | 0.28 | 0.08 |

*AIF;
**CF/AIF;
†CF;
††Substrate elongated

Results

Table I shows the T-peel adhesion of neat random propylene polymer (comparative samples) and random propylene polymer-g-MA (inventive samples) to three different substrates. For the T-peel data, the values after the bonds were conditioned overnight and for 2 weeks are reported.

Table II shows the T-peel adhesion of comparative random propylene polymer and inventive random propylene polymer-g-MA formulated with additives iPP-g-aPP-1 and E-5380 ($M_w$=440, Mw/$M_n$=1.83, $T_g$=36° C.) to PET and iPP. Again, the T-peel values after the bonds were conditioned overnight and for 2 weeks are reported.

Table III shows the results when inventive random propylene polymer-g-MA-4 was added as an adhesion promoter in the blend of iPP-g-aPP-2 and E-5690 (Mw=480, $M_w/_n$=1.90, $T_g$=45° C.).

Tables IV-X show the various blend compositions of RPP-1, iPP, NFP and functionalized polyolefin and their adhesion, hardness, tensile and melt viscosity data. For the T-peel data, the values after the bonds were conditioned overnight and for 2 weeks are reported. AIF and CF denote apparent interfacial failure (debonded adhesive left only on one side of the substrate) and cohesive failure (debonded adhesive left on both sides of the substrates, respectively, as observed visually. Because each T-peel measurement employs triplicate samples, CF/AIF indicates that two samples fail in CF mode and one sample fails in AIF mode.

Table IV shows the properties of the control compositions. Table V, Control-1 and Invention-1A both contain 16 wt % PP 3155 and 20 wt % SpectraSyn 10. The difference between Control-1 and Invention-1A is the addition of 20 wt % of RPP-g-MA-1 in Invention-1A. Control-2 and Invention-2A both contain 13 wt % PP 3155 and 35 wt % SpectraSyn 10.

Tables V' and V" show the data when the functionalized polyolefins used are RPP-g-MA-4 and RPP-g-MA-5, respectively. Tables VI, VI' and VI" show the data when the functionlaized polyolefins used are a-srPP-3-g-MA, a-srPP-5-g-MA and a-srPP-6-g-MA, respectively. Table VI shows the data when the functionlaized polyolefin used is iPP-g-MA. Table X shows the data when the functionlaized polyolefin used is (iPP-g-aPP-2)-g-MA.

Accordingly, the present invention relates to:

1. An adhesive composition comprising:

a random propylene polymer component having a heat of fusion of between 1 and 70 J/g and an mm triad tacticity index of at least 75%;

a functionalized polymer component comprising a $C_2$-$C_{20}$ olefin comprising at least 0.1 wt % of a functional group; and a non-functionalized plasticizer, wherein the adhesive composition has a T-Peel adhesion on a polar substrate at 20° C. of at least 175 N/m (1 lb/in) and a T-Peel adhesion on a non-polar substrate at 20° C. of at least 175 N/m Pa (1 lb/in)and the polarity of the polar substrate is at least 0.10 units higher than the polarity of the non-polar substrate (preferably at least 0.15, 0.20, 0.25, 0.30, 0.35, 0.40, 0.45, 0.50, 0.55, 0.60, 0.65, 0.70, 0.75, 0.80, 0.85, 0.90, 0.95 units higher), wherein functionalized syndiotactic rich polyolefin polymer is present at 5 wt % or less, based upon the weight of the composition (preferably 4 wt % or less, preferably 3 wt % or less, preferably 2 wt or less, preferably 1 wt or less, preferably at 0 wt %).

2. The adhesive composition of 1, comprising 0.1 wt % to 99 wt % of the random propylene polymer component, based on the total weight of the adhesive composition.

3. The adhesive composition of any of 1-2, comprising 0.1 wt % to 99 wt % of the functionalized polymer component, based on the total weight of the adhesive composition.

4. The adhesive composition of any of 1-3, wherein the functionalized polymer component comprises about 0.1 wt % to about 10 wt % of the functional group.

5. The adhesive composition of any of 1-4, wherein the functionalized polymer component comprises about 0.5 wt % to about 5 wt % of the functional group.

6. The adhesive composition of any of 1-5, wherein the functional group is maleic anhydride.

7. The adhesive composition of any of 1-6, wherein the random propylene polymer further comprises a comonomer selected from ethylene and other alpha-olefins having 4 to 6 carbon atoms.

8. The adhesive composition of any of 1-7, wherein the random propylene polymer has a percent elongation at break at 20° C. of 300% or more.

9. The adhesive composition of any of 1-8, wherein the random propylene polymer has a flexural modulus of less than 1400 MPa.

10. The adhesive composition of any of 1-9 having a T-Peel adhesion on a polar substrate at 20° C. of at least 350 N/m (2 lb/in).

11. The adhesive composition of any of 1-10 having a T-Peel adhesion on a polar substrate at 20° C. of at least 525 N/m (3 lb/in).

12. The adhesive composition of any of 1-11 having a T-Peel adhesion on a polar substrate at 20° C. of at least 700 N/m (4 lb/in).

13. The adhesive composition of any of 1-12, wherein the random propylene polymer has a weight average molecular weight Mw of 5,000,000 or less.

14. The adhesive composition of any of 1-13, wherein the random propylene polymer has a number average molecular weight Mn of 3,000,000 or less.

15. The adhesive composition of any of 1-14, wherein the random propylene polymer has a z average molecular weight Mz of 10,000,000 or less.

16. The adhesive composition of any of 1-15, wherein the random propylene polymer has an Mw/Mn of 1.5 to 40.

17. The adhesive composition of any of 1-16, wherein the random propylene polymer has a g' index of greater than 0.99.

18. The adhesive composition of any of 1-17, wherein the random propylene polymer has a crystallization temperature of about 140° C. or less.

19. The adhesive composition of any of 1-18, wherein the random propylene polymer has a melt flow rate greater than or equal to about 0.2 g/10 min.

20. The adhesive composition of any of 1-19, wherein the random propylene polymer has a heat of fusion of about 0.5 to about 35 joules per gram.

21. The adhesive composition of any of 1-20, further comprising at least 0.1 wt % of an amorphous polypropylene polymer grafted to isotactic polypropylene polymer, a $C_2$-$C_{20}$ polymer, an elastomer, an impact copolymer, a tackifier, a crosslinking agent, an antioxidant, a neutralizing agent, a nucleating agent, a filler, an adhesion promoter, an oil, a plasticizer, a wax, an ester polymer, or a combination comprising one or more of the foregoing.

22. The adhesive composition of any of 1-21, further comprising at least 0.1 wt % of homopolypropylene, isotactic polypropylene, isotactic polypropylene having greater than about 50% m-pentads, syndiotactic polypropylene, random copolymer of propylene and butane, random copolymer of propylene and hexene, polybutene, ethylene vinyl acetate, polyethylene having a density of 0.915 to less than 0.935 g/cm3, linear polyethylene having a density of 0.915 to less than 0.935 g/cm3, polyethylene having a density of 0.86 to less than 0.90 g/cm3, polyethylene having a density of 0.90 to less than 0.915 g/cm3, polyethylene having a density of 0.935 to 0.945 g/cm3, polyethylene having a density of 0.945 to 0.98 g/cm3, ethylene vinyl acetate, ethylene methyl acrylate, copolymers of acrylic acid, polymethylmethacrylate, polyvinylchloride, polybutene-1, isotactic polybutene, ABS resin, ethylene-propylene rubber (EPR), vulcanized EPR, EPDM, SBS, polyamides, polycarbonates, crosslinked polyethylene, copolymers of ethylene and vinyl alcohol, polystyrene, polyesters, polyacrylonitrile homopolymer or copolymers, thermoplastic polyamides, polyacetal, polyvinylidine fluoride, polyethylene glycols, copolymers of isobutylene and para methyl styrene, polybutadiene, polyisoprene, block copolymers of styrene and butadiene, hydrogenated block copolymers of styrene and butadiene (SEBS) or a combination comprising one or more of the foregoing.

23. The adhesive composition of any of 1-22, further comprising at least 0.1 wt % of a tackifier selected from the group consisting of an aliphatic hydrocarbon resin, an aromatic modified aliphatic hydrocarbon resin, a hydrogenated polycyclopentadiene resin, a polycyclopentadiene resin, a gum rosin, a gum rosin ester, a wood rosin, a wood rosin ester, a tall oil rosin, a tall oil rosin ester, a polyterpene, an aromatic modified polyterpene, a terpene phenolic, an aromatic modified hydrogenated polycyclopentadiene resin, a hydrogenated aliphatic resin, a hydrogenated aliphatic aromatic resin, a hydrogenated terpene, a modified terpene, a hydrogenated rosin acid, a hydrogenated rosin ester, and a combination comprising one or more of the foregoing tackifiers.

24. The adhesive composition of any of 1-23, further comprising at least 0.1 wt % of a tackifier comprising a hydrogenated aromatic modified resin produced from dicyclopentadiene feedstock, having a Ring and Ball softening point of 10° C. to 150° C.

25. The adhesive composition of any of 1-24, further comprising at least 0.1 wt % of a tackifier comprising a $C_5/C_6$ terpene resin, a styrene terpene resin, an alpha-methylstyrene terpene resin, a $C_8$ terpene resin, an aromatic modified $C_5/C_6$ resin, an aromatic modified cyclic resin, an aromatic modified dicyclopentadiene based resin, or a combination comprising one or more of the foregoing tackifiers.

26. The adhesive composition of any of 1-25, further comprising at least 0.1 wt % of a tackifier comprising a resin obtained from cationic polymerization of compositions comprising $C_5$ diolefins, $C_5$ olefins, $C_6$ olefins, $C_9$ vinylaromatics, dicyclopentadiene, methyldicyclopentadiene, terpenes, or a combination thereof.

27. The adhesive composition of any of 1-26, further comprising at least 0.1 wt % of a tackifier comprising a resin, or a hydrogenated resin obtained from thermal polymerization of dicyclopentadiene, dimers or oligomers of cyclopentadiene and/or methylcyclopentadiene, and/or with vinylaromatics, or a combination thereof.

28. The adhesive composition of any of 1-27, further comprising at least 0.1 wt % of a crosslinking agent selected from the group consisting of alcohols, multiols, amines, diamines, triamines, polyamines, ethylenediamine, diethylenetriamine, hexamethylenediamine, diethylaniinopropylamine, menthanediamine, and a combination thereof.

29. The adhesive composition of any of 1-28, further comprising at least 0.1 wt % of an antioxidant selected from the group consisting of 2,6-di-t-butyl-p-cresol, 2,4,6-tri-t-butylphenol, vitamin E, 2-t-butyl-6-(3'-t-butyl-5'-methyl-2'-hydroxybenzyl)-4-methylphenyl acrylate, 2,2'-methylene-bis (4-methyl-6-t-butylphenyl), 2,2'-methylene-bis(4-ethyl-6-t-butyl-phenol), 2,2'-methylene-bis(6-cyclohexyl-4-methylphenol), 1,6-hexanediol-bis([3-(3,5-di-t-butyl[4-hydroxyphenyl])] propionate, pentaerythrityl-tetrakis-[3-(3, 5-di-t-butyl-4-hydroxyphenyl)] propionate, and a combination thereof.

30. The adhesive composition of any of 1-29, further comprising at least 0.1 wt % of a neutralizing agent selected from the group consisting of calcium stearate, magnesium hydroxide, aluminum hydroxide, hydrotalcite, and a combination thereof.

31. The adhesive composition of any of 1-30, further comprising at least 0.1 wt % of a nucleating agent selected from the group consisting of salts of benzoic acid, sodium salt of aromatic carboxylic acid, sodium-2,2'-methylene-bis(4,6-di-t-butylphenyl) phosphate, benzyl sorbitol, 3,4-dimethyl dibenzylidene sorbital acetal, disodium salt of cis-endo-bicylo (2.2.1) heptane-2,3-dicarboxylic acid, and a combination thereof.

32. The adhesive composition of any of 1-31, further comprising at least 0.1 wt % of a filler and/or a nano-composition selected from the group consisting of titanium dioxide, calcium carbonate, barium sulfate, silica, silicon dioxide, carbon black, sand, glass beads, mineral aggregates, talc, clay, nanoclay, synthetic nanoclay, and a combination thereof.

33. The adhesive composition of any of 1-32, further comprising at least 0.1 wt % an adhesion promoter selected from the group consisting of polar acids, polyaminoamides, urethanes, silane ester coupling agents, titanate esters, reactive acrylate monomers, metal acid salts, polyphenylene oxide, oxidized polyolefins, acid modified polyolefins, anhydride modified polyolefins, silanes, titanates, organosilane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxpropyltrimethoxysilane, aminopropyltriethoxysilane, aminoethylaminopropyltrimethoxysilane, ureidopropyltrimethyloxysilane, bis-gamma-trimethoxysilyl-propylurea, 1,3,5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof.

34. The adhesive composition of any of 1-33, comprising 0.1 wt % to 99 wt % of the non-functionalized plasticizer, based on the total weight of the adhesive composition.

35. The adhesive composition of any of 1-34, wherein the non-functionalized plasticizer comprises carbon and hydrogen, and less than about 5% functional groups selected from the group consisting of hydroxide, aryls, substituted aryls, halogen, alkoxys, carboxyl, ester, carbon-carbon unsaturation, acrylates, oxygen, and nitrogen.

36. The adhesive composition of any of 1-35, wherein the non-functionalized plasticizer comprises $C_6$ to $C_{200}$ paraffins or isoparaffins having a specific gravity of 0.85 or less, a pour point of −20° C. or less, or a combination thereof.

37. The adhesive composition of any of 1-36, wherein the non-functionalized plasticizer comprises:
a distillation range having a difference between an upper temperature and a lower temperature of 40° C. or less;
a final boiling point of 115° C. to 500° C.;
a number average molecular weight (Mn) between 2,000 and 100 g/mol;
a dielectric constant at 20° C. of less than 3.0;
a viscosity of 0.5 to 20 cSt at 25° C.;
a glass transition temperature of less than 0° C.; or
a combination thereof.

38. The adhesive composition of any of 1-37, wherein the non-functionalized plasticizer has a flash point of 200° C. or more, a pour point of −10° C. or less, a viscosity index of 120 or more, or a combination thereof.

39. The adhesive composition of any of 1-38, wherein the non-functionalized plasticizer comprises polyalphaolefin oligomers of $C_5$ to $C_{20}$ alpha olefins.

40. The adhesive composition of any of 1-39, wherein the non-functionalized plasticizer comprises polyalphaolefin oligomers of 1-octene, 1-decene, 1-dodecene, or a combination thereof.

41. The adhesive composition of any of 1-40, wherein the non-functionalized plasticizer comprises polyalphaolefin oligomers having a kinematic viscosity at 100° C. of 3 cSt or more, a viscosity index of 100 or more, a pour point of −10° C. or less, or a combination thereof.

42. The adhesive composition of any of 1-41, wherein the non-functionalized plasticizer comprises polyalphaolefin oligomers having a number average molecular weight of from 300 to 21,000 g/mol.

43. The adhesive composition of any of 1-42, wherein the non-functionalized plasticizer comprises oligomers comprising isobutylene, 1-butene, 2-butene, or a combination thereof.

44. The adhesive composition of any of 1-43, wherein the non-functionalized plasticizer comprises at least 0.1 wt % of an oil selected from the group consisting of an aliphatic oil, a napthenic oil, a white oil, and a combination thereof.

45. The adhesive composition of any of 1-44, further comprising at least 0.1 wt % of a phthalate plasticizer.

46. The adhesive composition of any of 1-45, further comprising at least 0.1 wt % of a plasticizer selected from the group consisting of di-iso-undecyl phthalate, di-iso-nonylphthalate, dioctylphthalate, and a combination thereof.

47. The adhesive composition of any of 1-46, further comprising at least 0.1 wt % of a wax selected from the group consisting of polypropylene wax, polyethylene wax, Fischer-Tropsch wax, oxidized Fischer-Tropsch wax, hydroxystearamide wax, functionalized wax, amorphous wax, microcrystalline wax, beeswax, vegetable wax, petroleum wax, paraffin wax, chemically modified hydrocarbon wax, substituted amide wax, a combination thereof, and a derivative of one or more of the foregoing waxes.

48. The adhesive composition of any of 1-47, further comprising at least 0.1 wt % of one or more polymers having a number average molecular weight of 5000 or less, wherein the polymer comprises propylene, butene, pentene, hexene or a combination thereof.

49. The adhesive composition of any of 1-48, further comprising a blend, wherein the blend has two or more phases, where a discontinuous phase comprises a polyester or a propylene-based polymer, and a continuous phase comprises the propylene copolymer functionalized with a functional group.

50. The adhesive composition of any of 1-49, further comprising at least 0.1 wt % of a block, an antiblock, a pigment, a dye, a dyestuff, a processing aid, a UV stabilizer, a lubricant, an adjuvant, a surfactant, a color masterbatch, a flow improver, a crystallization aid, a stabilizer, a defoamer, a preservative, a thickener, a rheology modifier, a humectant, water, or a combination thereof.

51. The adhesive composition of any of 1-50, comprising at least 0.1 wt % of one or more stabilizers selected from the group consisting of hindered phenols, sulfur phenols, phosphorous-containing phenols, 1,3,5-trimethyl-2,4,6-tris(3-5-di-tert-butyl-4-hydroxybenzyl) benzene, pentaerythritol tetrakis-3(3,5-di-tert-butyl-4-hydroxyphenyl) propionate, n-octadecyl-3(3,5-di-tert-butyl-4-hydroxyphenyl) propionate, 4,4'-methylenebis(4-methyl-6-tert butylphenol), 4,4'-thiobis(6-tert-butyl-o-cresol), 2,6-di-tert-butylphenol, 6-(4-hydroxyphenoxy)-2,4-bis(n-octylthio)-1,3,5-triazine, 2,4,6-tris(4-hydroxy-3,5-di-tert-butyl-phenoxy)-1,3,5-triazine, di-n-octadecyl-3,5-di-tert-butyl-4-hydroxybenzylphosphonate, 2-(n-octylthio)ethyl-3,5-di-tert-butyl-4-hydroxybenzoate, sorbitol hexa-(3,3,5-di-tert-butyl-4-hydroxy-phenyl) propionate, and combinations or derivatives thereof.

52. The adhesive composition of any of 1-51, further comprising a packaging adhesive, a disposable article, a consumer good, a film, a pressure sensitive adhesive, a laminate article, a fiber product, a hot melt adhesive, a carpet, a tape, a roofing element, a reflective article, a woodworking article, a label for adhering to a substrate, a bookbinding article, a roadmarking composition, a sealant composition, a paving composition, a glue stick, a pipe wrapping article, an article having a transparent pane, or a combination thereof.

53. The adhesive composition of any of 1-52, having a set time of 30 seconds or less.

54. The adhesive composition of any of 1-53, wherein the polarity of the polar substrate is at least 0.20 $x^p$ units higher than the polarity of the non-polar substrate, wherein xP for a given substrate "s" is defined by the formula:

$$x_s^P = \gamma_s^P / \gamma_s$$

wherein $\gamma_s$ is the surface tension of the given substrate "s", and is defined by the equation:

$$\gamma_s = \gamma_s^d + \gamma_s^p$$

where $\gamma_s^d$ is the dispersion component of the surface tension of the given substrate "s", arising from dispersion-force interactions and $\gamma_s^p$ the polar component of the surface tension of the given substrate "s", arising from dipolar and specific interactions.

55. The adhesive composition of 54, wherein the polarity of the polar substrate is at least 0.30 $x^p$ units higher than the polarity of the non-polar substrate.

56. The adhesive composition of any one of 54-55, wherein the polarity of the polar substrate is at least 0.40 $x^p$ unit higher than the polarity of the non-polar substrate.

57. The adhesive composition of any one of 54-56, wherein the polarity of the polar substrate is at least 0.50 $x^p$ units higher than the polarity of the non-polar substrate.

58. The adhesive composition of any one of 54-57, wherein the polarity of the polar substrate is at least 0.60 $x^p$ units higher than the polarity of the non-polar substrate.

59. The adhesive composition of any one of 54-58, wherein the polarity of the polar substrate is at least 0.70 $x^p$ units higher than the polarity of the non-polar substrate.

60. The adhesive composition of any one of 54-59, wherein the polarity of the polar substrate is at least 0.80 $x^p$ units higher than the polarity of the non-polar substrate.

61. An adhesive composition comprising:
a random propylene polymer component having a heat of fusion of between 1 and 70 J/g and an mm triad tacticity index of at least 75%;
a non-functionalized plasticizer; and
a contact product of a polymer comprising a $C_2$-$C_{20}$ olefin and at least 0.1 wt % of a functional group;
wherein the adhesive composition has a T-Peel adhesion on a polar substrate at 20° C. of at least 175 N/m (1 lb/in) and a T-Peel adhesion on a non-polar substrate at 20° C. of at least 175 N/m Pa (1 lb/in) and where the polarity of the polar substrate is at least 0.10 units higher than the polarity of the non-polar substrate (preferably at least 0.15, 0.20, 0.25, 0.30, 0.35, 0.40, 0.45, 0.50, 0.55, 0.60, 0.65, 0.70, 0.75, 0.80, 0.85, 0.90, 0.95 units higher), preferably wherein functionalized syndiotactic rich polyolefin polymer is present at 5 wt % or less, based upon the weight of the composition.

62. The adhesive composition of 61, wherein the random propylene polymer comprises:
68 to 92 mole percent propylene;
8 to 32 mole percent of a comonomer; and
wherein the adhesive composition has a T-peel adhesion to isotactic polypropylene of greater than about 595 N/m (3.4 lb/in), a T-peel adhesion to aluminum of greater than about 700 N/m (4.0 lb/in), and a T-peel adhesion to polyester of greater than about 192.5 N/m (1.1 lb/in).

63. The adhesive composition of any one of 61-62, wherein the comonomer is ethylene.

64. The adhesive composition of any one of 61-63, wherein the random propylene polymer comprises 13 to 23 mol % ethylene.

65. The adhesive composition of any one of 61-64, wherein the functionalized polymer component comprises a random propylene polymer comprising about 0.1 to about 10 wt % of the functional group.

66. The adhesive composition of any one of 61-65, wherein the functionalized polymer component comprises about 0.5 to about 5 wt % of the functional group.

67. The adhesive composition of any one of 61-66, wherein the functional group is maleic anhydride.

68. The adhesive composition of any one of 61-67, wherein the polarity of the polar substrate is at least 0.15 $x^p$ units higher than the polarity of the non-polar substrate, wherein $x^p$ for a given substrate "s" is defined by the formula:

$$x_s^p = \gamma_s^p / \gamma_s$$

wherein $\gamma_s$ is the surface tension of the given substrate "s", and is defined by the equation:

$$\gamma_s = \gamma_s^d + \gamma_s^p$$

where $\gamma_s^d$ is the dispersion component of the surface tension of the given substrate "s", arising from dispersion-force interactions and $\gamma_s^p$ the polar component of the surface tension of the given substrate "s", arising from dipolar and specific interactions.

69. The adhesive composition of any one of 61-68, wherein the polarity of the polar substrate is at least 0.20 $x^p$ units higher than the polarity of the non-polar substrate.

70. The adhesive composition of any one of 61-69, wherein the polarity of the polar substrate is at least 0.25 $x^p$ unit higher than the polarity of the non-polar substrate.

71. The adhesive composition of any one of 61-70, wherein the polarity of the polar substrate is at least 0.30 $x^p$ units higher than the polarity of the non-polar substrate.

72. The adhesive composition of any one of 61-71, wherein the polarity of the polar substrate is at least 0.40 $x^p$ units higher than the polarity of the non-polar substrate.

73. The adhesive composition of any one of 61-72, wherein the polarity of the polar substrate is at least 0.50 $x^p$ units higher than the polarity of the non-polar substrate.

74. The adhesive composition of any one of 61-73, wherein the polarity of the polar substrate is at least 0.75 $x^p$ units higher than the polarity of the non-polar substrate.

75. A process to make an adhesive composition comprising the steps of combining a random propylene polymer having a heat of fusion of between 1 and 70 J/g; and an mm triad tacticity index of at least 75%, a functionalized polymer component comprising a $C_2$-$C_{20}$ polymer and at least 0.1 wt % of a functional group, and a non-functionalized plasticizer, to produce the adhesive composition, wherein the adhesive composition has a T-Peel adhesion on a polar substrate at 20° C. of at least 175 N/m (1 lb/in) and a T-Peel adhesion on a non-polar substrate of at least 175 N/m (1 lb/in) and where the polarity of the polar substrate is at least 0.10 units higher than the polarity of the non-polar substrate (preferably at least 0.15, 0.20, 0.25, 0.30, 0.35, 0.40, 0.45, 0.50, 0.55, 0.60, 0.65, 0.70, 0.75, 0.80, 0.85, 0.90, 0.95 units higher), preferably wherein functionalized syndiotactic rich polyolefin polymer is present at 5 wt % or less, based upon the weight of the composition.

76. The process of 75, wherein the random propylene polymer comprises propylene and a comonomer selected from ethylene or other alpha-olefin having 4 to 6 carbon atoms.

77. The process of any one of 75-76, wherein said propylene polymer comprises:
68 to 92 mole percent propylene; and
8 to 32 mole percent said comonomer.

78. The process of any one of 75-77, wherein the adhesive composition has a T-peel adhesion to isotactic polypropylene of greater than about 595 N/m (3.4 lb/in), a T-peel adhesion to aluminum of greater than about 700 N/m (4.0 lb/in), and a T-peel adhesion to polyester of greater than about 192.5 N/m (1.1 lb/in).

79. The process of any one of 75-78, wherein the polarity of the polar substrate is at least 0.20 $x^p$ units higher than the polarity of the non-polar substrate, wherein $x^p$ for a given substrate "s" is defined by the formula:

$$x_s^p = \gamma_s^p / \gamma_s$$

wherein $\gamma_s$ is the surface tension of the given substrate "s", and is defined by the equation:

$$\gamma_s = \gamma_s^d + \gamma_s^p$$

where $\gamma_s^d$ is the dispersion component of the surface tension of the given substrate "s", arising from dispersion-force interactions and $\gamma_s^p$ the polar component of the surface tension of the given substrate "s", arising from dipolar and specific interactions.

80. An article comprising the adhesive composition of any of 1-79.

81. The article of 80, wherein the article comprises a diaper.

82. The article of 80, wherein the article is a feminine hygiene product.

83. The article of 80, wherein the article comprises a non-woven substrate.

84. A molded part comprising the adhesive composition of any of 1-79.

85. A fiber comprising the adhesive composition of any of 1-79.

86. A non-woven fabric comprising the adhesive composition of any of 1-79.

87. A fiber at least partially coated with the adhesive composition of any of 1-79.

88. A non-woven fabric at least partially coated with the adhesive composition of any of 1-79.

In another embodiment this invention relates to

83A. An adhesive composition comprising:
1) a random propylene polymer having a heat of fusion of between 0.5 and 70 J/g and an isotactic triad tacticity due to isotactic propylene derived sequences of from 65 to 99%,
2) a functionalized polymer having at least 0.1 wt % of a functional group having a polar moiety, and
3) a non-functionalized plasticizer, which composition is capable of providing adhesion to both polar and non-polar substrates as defined herein such that the T-Peel adhesion at 20° C. is at least 175 N/m on both polyester film of thickness of 0.08 mm and iPP cast film having a thickness of 0.10 mm; an $M_n$ of 64,000; and $M_w$ of 304,000, and an $M_z$ of=1,145,000, preferably wherein functionalized syndiotactic rich polyolefin polymer is present at 5 wt % or less, based upon the weight of the composition.

84A. The composition according to paragraph 83A, wherein the polarity of the polar substrate is at least 0.10 units higher than the polarity of the non-polar substrate (preferably at least 0.15, 0.20, 0.25, 0.30, 0.35, 0.40, 0.45, 0.50, 0.55, 0.60, 0.65, 0.70, 0.75, 0.80, 0.85, 0.90, or 0.95 units higher).

85A. The composition according to paragraph 83A or 84A, wherein the functionalized polymer comprises from 0.5 wt % to 5 wt % of the functional group as measured by a quantitative stiochiometric reaction, optionally after hydrolysis of any anhydride.

86A. The composition according to paragraph 83A, 84A, or 85A wherein the functional group is maleic anhydride or hydrolyzed maleic anhydride.

87A. The composition according to any of the preceding paragraph 83A to 86A wherein the random propylene polymer comprises a comonomer selected from ethylene, butene, pentene, hexene, and octene and preferably comprises 68 to 95 mole percent propylene and 5 to 32 mole percent of a comonomer based on the total weight of the polymer.

88A. The composition according to any of the preceding paragraphs 83A to 87A in which the random propylene polymer has a percent elongation at break at 20° C. of 300% or more and a flexural modulus of less than 1400 MPa before functionalization.

89A. The composition according to any of the paragraphs 83A to 88A in which the composition is capable of providing adhesion to the polar substrate of at least 350 N/m, preferably of at least 525 N/m and especially of at least 700 N/m.

90A. The composition according to any of the preceding paragraphs 83A to 89A in which the composition is capable of providing adhesion to the non-polar substrate of at least 350 N/m, preferably of at least 525 N/m and especially of at least 700 N/m.

91A. The composition according to any of the preceding paragraphs 83A to 90A in which the random propylene polymer has an Mw of 5,000,000 or less, an Mn of 3,000,000 or less or an Mz of 5,000,000 or less and preferably has a Mw/Mn of 1.5 to 40.

92A. The composition according to any of the preceding paragraphs 83A to 91A in which the random propylene polymer has a branching index (g') index of greater than 0.99, a crystallization temperature of about 200° C. or less, a melt flow rate greater than or equal to 0.2 g/10 min and/or a heat of fusion of 0.5 to 25 joules per gram.

93A. The composition according to any of the preceding paragraphs 83A to 92A in which from 0.1 wt % to 5 wt % of an additive is present based on the weight of the composition selected from the group consisting of a crosslinking agent, an antioxidant, a neutralizing agent, a nucleating agent, an adhesion promoter, and a combination comprising one or more of the foregoing additives.

94A. The composition according to any of the preceding paragraphs 83A to 93A which from 1 to 30 wt % of an additive is present based on the weight of the composition selected from the group consisting of contains of a tackifier, a filler, an oil, a plasticizer, a wax and a combination comprising one or more of the foregoing additives.

95A. The composition according to any of the preceding paragraphs 83A to 94A in which from 1 to 30 wt % of an additive is present (based on the weight of the composition) and is selected from the group consisting of contains of non-grafted amorphous polymers having a heat of fusion of less than 70 J/g and/or grafted or ungrafted semi-crystalline polymers having a heat of fusion of at least 70 J/g 96A. The composition according to paragraph 95A in which the additive is a homopolymer or copolymer of a ethylene or a C3 to C10 alpha-olefin, an amorphous polypropylene polymer grafted to isotactic polypropylene polymer, a copolymer of ethylene and a copolymerizable monomer containing an alcohol, carboxylic acid, ester or halide moiety and/or an ABS resin, SBS, polyamides, polycarbonates, polyesters, polyacrylonitrile homopolymer or copolymers, thermoplastic polyamides, polyacetal, polyvinylidine fluoride, polyethylene glycols, polyisobutylene, and combinations comprising one or more of the foregoing additives.

97A. The composition according to any of the preceding paragraphs 83A to 96A in which the adhesive of claim 1, further comprising a blend, wherein the blend has two or more phases, where a discontinuous phase comprises a polyester or a propylene-based polymer, and a continuous phase comprises the propylene copolymer functionalized with a functional group.

98A. An adhesive dispenser for dispensing the adhesive composition according to any of paragraphs 83A to 97A, preferably not containing glass fiber.

99A. An article comprising an adhesive composition according to any of paragraphs 83A to 97A for adhering to another substrate.

100A. A film, laminated or coextruded, according to paragraph 99A with a layer of the adhesive composition on at least one surface.

101A. A multi-layer film, laminated or coextruded, comprising a layer of an adhesive composition according to any of paragraphs 83A to 97A between a polar and a non-polar layer.

102A. A multi-layer film, laminated or coextruded, according to paragraph 100A or 101A in which the polar substrate is aluminum, and the non-polar substrate is isotactic polypropylene.

103A. A fiber at least partially coated with an adhesive composition according to any of paragraphs 83A to 97A.

104A. A non-woven fabric at least partially coated with an adhesive composition according to any of paragraphs 83A to 97A.

105A. A diaper or feminine hygienic product according to paragraph 104A.

106A. A molded part comprising an adhesive composition according to any of paragraphs 83A to 97A.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

We claim:

1. An adhesive composition comprising:
   a random propylene polymer component having a heat of fusion of between 1 and 70 J/g and an mm triad tacticity index of at least 75%;
   a functionalized polymer component comprising a $C_2$-$C_{20}$ olefin comprising at least 0.1 wt % of a functional group; and
   a non-functionalized plasticizer,
   wherein the adhesive composition has a T-Peel adhesion on a polar substrate at 20° C. of at least 175 N/m (1 lb/in) and a T-Peel adhesion on a non-polar substrate at 20° C. of at least 175 N/m Pa (1 lb/in) and where the polarity of the polar substrate is at least 0.10 units higher that the polarity of the non-polar substrate.

2. The adhesive composition of claim 1, comprising 0.1 wt % to 99 wt % of the random propylene polymer component, based on the total weight of the adhesive composition.

3. The adhesive composition of claim 1, comprising 0.1 wt % to 99 wt % of the functionalized polymer component, based on the total weight of the adhesive composition.

4. The adhesive composition of claim 1, wherein the functionalized polymer component comprises about 0.1 wt % to about 10 wt % of the functional group.

5. The adhesive composition of claim 1, wherein the functionalized polymer component comprises about 0.5 wt % to about 5 wt % of the functional group.

6. The adhesive composition of claim 1, wherein the functional group is maleic anhydride.

7. The adhesive composition of claim 1, wherein the random propylene polymer further comprises a comonomer selected from ethylene and other alpha-olefins having 4 to 6 carbon atoms.

8. The adhesive composition of claim 1, wherein the random propylene polymer has a percent elongation at break at 20° C. of 300% or more.

9. The adhesive composition of claim 1, wherein the random propylene polymer has a flexural modulus of less than 1400 MPa.

10. The adhesive composition of claim 1 having a T-Peel adhesion on a polar substrate at 20° C. of at least 350 N/m (2 lb/in).

11. The adhesive composition of claim 1 having a T-Peel adhesion on a polar substrate at 20° C. of at least 525 N/m (3 lb/in).

12. The adhesive composition of claim 1 having a T-Peel adhesion on a polar substrate at 20° C. of at least 700 N/m (4 lb/in).

13. The adhesive composition of claim 1, wherein the random propylene polymer has a weight average molecular weight Mw of 5,000,000 or less.

14. The adhesive composition of claim 1, wherein the random propylene polymer has a number average molecular weight Mn of 3,000,000 or less.

15. The adhesive composition of claim 1, wherein the random propylene polymer has a z average molecular weight Mz of 10,000,000 or less.

16. The adhesive composition of claim 1, wherein the random propylene polymer has an Mw/Mn of 1.5 to 40.

17. The adhesive composition of claim 1, wherein the random propylene polymer has a g' index of greater than 0.99.

18. The adhesive composition of claim 1, wherein the random propylene polymer has a crystallization temperature of about 140° C. or less.

19. The adhesive composition of claim 1, wherein the random propylene polymer has a melt flow rate greater than or equal to about 0.2 g/10 min.

20. The adhesive composition of claim 1, wherein the random propylene polymer has a heat of fusion of about 0.5 to about 35 joules per gram.

21. The adhesive composition of claim 1, further comprising at least 0.1 wt % of an amorphous polypropylene polymer grafted to isotactic polypropylene polymer, a $C_2$-$C_{20}$ polymer, an elastomer, an impact copolymer, a tackifier, a crosslinking agent, an antioxidant, a neutralizing agent, a nucleating agent, a filler, an adhesion promoter, an oil, a plasticizer, a wax, an ester polymer, or a combination comprising one or more of the foregoing.

22. The adhesive composition of claim 1, further comprising at least 0.1 wt % of homopolypropylene, isotactic polypropylene, isotactic polypropylene having greater than about 50% m-pentads, syndiotactic polypropylene, random copolymer of propylene and butane, random copolymer of propylene and hexene, polybutene, ethylene vinyl acetate, polyethylene having a density of 0.915 to less than 0.935 g/cm3, linear polyethylene having a density of 0.915 to less than 0.935 g/cm3, polyethylene having a density of 0.86 to less than 0.90 g/cm3, polyethylene having a density of 0.90 to less than 0.915 g/cm3, polyethylene having a density of 0.935 to 0.945 g/cm3, polyethylene having a density of 0.945 to 0.98 g/cm3, ethylene vinyl acetate, ethylene methyl acrylate, copolymers of acrylic acid, polymethylmethacrylate, polyvinylchloride, polybutene-1, isotactic polybutene, ABS resin, ethylene-propylene rubber (EPR), vulcanized EPR, EPDM, SBS, polyamides, polycarbonates, crossliniked polyethylene, copolymers of ethylene and vinyl alcohol, polystyrene, polyesters, polyacrylonitrile homopolymer or copolymers, thermoplastic polyamides, polyacetal, polyvinylidine fluoride, polyethylene glycols, copolymers of isobutylene and para methyl styrene, polybutadiene, polyisoprene, block copolymers of styrene and butadiene, hydrogenated block copolymers of styrene and butadiene (SEBS) or a combination comprising one or more of the foregoing.

23. The adhesive composition of claim 1, further comprising at least 0.1 wt % of a tackifier selected from the group consisting of an aliphatic hydrocarbon resin, an aromatic modified aliphatic hydrocarbon resin, a hydrogenated polycyclopentadiene resin, a polycyclopentadiene resin, a gum rosin, a gum rosin ester, a wood rosin, a wood rosin ester, a tall oil rosin, a tall oil rosin ester, a polyterpene, an aromatic modified polyterpene, a terpene phenolic, an aromatic modified hydrogenated polycyclopentadiene resin, a hydrogenated aliphatic resin, a hydrogenated aliphatic aromatic resin, a hydrogenated terpene, a modified terpene, a hydrogenated rosin acid, a hydrogenated rosin ester, and a combination comprising one or more of the foregoing tackifiers.

24. The adhesive composition of claim 1, further comprising at least 0.1 wt % of a tackifier comprising a hydrogenated aromatic modified resin produced from dicyclopentadiene feedstock, having a Ring and Ball softening point of 10° C. to 150° C.

25. The adhesive composition of claim 1, further comprising at least 0.1 wt % of a tackifier comprising a $C_5/C_6$ terpene resin, a styrene terpene resin, an alpha-methylstyrene terpene resin, a $C_9$ terpene resin, an aromatic modified $C_5/C_6$ resin, an aromatic modified cyclic resin, an aromatic modified dicyclopentadiene based resin, or a combination comprising one or more of the foregoing tackifiers.

26. The adhesive composition of claim 1, further comprising at least 0.1 wt % of a tackifier comprising a resin obtained from cationic polymerization of compositions comprising $C_5$ diolefins, $C_5$ olefins, $C_6$ olefins, $C_9$ vinylaromatics, dicyclopentadiene, methyldicyclopentadiene, terpenes, or a combination thereof.

27. The adhesive composition of claim 1, further comprising at least 0.1 wt % of a tackifier comprising a resin, or a hydrogenated resin obtained from thermal polymerization of dicyclopentadiene, dimers or oligomers of cyclopentadiene and/or methylcyclopentadiene, and/or with vinylaromatics, or a combination thereof.

28. The adhesive composition of claim 1, further comprising at least 0.1 wt % of a crossliniking agent selected from the group consisting of alcohols, multiols, amines, diamines, triamines, polyamines, ethylenediamine, diethylenetriamine, hexamethylenediamine, diethylaniinopropylamine, menthanediamine, and a combination thereof.

29. The adhesive composition of claim 1, further comprising at least 0.1 wt % of an antioxidant selected from the group consisting of 2,6-di-t-butyl-p-cresol, 2,4,6-tri-t-butylphenol, vitamin E, 2-t-butyl-6-(3'-t-butyl-5'-methyl-2'-hydroxybenzyl)-4-methyiphenyl acrylate, 2,2'-methylene-bis(4-methyl-6-t-butylphenyl), 2,2'-methylene-bis(4-ethyl-6-t-butyl-phenol), 2,2'-methylene-bis(6-cyclohexyl-4-methylphenol), 1,6-hexanediol-bis([3-(3,5-di-t-butyl[4-hydroxyphenyl])]propionate, pentaerythrityl-tetrakis-[3-(3,5-di-t-butyl-4-hydroxyphenyl)]propionate, and a combination thereof.

30. The adhesive composition of claim 1, further comprising at least 0.1 wt % of a neutralizing agent selected from the group consisting of calcium stearate, magnesium hydroxide, aluminum hydroxide, hydrotalcite, and a combination thereof.

31. The adhesive composition of claim 1, further comprising at least 0.1 wt % of a nucleating agent selected from the group consisting of salts of benzoic acid, sodium salt of aromatic carboxylic acid, sodium-2,2'-methylene-bis(4,6-di-t-butylphenyl) phosphate, benzyl sorbitol, 3,4-dimethyl dibenzylidene sorbital acetal, disodium salt of cis-endo-bicylo (2.2.1) heptane-2,3-dicarboxylic acid, and a combination thereof.

32. The adhesive composition of claim 1, further comprising at least 0.1 wt % of a filler and/or a nano-composition selected from the group consisting of titanium dioxide, calcium carbonate, barium sulfate, silica, silicon dioxide, carbon black, sand, glass beads, mineral aggregates, talc, clay, nanoclay, synthetic nanoclay, and a combination thereof.

33. The adhesive composition of claim 1, further comprising at least 0.1 wt % an adhesion promoter selected from the group consisting of polar acids, polyaminoamides, urethanes, silane ester coupling agents, titanate esters, reactive acrylate monomers, metal acid salts, polyphenylene oxide, oxidized polyolefins, acid modified polyolefins, anhydride modified polyolefins, silanes, titanates, organosilane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxpropyltrimethoxysilane, aminopropyltriethoxysilane, aminoethylaminopropyltrimethoxysilane, ureidopropyltrimethyloxysilane, bis-gamma-trimethoxysilyl-propylurea, 1,3,5-tris-gamma-rimethoxysilyipropylisocyanurate, bis-gamma-trimethoxysilyipropylmaleate, fumarate and gamma-methacryloxypropyltrimethoxysilane, aminopropyltriethoxysilane, and combinations and derivatives thereof.

34. The adhesive composition of claim 1, comprising 0.1 wt % to 99 wt % of the non-functionalized plasticizer, based on the total weight of the adhesive composition.

35. The adhesive composition of claim 1, wherein the non-functionalized plasticizer comprises carbon and hydrogen, and less than about 5% functional groups selected from the group consisting of hydroxide, aryls, substituted aryls, halogen, alkoxys, carboxyl, ester, carbon-carbon unsaturation, acrylates, oxygen, and nitrogen.

36. The adhesive composition of claim 1, wherein the non-functionalized plasticizer comprises $C_6$ to $C_{200}$ paraffins or isoparaffins having a specific gravity of 0.85 or less, a pour point of −20° C. or less, or a combination thereof.

37. The adhesive composition of claim 1, wherein the non-functionalized plasticizer comprises:
    a distillation range having a difference between an upper temperature and a lower temperature of 40° C. or less;
    a final boiling point of 115° C. to 500° C.;
    a number average molecular weight (Mn) between 2,000 and 100 g/mol;
    a dielectric constant at 20° C. of less than 3.0;
    a viscosity of 0.5 to 20 cSt at 25° C.;
    a glass transition temperature of less than 0° C.; or
    a combination thereof.

38. The adhesive composition of claim 1, wherein the non-functionalized plasticizer has a flash point of 20° C. or more, a pour point of −10° C. or less, a viscosity index of 120 or more, or a combination thereof.

39. The adhesive composition of claim 1, wherein the non-functionalized plasticizer comprises polyalphaolefin oligomers of $C_5$ to $C_{20}$ alpha olefins.

40. The adhesive composition of claim 1, wherein the non-functionalized plasticizer comprises polyalphaolefin oligomers of 1-octene, 1-decene, 1-dodecene, or a combination thereof.

41. The adhesive composition of claim 1, wherein the non-functionalized plasticizer comprises polyalphaolefin oligomers having a kinematic viscosity at 100° C. of 3 cSt or more, a viscosity index of 100 or more, a pour point of −10° C. or less, or a combination thereof.

42. The adhesive composition of claim 1, wherein the non-functionalized plasticizer comprises polyalphaolefin oligomers having a number average molecular weight of from 300 to 21,000 g/mol.

43. The adhesive composition of claim 1, wherein the non-functionalized plasticizer comprises oligomers comprising isobutylene, 1-butene, 2-butene, or a combination thereof.

44. The adhesive composition of claim 1, wherein the non-functionalized plasticizer comprises at least 0.1 wt % of an oil selected from the group consisting of an aliphatic oil, a napthenic oil, a white oil, and a combination thereof.

45. The adhesive composition of claim 1, further comprising at least 0.1 wt % of a phthalate plasticizer.

46. The adhesive composition of claim 1, further comprising at least 0.1 wt % of a plasticizer selected from the group consisting of di-iso-undecyl phthalate, di-iso-nonylphthalate, dioctylphthalate, and a combination thereof.

47. The adhesive composition of claim 1, further comprising at least 0.1 wt % of a wax selected from the group consisting of polypropylene wax, polyethylene wax, Fischer-Tropsch wax, oxidized Fischer-Tropsch wax, hydroxystearamide wax, functionalized wax, amorphous wax, microcrystalline wax, beeswax, vegetable wax, petroleum wax, paraffin wax, chemically modified hydrocarbon wax, substituted amide wax, a combination thereof, and a derivative of one or more of the foregoing waxes.

48. The adhesive composition of claim 1, further comprising at least 0.1 wt % of one or more polymers having a number average molecular weight of 5000 or less, wherein the polymer comprises propylene, butene, pentene, hexene or a combination thereof.

49. The adhesive composition of claim 1, further comprising a blend, wherein the blend has two or more phases, where a discontinuous phase comprises a polyester or a propylene-based polymer, and a continuous phase comprises the propylene copolymer functionalized with a functional group.

50. The adhesive composition of claim 1, further comprising at least 0.1 wt % of a block, an antiblock, a pigment, a dye, a dyestuff, a processing aid, a UV stabilizer, a lubricant, an adjuvant, a surfactant, a color masterbatch, a flow improver, a crystallization aid, a stabilizer, a defoamer, a preservative, a thickener, a rheology modifier, a humectant, water, or a combination thereof.

51. The adhesive composition of claim 1, comprising at least 0.1 wt % of one or more stabilizers selected from the group consisting of hindered phenols, sulfur phenols, phosphorous-containing phenols, 1,3,5-trimethyl-2,4,6-tris(3-5-di-tert-butyl-4-hydroxybenzyl) benzene, pentaerythritol tetrakis-3(3,5-di-tert-butyl-4-hydroxyphenyl) propionate, n-octadecyl-3(3,5-di-tert-butyl-4-hydroxyphenyl) propionate, 4,4'-methylenebis (4-methyl-6-tert butylphenol), 4,4'-thiobis(6-tert-butyl-o-cresol), 2,6-di-tert-butylphenol, 6-(4-hydroxyphenoxy)-2,4-bis(n-ocytlthio)-1,3,5-triazine, 2,4,6-tris(4-hydroxy-3,5-di-tert-butyl-phenoxy)-1,3,5-triazine, di-n-octadecyl-3,5-di-tert-butyl-4-hydroxybenzylphosphonate, 2-(n-octylthio)ethyl-3,5-di-tert-butyl-4-hydroxybenzoate, sorbitol hexa-(3,3,5-di-tert-butyl-4-hydroxy-phenyl) propionate, and combinations or derivatives thereof.

52. The adhesive composition of claim 1, further comprising a packaging adhesive, a disposable article, a consumer good, a film, a pressure sensitive adhesive, a laminate article, a fiber product, a hot melt adhesive, a carpet, a tape, a roofing element, a reflective article, a woodworking article, a label for adhering to a substrate, a bookbinding article, a roadmarking composition, a sealant composition, a paving composition, a glue stick, a pipe wrapping article, an article having a transparent pane, or a combination thereof.

53. The adhesive composition of claim 1, having a set time of 30 seconds or less.

54. The adhesive composition of claim 1, wherein the polarity of the polar substrate is at least 0.20 $x^p$ units higher than the polarity of the non-polar substrate, wherein $x^p$ for a given substrate "s" is defined by the formula:

$$x_s^p = \gamma_s^p / \gamma_s$$

wherein $\gamma_s$ is the surface tension of the given substrate "s", and is defined by the equation:

$$\gamma_s = \gamma_s^d + \gamma_s^p$$

where $\gamma_s^d$ is the dispersion component of the surface tension of the given substrate "s", arising from dispersion-force interactions and $\gamma_s^p$ the polar component of the surface tension of the given substrate "s", arising from dipolar and specific interactions.

55. The adhesive composition of claim 54, wherein the polarity of the polar substrate is at least 0.30 $x^p$ units higher than the polarity of the non-polar substrate.

56. The adhesive composition of claim 54, wherein the polarity of the polar substrate is at least 0.40 $x^p$ unit higher than the polarity of the non-polar substrate.

57. The adhesive composition of claim 54, wherein the polarity of the polar substrate is at least 0.50 $x^p$ units higher than the polarity of the non-polar substrate.

58. The adhesive composition of claim 54, wherein the polarity of the polar substrate is at least 0.60 $x^p$ units higher than the polarity of the non-polar substrate.

59. The adhesive composition of claim 54, wherein the polarity of the polar substrate is at least 0.70 $x^p$ nits higher than the polarity of the non-polar substrate.

60. The adhesive composition of claim 54, wherein the polarity of the polar substrate is at least 0.80 $x^p$ units higher than the polarity of the non-polar substrate.

61. An adhesive composition comprising:
a random propylene polymer component having a heat of fusion of between 1 and 70 J/g and an mm triad tacticity index of at least 75%;
a non-functionalized plasticizer; and
a contact product of a polymer comprising a $C_2$-$C_{20}$ olefin and at least 0.1 wt % of a functional group;
wherein the adhesive composition has a Y-Peel adhesion on a polar substrate at 20° C. of at least 175 N/m (1 lb/in) and a T-Peel adhesion on a non-polar substrate at 20° C. of at least 175 N/m Pa (1 lb/in) and wherein the polarity of the polar substrate is at least 0.10 units higher than the polarity of the non-polar substrate.

62. The adhesive composition of claim 61, wherein the random propylene polymer comprises:
68 to 92 mole percent propylene;
8 to 32 mole percent of a comonomer; and
wherein the adhesive composition has a T-peel adhesion to isotactic polypropylene of greater than about 595 N/m (3.4 lb/in), a T-peel adhesion to aluminum of greater than about 700 N/m (4.0 lb/in), and a T-peel adhesion to polyester of greater than about 192.5 N/m(1.1 lb/in).

63. The adhesive composition of claim 62, wherein the comonomer is ethylene.

64. The adhesive composition of claim 61, wherein the random propylene polymer comprises 13 to 23 mol % ethylene.

65. The adhesive composition of claim 61, wherein the functionalized polymer component comprises a random propylene polymer comprising about 0.1 to about 10 wt % of the functional group.

66. The adhesive composition of claim 61, wherein the functionalized polymer component comprises about 0.5 to about 5 wt % of the functional group.

67. The adhesive composition of claim 61, wherein the functional group is maleic anhydride.

68. The adhesive composition of claim 61, wherein the polarity of the polar substrate is at least 0.20 $x^p$ units higher than the polarity of the non-polar substrate, wherein $x^p$ for a given substrate "s" is defined by the formula:

$$x_s^p = \gamma_s^p / \gamma_s$$

wherein $\gamma_s$ is the surface tension of the given substrate "s", and is defined by the equation:

$$\gamma_s = \gamma_s^d + \gamma_s^p$$

where $\gamma_s^d$ is the dispersion component of the surface tension of the given substrate "s", arising from dispersion-force interactions and $\gamma_s^p$ the polar component of the surface tension of the given substrate "s", arising from dipolar and specific interactions.

69. The adhesive composition of claim 68, wherein the polarity of the polar substrate is at least 0.30 $x^p$ units higher than the polarity of the non-polar substrate.

70. The adhesive composition of claim 68, wherein the polarity of the polar substrate is at least 0.40 $x^p$ unit higher than the polarity of the non-polar substrate.

71. The adhesive composition of claim 68, wherein the polarity of the polar substrate is at least 0.50 $x^p$ units higher than the polarity of the non-polar substrate.

72. The adhesive composition of claim 68, wherein the polarity of the polar substrate is at least 0.60 $x^p$ units higher than the polarity of the non-polar substrate.

73. The adhesive composition of claim 68, wherein the polarity of the polar substrate is at least 0.70 $x^p$ units higher than the polarity of the non-polar substrate.

74. The adhesive composition of claim 68, wherein the polarity of the polar substrate is at least 0.80 $x^p$ units higher than the polarity of the non-polar substrate.

75. A process to make an adhesive composition comprising the steps of combining a random propylene polymer having a heat of fusion of between 1 and 70 J/g;

and an mm triad tacticity index of at least 75%, a functionalized polymer component comprising a $C_2$-$C_{20}$ polymer and at least 0.1 wt % of a functional group, and a non-functionalized plasticizer, to produce the adhesive composition, wherein the adhesive composition has a T-Peel adhesion on a polar substrate at 20° C. of at least 175 N/m (1 lb/in) and a T-Peel adhesion on a non-polar substrate of at least 175 N/m (1 lb/in) and where the polarity of the polar substrate is at least 0.10 units higher than the polarity of the non-polar substrate.

76. The process of claim 75, wherein the random propylene polymer comprises propylene and a comonomer selected from ethylene or other alpha-olefin having 4 to 6 carbon atoms.

77. The process of claim 76, wherein said propylene polymer comprises:

68 to 92 mole percent propylene; and 8 to 32 mole percent said comonomer.

78. The process of claim 75, wherein the adhesive composition has a T-peel adhesion to isotactic polypropylene of greater than about 595 N/m (3.4 lb/in), a T-peel adhesion to aluminum of greater than about 700 N/m (4.0 lb/in), and a T-peel adhesion to polyester of greater than about 192.5 N/m (1.1 lb/in).

79. The process of claim 75, wherein the polarity of the polar substrate is at least 0.20 $x^p$ units higher than the polarity of the non-polar substrate, wherein $x^p$ for a given substrate "s" is defined by the formula:

$$x_s^p = \gamma_s^p / \gamma_s$$

wherein $\gamma_s$ is the surface tension of the given substrate "s", and is defined by the equation:

$$\gamma_s = \gamma_s^d + \gamma_s^p$$

where $\gamma_s^d$ is the dispersion component of the surface tension of the given substrate "s", arising from dispersion-force interactions and $\gamma_s^p$ the polar component of the surface tension of the given substrate "s", arising from dipolar and specific interactions.

80. An article comprising an adhesive composition comprising:

a random propylene polymer component having a heat of fusion of between 1 and 70 J/g and an mm triad tacticity index of at least 75%;

a functionalized polymer component comprising a $C_2$-$C_{20}$ olefin comprising at least 0.1 wt % of a functional group; and a non-functionalized plasticizer, wherein the adhesive composition has a T-Peel adhesion on a polar substrate at 20° C. of at least 175 N/m (1 lb/in) and a T-Peel adhesion on a non-polar substrate at 20° C. of at least 175 N/m Pa (1 lb/in) and where the polarity of the polar substrate is at least 0.10 units higher that the polarity of the non-polar substrate.

81. The article of claim 80, wherein the article comprises a diaper.

82. The article of claim 80, wherein the article is a feminine hygiene product.

83. The article of claim 80, wherein the article comprises a non-woven substrate.

84. A molded part comprising the adhesive composition of claim 1.

85. A fiber comprising the adhesive composition of claim 1.

86. A non-woven fabric comprising the adhesive composition of claim 1.

87. A fiber at least partially coated with the adhesive composition of claim 1.

88. A non-woven fabric at least partially coated with the adhesive composition of claim 1.

* * * * *

UNITED STATES PATENT AND TRADEMARK OFFICE
CERTIFICATE OF CORRECTION

PATENT NO. : 7,645,829 B2  Page 1 of 1
APPLICATION NO. : 11/472063
DATED : January 12, 2010
INVENTOR(S) : Tse et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 875 days.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,645,829 B2 | Page 1 of 1 |
| APPLICATION NO. | : 11/472063 | |
| DATED | : January 12, 2010 | |
| INVENTOR(S) | : Mun Fu Tse et al. | |

It is certified that error appears in the above-identified patent and that said Letters Patent is hereby corrected as shown below:

Please delete on the cover page, in the Abstract, in Item (57), on line 9, the word "Pa".

Please delete in column 3, on lines 23 and 39, the word "Pa".

Please delete in column 24, on line 7, the word "Mpa" and replace with "MPa".

Please delete in column 59, on lines 59 and 65, the word "n/m" and replace with "N/m".

Please delete in column 78, on line 21, the word "Pa".

Please delete in column 83, on line 32, the word "Pa".

Please delete in column 87, on line 37, the word "Pa".

Please delete in column 92, on line 41, the word "Pa".

Please delete in column 94, on line 33, the word "Pa".

Signed and Sealed this
Eleventh Day of October, 2011

David J. Kappos
*Director of the United States Patent and Trademark Office*